United States Patent
Seki et al.

(10) Patent No.: US 6,195,313 B1
(45) Date of Patent: Feb. 27, 2001

(54) TRACKING MECHANISM AND METHOD USING PROBES FOR INFORMATION RECORDING/REPRODUCING APPARATUS

(75) Inventors: Junichi Seki, Atsugi; Shunichi Shido, Zama; Susumu Yasuda, Machida, all of (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/140,404

(22) Filed: Aug. 26, 1998

(30) Foreign Application Priority Data

Aug. 29, 1997 (JP) .................................................. 9-249653

(51) Int. Cl.$^7$ ....................................................... G11B 7/00
(52) U.S. Cl. ..................... 369/44.11; 369/126; 369/44.26
(58) Field of Search ................................. 369/126, 44.37, 369/44.26, 59, 44.11; 250/306, 307

(56) References Cited

U.S. PATENT DOCUMENTS

| | | | |
|---|---|---|---|
| 5,204,851 | * | 4/1993 | Kawada et al. ....................... 369/126 |
| 5,721,721 | * | 2/1998 | Yanagisawa et al. ................ 369/126 |
| 5,757,760 | * | 5/1998 | Shido et al. ......................... 369/126 |
| 5,805,560 | * | 9/1998 | Kuroda et al. ....................... 369/126 |

FOREIGN PATENT DOCUMENTS

| | | |
|---|---|---|
| 63-161552 | 7/1988 | (JP) . |
| 63-161553 | 7/1988 | (JP) . |
| 1-107341 | 4/1989 | (JP) . |
| 1-133239 | 5/1989 | (JP) . |
| 2-50333 | 2/1990 | (JP) . |
| 4-212737 | 8/1992 | (JP) . |
| 4-355231 | 12/1992 | (JP) . |
| 4-364244 | 12/1992 | (JP) . |

OTHER PUBLICATIONS

"Surface Studies By Scanning Tunneling Microscopy", G. Binning et al., Physical Review Letters, vol. 49, No. 1, Jul. 5, 1982.

* cited by examiner

*Primary Examiner*—Thang V. Tran
(74) *Attorney, Agent, or Firm*—Fitzpatrick, Cella, Harper & Scinto

(57) ABSTRACT

A tracking mechanism for an apparatus which records and/or reproduces data on and/or from a medium through a relative scan of the medium with probes, the medium being formed with a plurality of tracking bit trains disposed in parallel at a predetermined distance between trains, the tracking mechanism having: a plurality of probes disposed at a predetermined distance between probes; and a tracking controller for performing a tracking control in accordance with outputs from the plurality of probes, the outputs being obtained when the plurality of tracking bit trains are scanned with the plurality of probes. A tracking method for such an apparatus includes the steps of: scanning the plurality of tracking bit trains with a plurality of probes disposed at a predetermined distance between probes; and performing a tracking control in accordance with outputs from the plurality of probes, the outputs being obtained when the plurality of tracking bit trains are scanned with the plurality of probes.

18 Claims, 39 Drawing Sheets

FIG. 33

| PROBE NO. | COEFFICIENT |
|---|---|
| TRACKING PROBE 1 | −2.0 |
| TRACKING PROBE 2 | −1.5 |
| TRACKING PROBE 3 | −1.2 |
| TRACKING PROBE 4 | −1.0 |
| TRACKING PROBE 5 | −1.0 |
| TRACKING PROBE 6 | 1.0 |
| TRACKING PROBE 7 | 1.0 |
| TRACKING PROBE 8 | 1.2 |
| TRACKING PROBE 9 | 1.5 |
| TRACKING PROBE 10 | 2.0 |

FIG. 44

| PROBE | COEFFICIENT |
|---|---|
| PROBE 801 | −3 |
| ⋮ | ⋮ |
| PROBE 822 | −3 |
| PROBE 823 | −2 |
| PROBE 824 | −1 |
| PROBE 825 | −1 |
| PROBE 826 | 1 |
| PROBE 827 | 1 |
| PROBE 828 | 2 |
| PROBE 829 | 3 |
| ⋮ | ⋮ |
| PROBE 850 | 3 |

FIG. 45

| PROBE | COEFFICIENT |
|---|---|
| PROBE 823 | −2 |
| PROBE 824 | −1 |
| PROBE 825 | −1 |
| PROBE 826 | 1 |
| PROBE 827 | 1 |
| PROBE 828 | 2 |

TRACKING MECHANISM AND METHOD USING PROBES FOR INFORMATION RECORDING/REPRODUCING APPARATUS

BACKGROUND OF THE INVENTION

1. Field of the Invention

The present invention relates to a tracking mechanism and method for an apparatus which records/reproduces information on/from a medium by scanning the medium with probes. The apparatus may be a high density, high capacity memory device using the STM principle.

2. Related Background Art

The advent of recent scanning tunneling microscopes (hereinafter abbreviated as STM) capable of directly observing an electron structure of a conductor has realized high resolution measurements of a real spatial image irrespective of whether the conductor is single crystal or polycrystal (G. Binning et al. Phys. Rev. Lett. 49, 57 (1982)). After this advent, scanning probe microscopes (SPM) and fine patterning techniques using SPM have been studied and developed. SPM can obtain various pieces of information by scanning a subject with a probe having a sharp tip. Fine patterning techniques using SPM aim to electrically, chemically, or physically process the surface of a substrate. Such SPM techniques are being applied also to memory techniques. For example, JP-A-63-161552, JP-A-63-161553, and other publications disclose a method of recording/reproducing information in/from a thin recording film by using STM. The thin recording film is made of a material having a function of memorizing a voltage-current switching characteristic, such as π electron based organic compound and chalcogen compound. With this method, an information processing apparatus having a record density of $10^{12}$ bits/cm$^2$ can be realized at a record bit diameter of 10 nm.

In reading information recorded on a medium, an information reading probe is required to be moved relative to a data bit train on the medium. For the relative motion of the probe, it is necessary to know the position of the data bit train and move the probe to this position.

As a method of detecting the position of a data bit train, one method is known in which physical tracks are formed on a medium and a probe is moved along the track.

JP-A-1-107341 discloses a method of forming a V-character shaped groove on the surface of a recording medium as a track, and controlling a probe electrode to be always at the center of this groove.

JP-A-1-133239 discloses a method of forming a conductive layer in a recording medium as a track and applying a tracking signal to the track to perform a feedback control by using the tracking signal detected with a probe.

As a method of tracking a data bit train without forming a track on a recording medium, JP-A-4-212737 discloses a tracking method in which a probe is vibrated in a direction perpendicular to a data bit train at a small amplitude to detect the position of the bit train and prevent position misalignment.

An approach to making the tracking control unnecessary without using the feedback control of position misalignment has been proposed in which the area near a data bit train is scanned at some density to thereby read the information.

For example, JP-A-2-050333 discloses a method of reading information by scanning a medium with a probe at a density higher than a recording density and by using pattern recognition techniques.

JP-A-4-355231 discloses a method of reproducing information in which two preliminary scans are performed before the information is actually read, tunneling current at each scan is integrated to obtain an output signal value, a center position of a signal train is detected in accordance with the output signal values at the first and second preliminary scans, and the information is reproduced by a third scan along this detected center position.

The method of forming physical tracks on a medium as disclosed in JP-A-1-107341 and JP-A-1-133239 is, however, associated with some problems that an additional process of forming physical tracks makes complicate the process of forming a recording medium and that technical and economical issues arise from required high working precision.

A method disclosed in JP-A-4-212737 is also associated with a problem that a scan speed is limited by the maximum frequency of fine vibrations because the frequency of fine vibrations in a direction perpendicular to a data bit train is required to be faster than the scan speed.

A method using pattern recognition techniques disclosed in JP-A-2-050333 is also associated with a problem that it takes a long scan time to read information at a high density, pattern recognition at a post process is complicate, and a process time is additionally required.

The methods disclosed in JP-A-4-364244 and JP-A-4-355231 are also associated with a problem of a long scan time because three scans are used for reading one data bit train.

SUMMARY OF THE INVENTION

It is an object of the present invention to provide a tracking mechanism and method capable of high precision and high speed tracking control by comparing reproduction signals of tracking bits by the method same as data recording/reproducing, without using the conventional methods described above.

The above object of the invention can be achieved by a tracking mechanism for an apparatus which records and/or reproduces data on and/or from a medium through a relative scan of the medium with probes, the medium being formed with a plurality of tracking bit trains disposed in parallel at a predetermined distance between trains, the tracking mechanism comprising: a plurality of probes disposed at a predetermined interval, i.e., a distance between probes; wherein "the probe interval" is defined as an interval between the tips of the needles of the probes" and tracking control means for performing a tracking control in accordance with outputs from the plurality of probes, the outputs being obtained when the plurality of tracking bit trains are scanned with the plurality of probes.

The above object of the invention can also be achieved by a tracking method for an apparatus which records and/or reproduces data on and/or from a medium through a relative scan of the medium with probes, the medium being formed with a plurality of tracking bit trains disposed in parallel at a predetermined distance between trains, the tracking method comprising the steps of: scanning the plurality of tracking bit trains with a plurality of probes disposed at a predetermined distance between probes; and performing a tracking control in accordance with outputs from the plurality of probes, the outputs being obtained when the plurality of tracking bit trains are scanned with the plurality of probes.

The details will be given in the embodiments to be described later.

BRIEF DESCRIPTION OF THE DRAWINGS

FIG. 33 is a table showing coefficients used by a weighting adding circuit of Embodiment 33 of the invention.

FIG. 44 is a table showing coefficients used by a weighting adding circuit of Embodiment 43 of the invention when position aligning is performed.

FIG. 45 is a table showing coefficients used by a weighting adding circuit of Embodiment 43 of the invention when tracking is performed.

DETAILED DESCRIPTION OF THE PREFERRED EMBODIMENTS

First Embodiments

In first embodiments, tracking bit trains are generated by changing the probe distance and tracking bit train distance, and reproduction signals of the tracking bits are compared. In this manner, high precision and high stability tracking becomes possible by using the method same as data recording/reproducing.

If a plurality pair of probes are used for tracking, a more stable system can be realized, defects of probes can be dealt with and tracking bit trains and data bit trains can be used in common.

Tracking bit trains and data bit trains can be used in common by providing a mechanism of holding the value of a preceding bit until the next bit appears.

Figure 6:
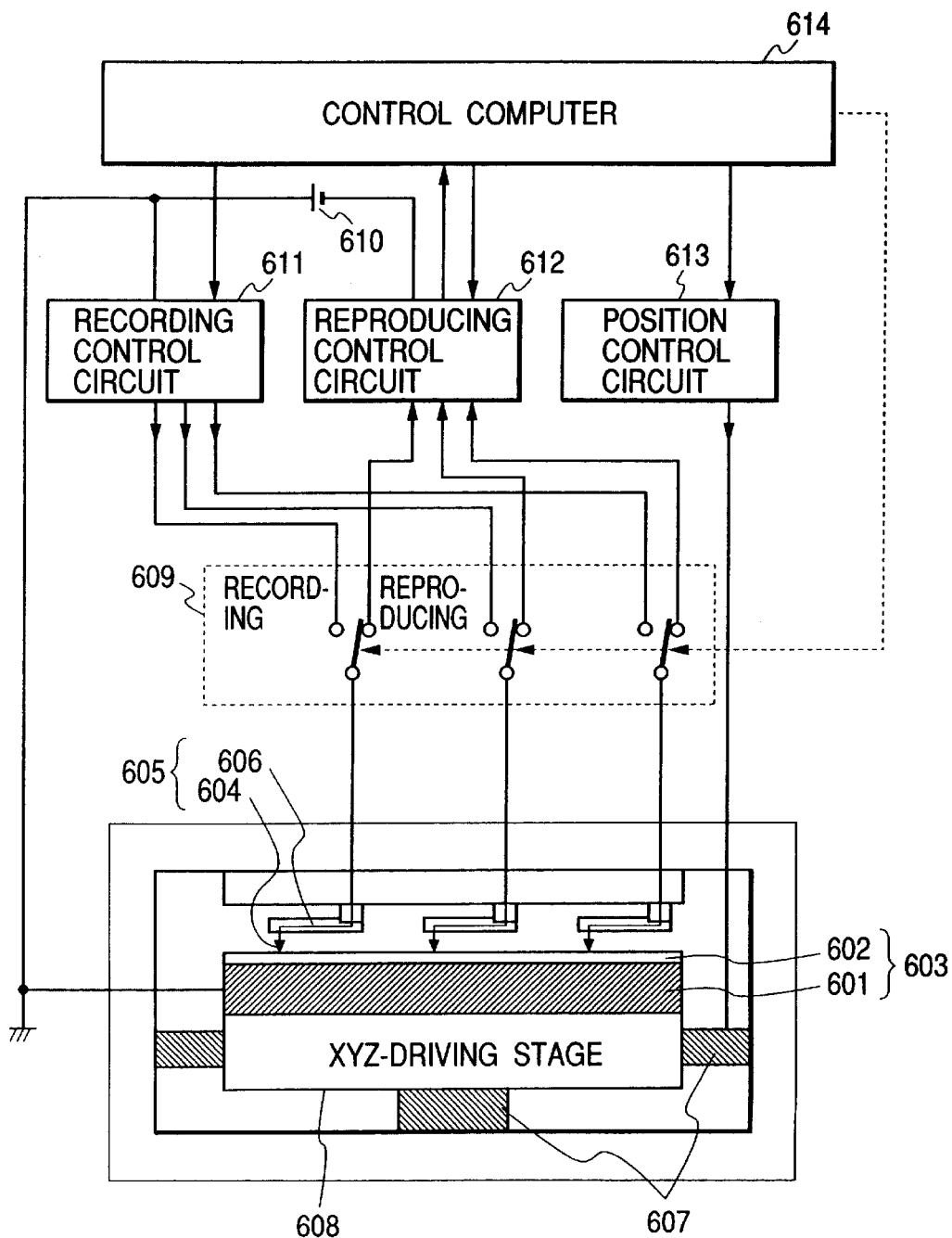
FIG. 6 is a schematic diagram showing the overall structure of a recording/reproducing apparatus embodying the invention.

The outline of a recording/reproducing apparatus embodying the invention will be described with reference to FIG. 6.

A plurality of probes 605 are disposed with their needles 604 being brought in contact with a recording medium 603 made of a conductive substrate 601 and a recording layer 602 formed on the substrate. The needle 604 of each probe 605 is supported by an elastic body 606 capable of elastic deformation.

Assuming that the elastic body 606 has an elastic coefficient of about 0.1 N/m and an elastic deformation amount of about 1 µm, a contact force of the needle with the recording medium is about $10^{-7}$ N.

Upon reception of a position control signal from a position control circuit 613 under the control of a control computer 614, an XYZ driving mechanism 607 drives an XYZ stage 608 on which the recording medium 603 is mounted. A three-dimensional relative motion between the probe 605 and the recording medium 603 is therefore possible. The positions of the probe 604 in the XY-directions and in the Z-direction are adjusted relative to the recording medium 603 so that the tip of the needle 604 becomes in contact with the recording medium 603 at a desired position and with a desired contact force. While the recording medium 603 of the recording/reproducing apparatus is scanned with the probe 605, the tip of the needle 604 of the probe 605 is always kept in contact with the recording medium 603.

With such a contact scan type, even if the surface of the recording medium 603 is irregular, this irregularity is absorbed by the elastic deformation of the elastic body 606 while the recording medium 603 is scanned with the tip of the needle 604 in contact with the medium. Therefore, the contact force of the tip of the needle 604 in contact with the surface of the recording medium 603 is maintained generally constant, and the tip of the needle 604 and the surface of the recording medium 603 are prevented from being broken or destroyed. This contact scan type does not require a piezoelectric element and the like for the z-direction position alignment of each probe, so that the structure of the apparatus can be simplified. The contact scan type is particularly suitable for an apparatus having a plurality of probes.

The feedback control of each probe 605 in the z-direction relative to the recording medium 603 is not necessary. The recording medium 603 can therefore be scanned with the probe at high speed.

A record signal generated from a recording control circuit 611 under the control of the control computer 614 is applied via a switch 609 connected to the record system and via each needle 604 to the recording medium 603. In this manner, information is recorded in a local area of the recording layer 602 in contact with the tip of the needle 604.

The recording layer 602 of the recording/reproducing apparatus is made of a material which changes a current with an applied voltage. A first specific example of this layer is an LB film (a laminate of organic single molecule films formed by the Langmuir-Blodgette method). This LB film has an electric memory effect and is made of polyimide, SOAZ (bis-n-octyl-squalylium azulene) or the like disclosed in JP-A-63-161552 and JP-A-63-161553. As a voltage (about 5 to 10 V) larger than a threshold value is applied across the needle and substrate, the conductivity of the LB film changes (from OFF state to ON state), and as a reproduction bias voltage (0.01 to 2 V) is applied, current increases.

A second specific example is amorphous thin film material such as GeTe, GaSb and SnTe. As voltage is applied across the needle and substrate, heat generated by current changes the amorphous phase of the amorphous thin film material to a crystalline phase. Since the conductivity of the material changes, current increases as a reproduction bias voltage is applied.

A third specific example is oxidizing metal/semiconductor material such as Zn, W, Si and GaAs. As a voltage is applied across the needle and substrate, current flows through the oxidizing metal/semiconductor material which then reacts with oxygen atoms in water or atmospheric air in contact with the material surface, and an oxide film is formed on the surface of the material. Therefore, the contact resistance on the material surface changes and current increases as a bias voltage is applied.

Bits recorded in the above-described manner are reproduced as in the following. A signal line of each probe 605 is switched to the reproduction system by the switch 609. A bias voltage generated by a bias voltage source 610 is applied across the needle 604 and substrate 601, and current flowing therethrough is detected with a reproduction control circuit 612. Since current flows through a record bit on the recording medium more (or less) than through an area without a record bit, the reproduction control circuit 612 can detect a difference between currents to detect a reproduction signal which is supplied to the control computer 614.

The structure and operation of the invention will be described with reference to the accompanying drawings.

Figure 1:
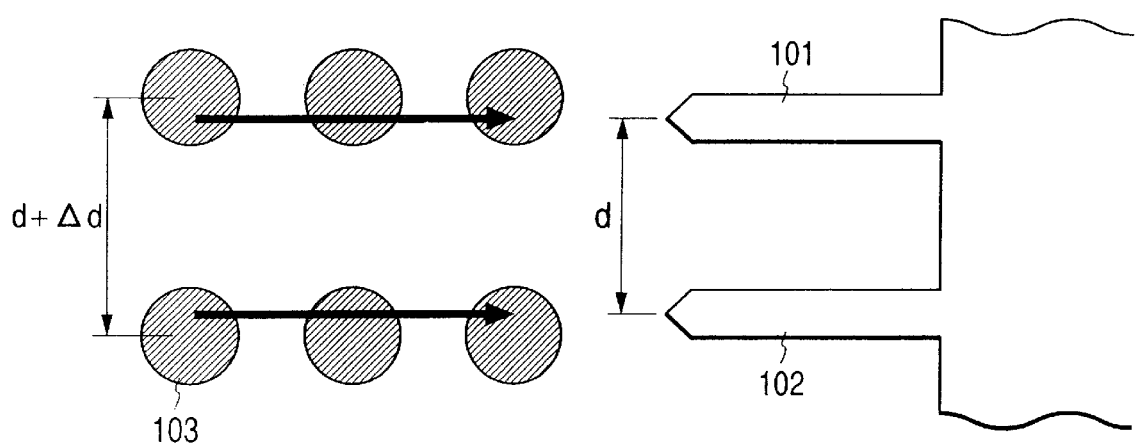
FIG. 1 is a diagram illustrating Embodiment 1 of the invention.

In FIG. 1, d represents a distance between two probes 101 and 102. Tracking bit trains 103 are disposed spaced by the probe distance d+Δd. Although the distance between bit trains is set broader to d+Δd in the example shown in FIG. 1, it may be set narrower to d−Δd.

As the two parallel probes scan the recording medium written with bits in a direction (arrow direction) parallel to the bit trains while a bias voltage is applied, current flowing through the probes and recording medium increases (or decreases) while the probes pass over the bits 103. Outputs of the two probes are supplied to a comparing circuit 204 to compare the current values.

Figure 3:
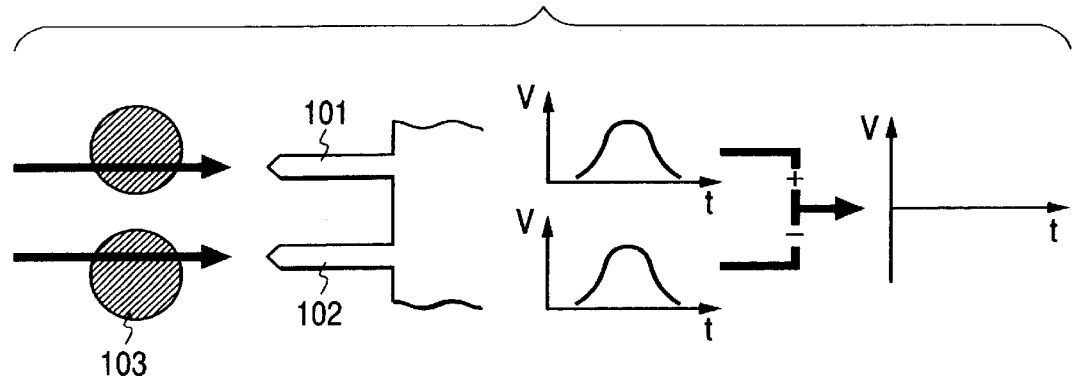
FIG. 3 is a diagram illustrating the principle of a tracking mechanism of the invention.
Figure 4:
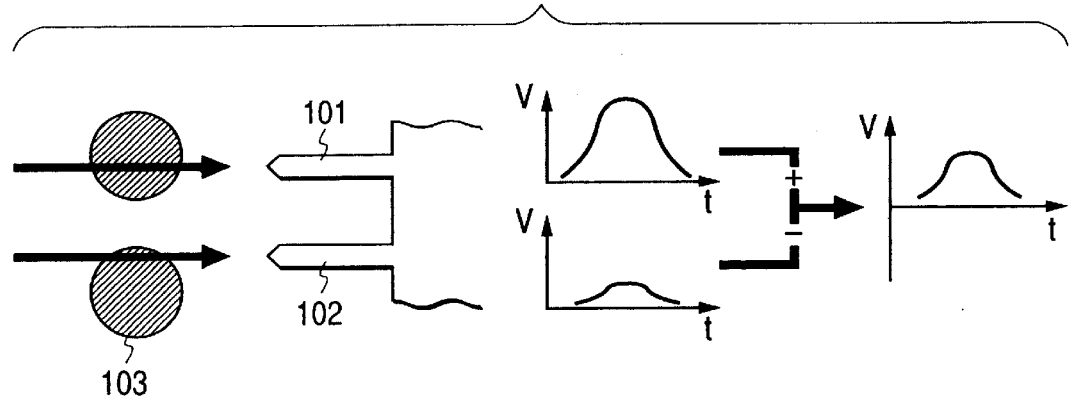
FIG. 4 is a diagram illustrating the principle of a tracking mechanism of the invention.
Figure 5:
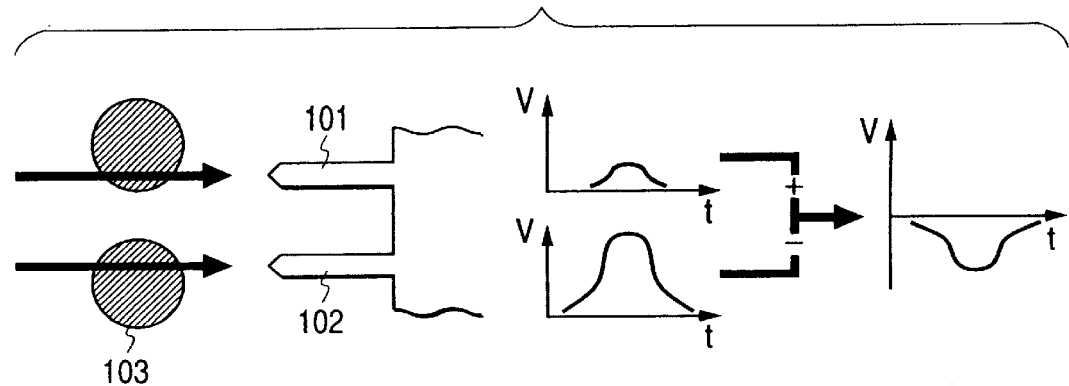
FIG. 5 is a diagram illustrating the principle of a tracking mechanism of the invention.

As shown in FIG. 3, if the probes are at target positions, an error signal will not be output from the comparing circuit. However, as shown in FIG. 4, if the probes are at incorrect positions in the vertical direction relative to the bit trains, an error signal is output from the comparing circuit, having a polarity corresponding to a shifting direction and an absolute value corresponding to a shift amount. Tracking control is performed by using this error signal. Although two probes are used, two or more pairs of probes may be used. In this case, an error signal is a sum of signals from all probes used for tracking. Since averaging is performed, a more robust system can be realized. If the number of probes is sufficiently large, some tracking bit trains may be used as data bit trains, or an odd number of probes may be used because of some manufacture reasons or for possible failure.

If a mechanism of holding the value of a preceding bit until the next bit appears is used, tracking bit trains can be used as data bit trains. This mechanism can deal with those track areas without bits which may occur depending upon recorded data trains.

The invention is applicable not only to the above-described recording/reproducing apparatus, but other types of recording/reproducing apparatuses may also be used such as magnetic recording/reproducing apparatuses and photo-magnetic recording/reproducing apparatuses.

First embodiments of the invention will be described more specifically.

[Embodiment 1]

Figure 2:
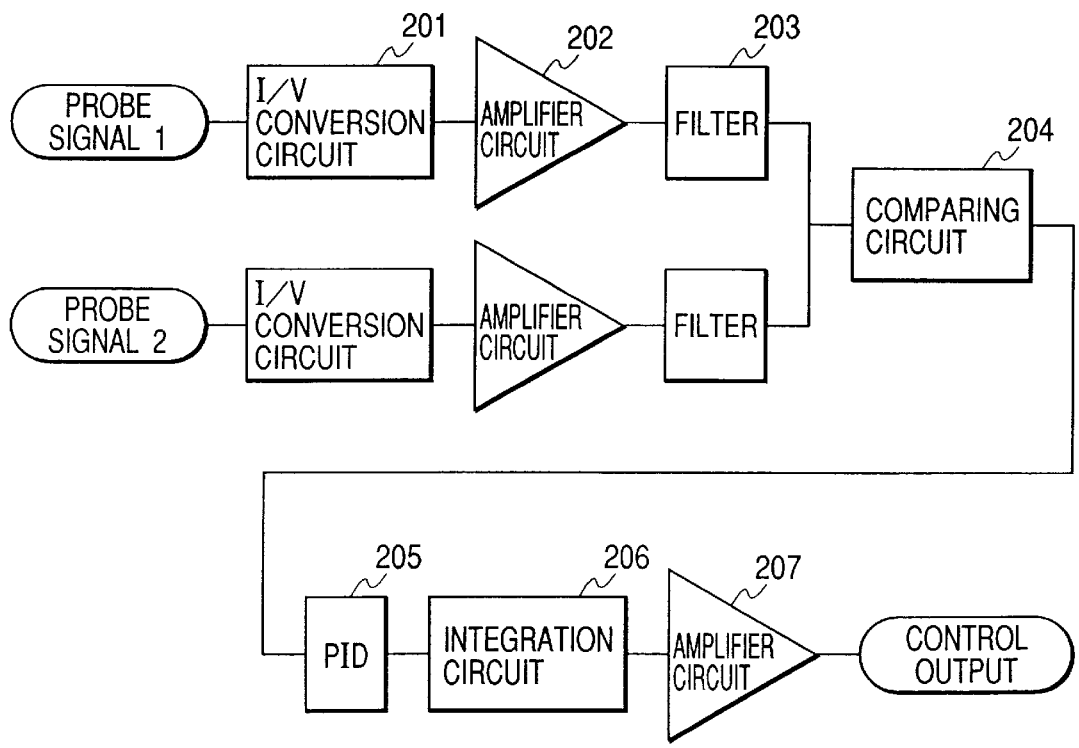
FIG. 2 is a diagram illustrating a tracking mechanism of Embodiment 1.

Embodiment 1 will be described in detail with reference to FIGS. 1 and 2 in which the tracking mechanism of this invention is applied to the recording/reproducing apparatus having the structure described above.

Two probes 101 and 102 integrally formed at a distance of 200 µm were mounted on the apparatus. The recording layer 602 was an LB film of six polyimide single molecular films stacked together. The recording medium was linearly scanned with the two probes by a length of 100 µm at a linear speed of 0.1 mm/s. During the scanning, a voltage pulse was applied 2048 times to the first probe 101. The voltage was 5.5 V and the application time was 0.3 μsec. The diameter of a generated tracking bit was about 10 nm and the bit interval was about 50 nm.

Next, the two probes were set at the original positions, and moved by 4 nm to the second probe side as viewed from the first probe 101. Thereafter, the recording medium was linearly scanned with the probes by a length of 100 μm at a linear speed of 0.1 mm/s. During the scanning, a voltage pulse was applied 2048 times to the second probe 102. The voltage was 5.5 V and the application time was 0.3 μsec. The diameter of a generated tracking bit 103 was about 10 nm and the bit interval was about 50 nm.

Next, a reproduction operation for a bit train was performed during tracking.

The tracking mechanism used by Embodiment 1 will be described with reference to FIG. 2. Current signals of tracking bits output from the two probes are converted by I/V conversion circuits 201 into voltage signals which are amplified by amplifier circuits 202, passed through low-pass filters 203, and input to the comparing circuit 204. The comparing circuit 204 compares the input signals and outputs a voltage signal having a polarity and absolute value corresponding to the difference between the input signals. This voltage signal is passed through a PID filter 205, added with the past history by an integration circuit 206, amplified by an amplifier circuit 207, and added with a position control signal to thereby control the XYZ driving mechanism 607 shown in FIG. 6.

After the two probes were moved to the original positions, the recording medium was scanned with the two probes at a linear speed of 2 mm/s while a bias voltage of 1.5 V was applied to the two probes, by using the tracking mechanism. The reproduction of 50 reciprocal operations was carried out and the reproduction signals were monitored. No reproduction error was found.

[Embodiment 2]

Figure 7:
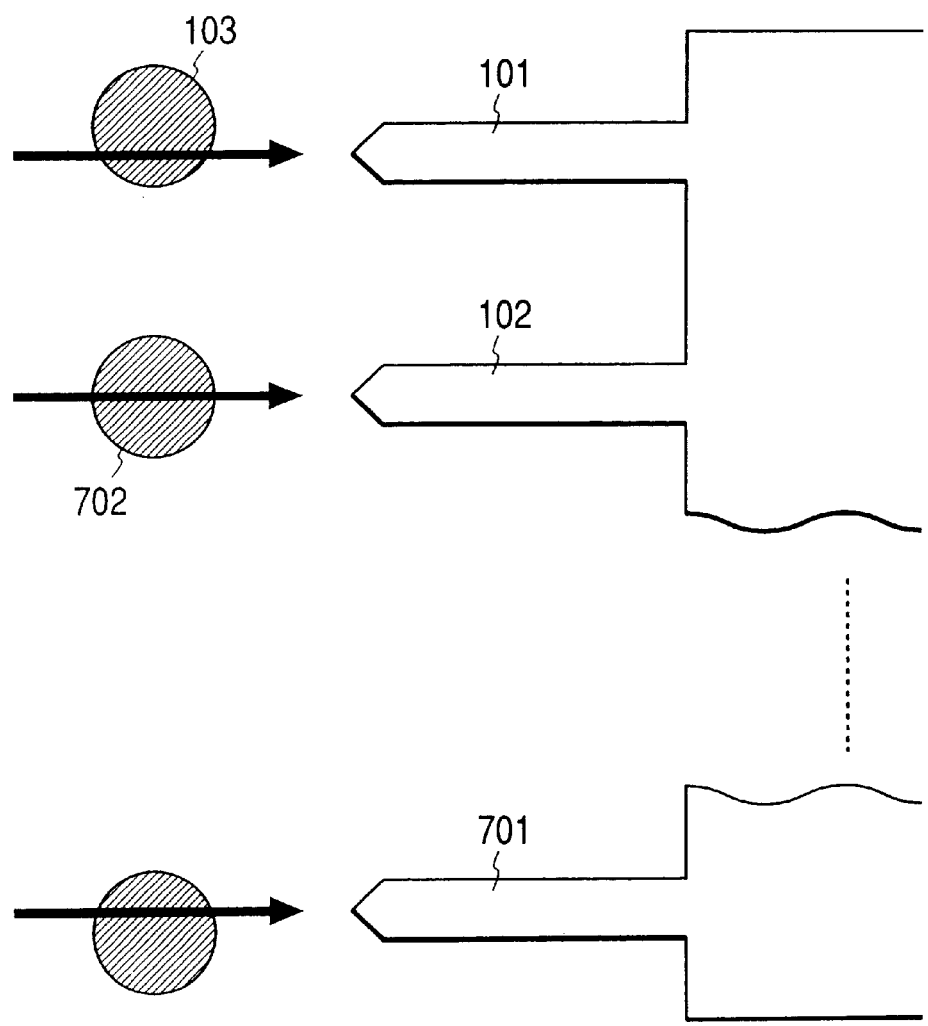
FIG. 7 is a diagram illustrating Embodiment 2 of the invention.
Figure 8:
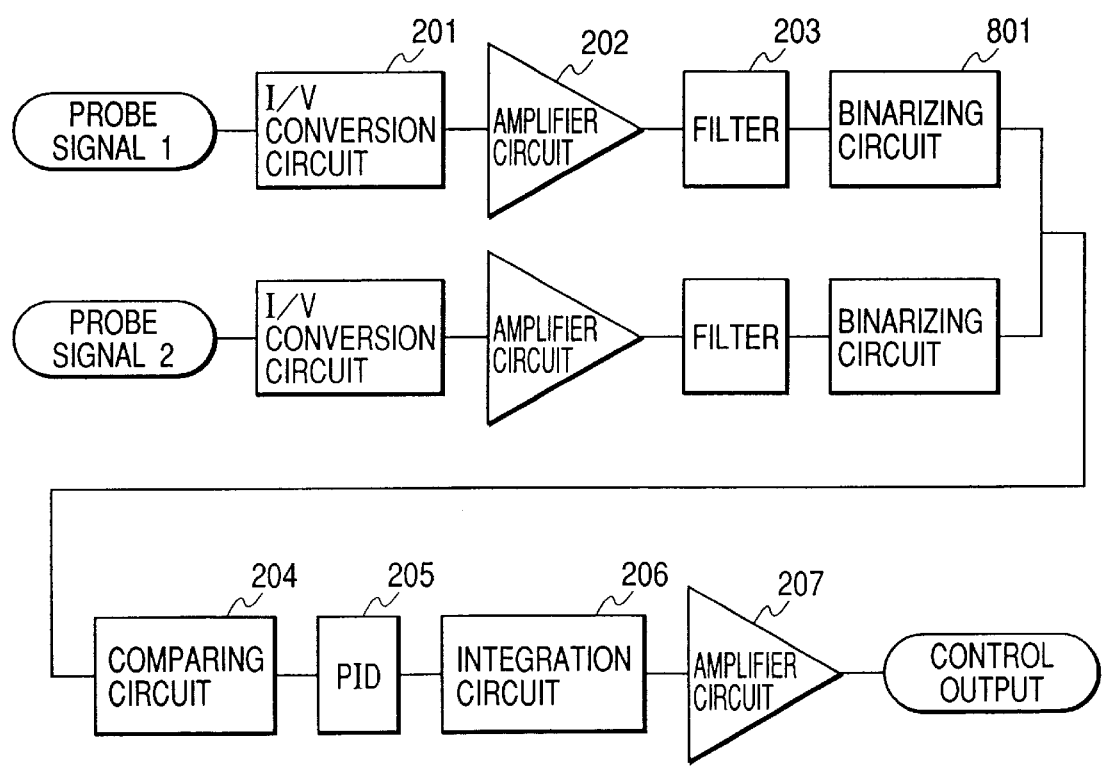
FIG. 8 is a diagram illustrating a tracking mechanism of Embodiment 2 of the invention.

Embodiment 2 will be described in detail with reference to FIGS. 7 and 8 in which the tracking mechanism of this invention is applied to the recording/reproducing apparatus having the structure described above.

One hundred and twenty eight probes integrally formed at a distance of 50 μm were mounted on the apparatus. The recording layer 602 was an LB film of six polyimide single molecular films stacked together. The recording medium was linearly scanned with all the probes by a length of 100 μm at a linear speed of 0.1 mm/s. During the scanning, a voltage pulse was applied 2048 times to the first probe 101. The voltage was 5.5 V and the application time was 0.3 μsec. The diameter of a generated tracking bit 103 was about 10 nm and the bit interval was about 50 nm.

Next, all the probes were set at the original positions, and moved by 4 nm to the 128-th probe side as viewed from the first probe 101. Thereafter, the recording medium was linearly scanned with the probes by a length of 100 μm at a linear speed of 0.1 mm/s. During the scanning, a voltage pulse was applied 2048 times to the 128-th probe 701. The voltage was 5.5 V and the application time was 0.3 μsec. The diameter of a generated tracking bit 103 was about 10 nm and the bit interval was about 50 nm.

Next, an operation of recording data bit trains was performed by using 126 second to 127-th probes during tracking by the first and 128-th probes.

The tracking mechanism used by Embodiment 2 will be described with reference to FIG. 8. Current signals of tracking bits output from first and 128-th probes are converted by I/V conversion circuits 201 into voltage signals which are amplified by amplifier circuits 202, passed through low-pass filters 203, binarized by binarizing circuits 801, and input to the comparing circuit 204. The comparing circuit 204 compares the input signals and outputs a constant voltage signal having a polarity corresponding to the difference between the input signals. This voltage signal is passed through a PID filter 205, added with the past history by an integration circuit 206, amplified by an amplifier circuit 207, and added with a position control signal to thereby control the XYZ driving mechanism 607 shown in FIG. 6.

After all the probes were moved to the original positions, the recording medium was scanned with the first and 128-th probes at a linear speed of 2 mm/s while a bias voltage of 1.5 V was applied to the two probes, by using the tracking mechanism. During this scanning, the recording medium was scanned by 126 second to 127-th probes 102 while a voltage pulse is applied to each probe at a maximum of 2048 times in accordance with data trains prepared in advance. The voltage was 5.5 V and the application time was 0.3 psec. The diameter of a generated data bit 702 was about 10 nm and the bit interval was about 50 nm. The reproduction signals of the first and 128-th probes were monitored and no reproduction error was found.

Next, a reproduction operation for a data bit train was performed during tracking.

After all the probes were moved to the original positions, the recording medium was scanned at a linear speed of 2 mm/s while a bias voltage of 1.5 V was applied to all the probes from first to 128-th, during tracking by the first and 128-th probes by using the tracking mechanism. During the reproduction, reproduction signals of 126 probes from second to 127-th were monitored. The reproduction of 50 reciprocal operations was carried out and no reproduction error was found.

[Embodiment 3]

Figure 9:
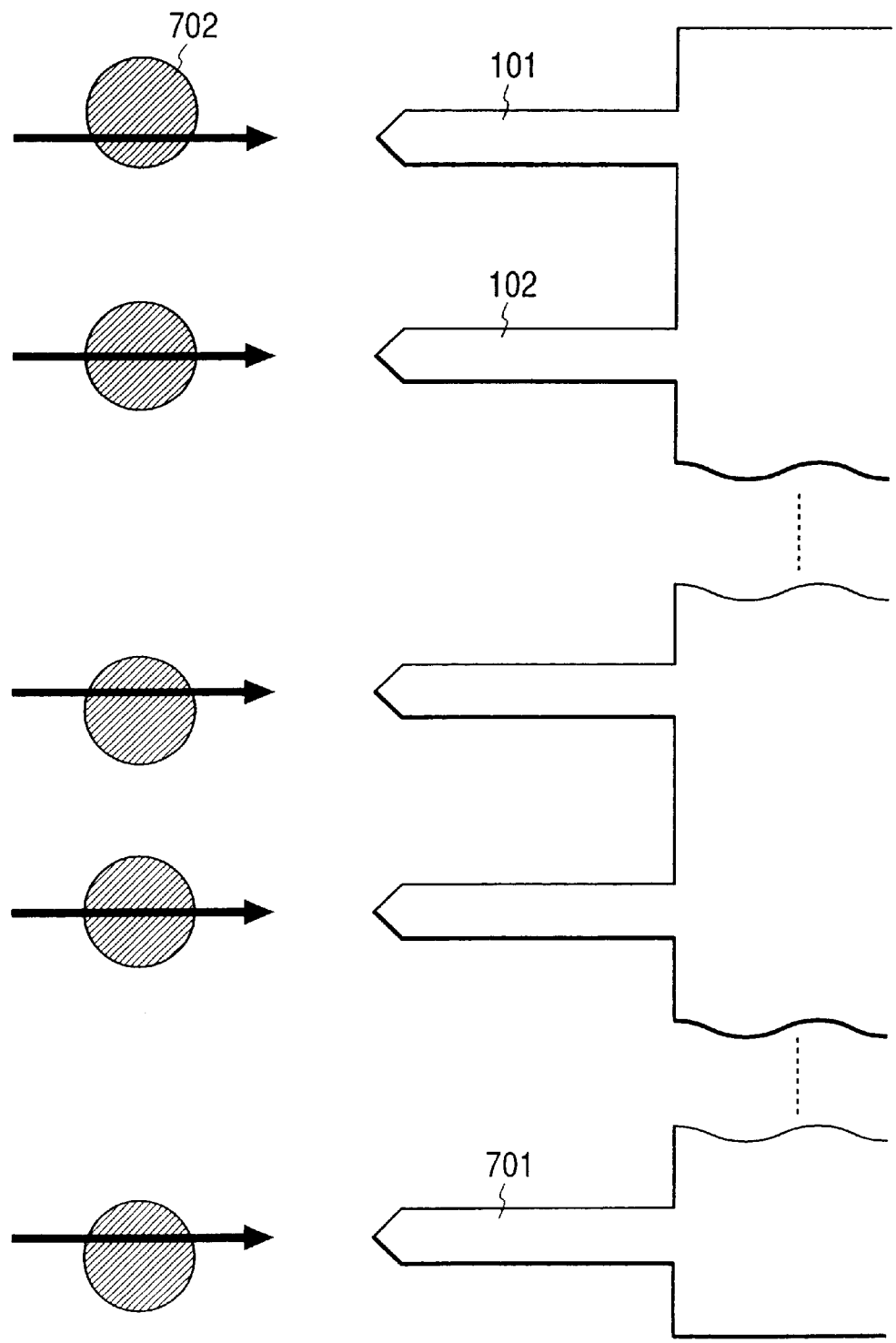
FIG. 9 is a diagram illustrating Embodiment 3 of the invention.
Figure 10:
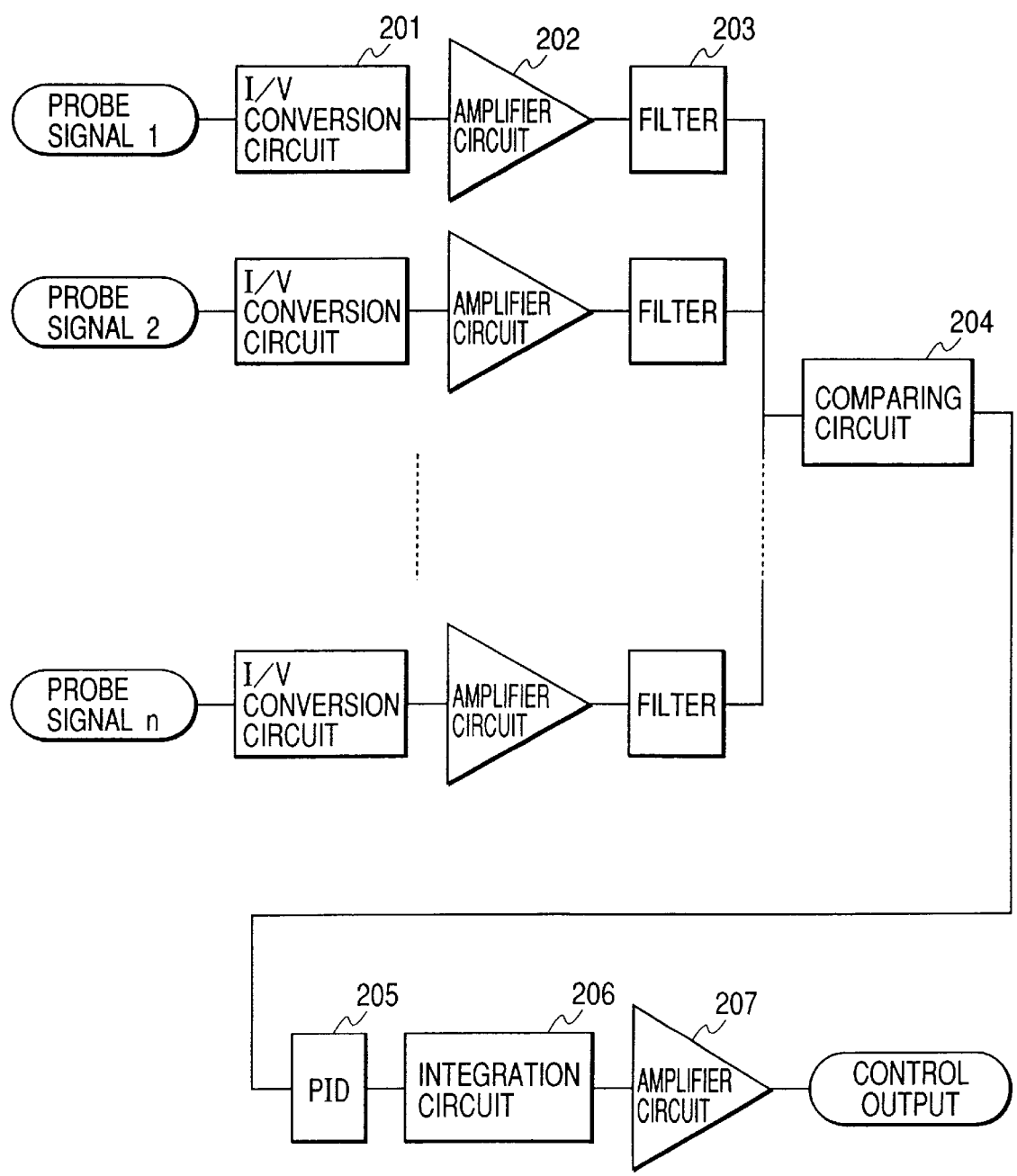
FIG. 10 is a diagram illustrating a tracking mechanism of Embodiment 3 of the invention.

Embodiment 3 will be described in detail with reference to FIGS. 9 and 10 in which the tracking mechanism of this invention is applied to the recording/reproducing apparatus having the structure described above.

One hundred and twenty eight probes integrally formed at a distance of 50 μm were mounted on the apparatus. The recording layer 602 was an LB film of six polyimide single molecular films stacked together. The recording medium was linearly scanned with all the probes by a length of 100 μm at a linear speed of 0.1 mm/s. During the scanning, a voltage pulse was applied to 64 odd number probes at a maximum of 2048 times in accordance with data trains prepared in advance. The voltage was 5.5 V and the application time was 0.3 μsec. The diameter of a generated tracking-data bit 103 was about 10 nm and the bit interval was about 50 nm.

Next, all the probes were set at the original positions, and moved by 4 nm to the 128-th probe 701 side as viewed from the first probe 101. Thereafter, the recording medium was linearly scanned with the probes by a length of 100 μm at a linear speed of 0.1 mm/s. During the scanning, a voltage pulse was applied to 64 even number probes at a maximum of 2048 times in accordance with data trains prepared in advance. The voltage was 5.5 V and the application time was 0.3 μsec. The diameter of a generated tracking-data bit 103 was about 10 nm and the bit interval was about 50 nm.

Next, an operation of reproducing tracking-data bit trains was performed by using all the probes during tracking.

The tracking mechanism used by Embodiment 3 will be described with reference to FIG. 10. Current signals of tracking-data bits output from all the probes are converted by I/V conversion circuits 201 into voltage signals which are amplified by amplifier circuits 202, passed through low-pass filters 203, and input to the comparing circuit 204. The comparing circuit 204 compares the sum of signals from the odd number probes with the sum of signals from the even number probes, and outputs a voltage signal having a polarity and absolute value corresponding to the difference between the sums. This voltage signal is passed through a PID filter 205, added with the past history by an integration circuit 206, amplified by an amplifier circuit 207, and added with a position control signal to thereby control the XYZ driving mechanism 607 shown in FIG. 6.

After all the probes were moved to the original positions, the recording medium was scanned with all the probes at a linear speed of 2 mm/s while a bias voltage of 1.5 V was applied thereto, by using the tracking mechanism. During this scanning, the reproduction signals of all the probes were monitored and no reproduction error was found for the reproduction of 50 reciprocal operations.

Next, an output from the first probe to the tracking mechanism was disconnected and the operation of reproducing data tracking-data bit trains was carried out. No tracking operation failure was observed.

[Embodiment 4]

Figure 11:
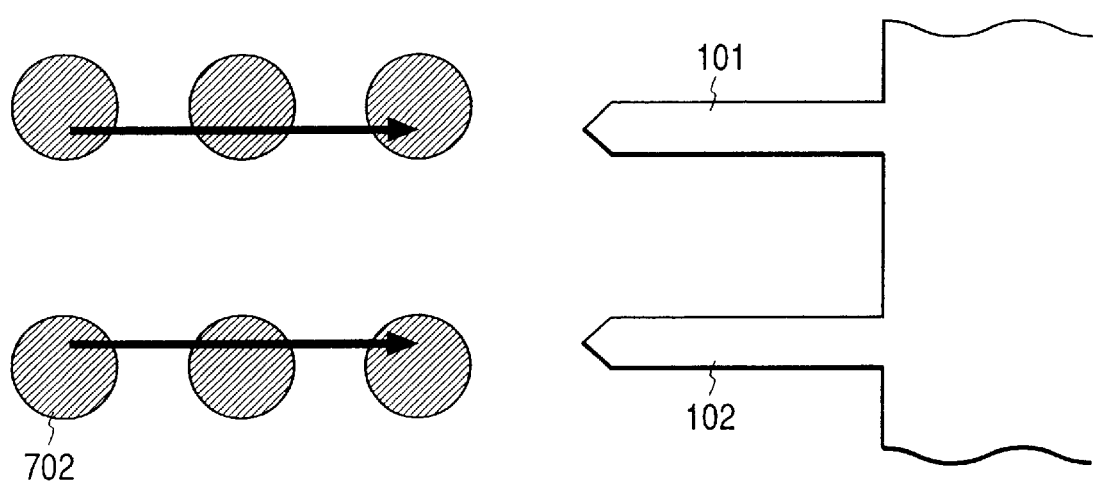
FIG. 11 is a diagram illustrating Embodiment 4 of the invention.
Figure 12:
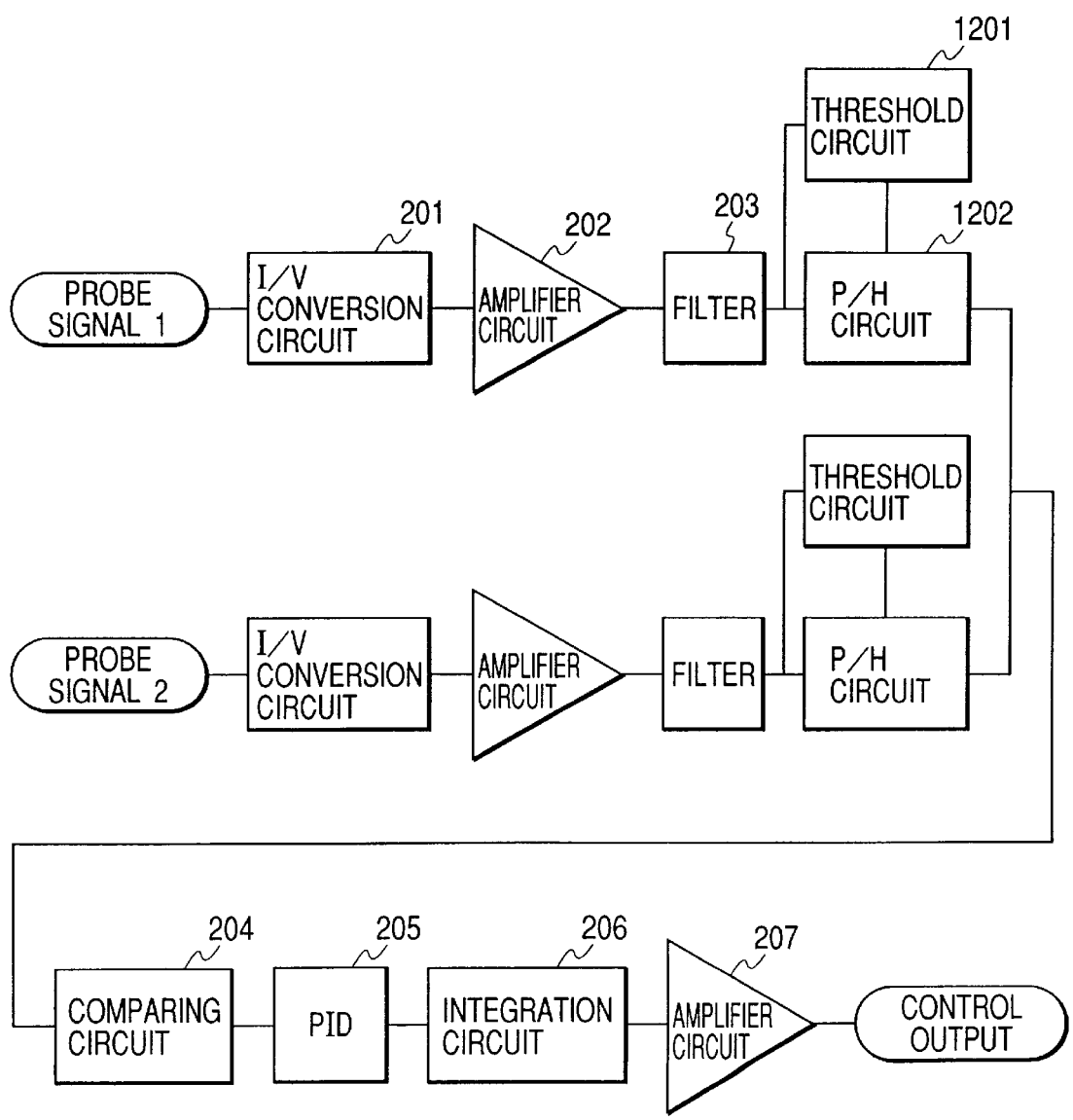
FIG. 12 is a diagram illustrating a tracking mechanism of Embodiment 4 of the invention.

Embodiment 4 will be described in detail with reference to FIGS. 11 and 12 in which the tracking mechanism of this invention is applied to the recording/reproducing apparatus having the structure described above.

Two probes integrally formed at a distance of 200 $\mu$m were mounted on the apparatus. The recording layer 602 was an LB film of six polyimide single molecular films stacked together. The recording medium was linearly scanned with the two probes by a length of 100 $\mu$m at a linear speed of 0.1 mm/s. During the scanning, a voltage pulse was applied to the first probe 101 at a maximum of 2048 times in accordance with data trains prepared in advance. The voltage was 5.5 V and the application time was 0.3 $\mu$sec. The diameter of a generated tracking-data bit was about 10 nm and the bit interval was about 50 nm.

Next, the two probes were set at the original positions, and moved by 4 nm to the second probe 102 side as viewed from the first probe 101. Thereafter, the recording medium was linearly scanned with the probes by a length of 100 $\mu$m at a linear speed of 0.1 mm/s. During the scanning, a voltage pulse was applied to the second probe 102 at a maximum of 2048 times in accordance with data trains prepared in advance. The voltage was 5.5 V and the application time was 0.3 $\mu$sec. The diameter of a generated tracking-data bit 103 was about 10 nm and the bit interval was about 50 nm.

Next, a reproduction operation for a tracking-data bit train was performed during tracking, by using the two probes.

The tracking mechanism used by Embodiment 4 will be described with reference to FIG. 12. Current signals of tracking-data bits output from the two probes are converted by I/V conversion circuits 201 into voltage signals which are amplified by amplifier circuits 202, passed through low-pass filters 203, and input to a threshold value circuit 1201 and to a peak hold (P/H) circuit 1202. The threshold value circuit 1201 outputs a reset signal to the peak hold circuit 1202 when a signal voltage exceeds a predetermined voltage value. The peak hold circuit 1202 continues to output the held peak voltage to the comparing circuit 204. The comparing circuit 204 compares a signal from the first probe with a signal from the second probe, and outputs a voltage signal having a polarity and absolute value corresponding to the difference between the input signals. This voltage signal.is passed through a PID filter 205, added with the past history by an integration circuit 206, amplified by an amplifier circuit 207, and added with a position control signal to thereby control the XYZ driving mechanism 607 shown in FIG. 6.

After the two probes were moved to the original positions, the recording medium was scanned with the two probes at a linear speed of 2 mm/s while a bias voltage of 1.5 V was applied to the two probes, by using the tracking mechanism. During the scanning, reproduction signals from the two probes were monitored. The reproduction of 50 reciprocal operations was carried out no reproduction error was found.

Second Embodiments

In this invention, tracking bit trains are generated, for example, by a pair of tracking probes, and an apparent distance between tracking probes is changed by changing the relative angle between the tracking probe pair and tracking bit trains in a plane parallel to the surface of a recording medium. In this state, a reproduction operation is carried out for the tracking bit trains, and reproduction signals are compared. In this manner, high precision and high stability tracking becomes possible by using the method same as data recording/reproducing.

If a reproduction signal of a preceding tracking bit is held, it is possible to deal with a bit reproduction timing shift between tracking bit trains or to record/reproduce address data or other data by using tracking bit trains.

Second embodiments of the invention will be described with reference to the accompanying drawings.

Figure 13:
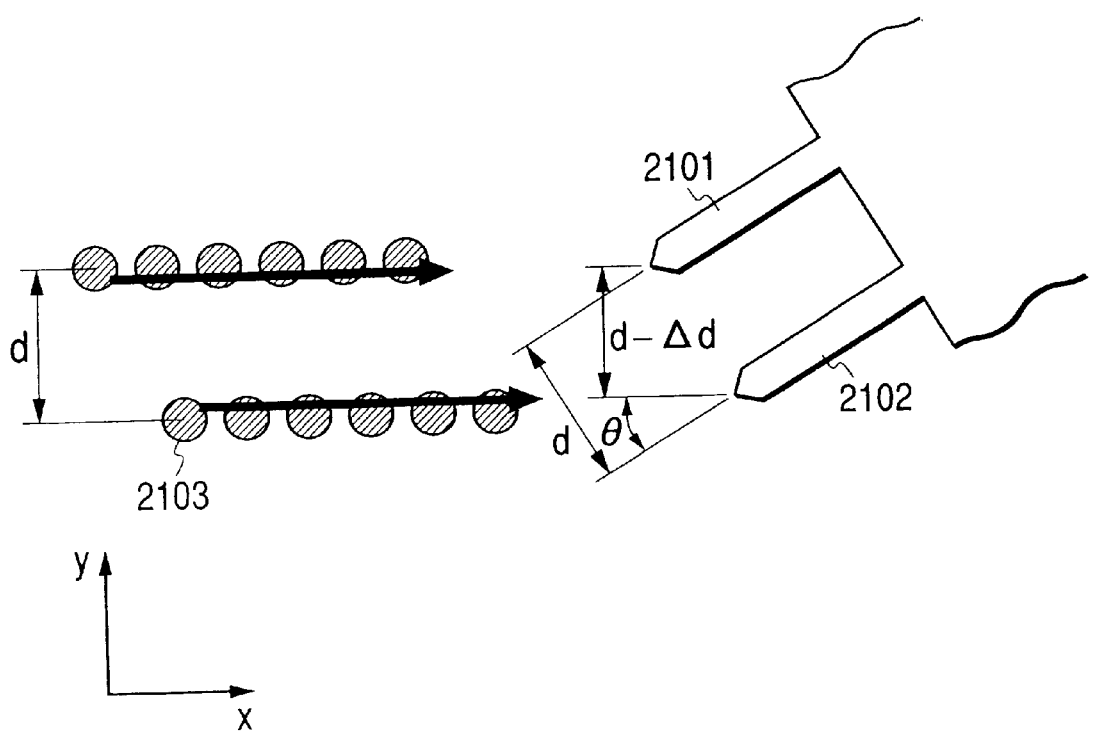
FIG. 13 is a diagram illustrating Embodiment 21 of the invention.

By using two tracking probes 2101 and 2102 disposed at a distance of d, two tracking bit trains are formed. Thereafter, as shown in FIG. 13, a relative angle between the two tracking probes and tracking bit trains is changed by an angle $\theta$. An apparent distance between tracking probes relative to the distance between tracking bit trains is therefore changed. Although the apparent distance between probes is narrowed by $\Delta d$ in the example shown in FIG. 13, it is obvious that it may be broadened by $\Delta d$.

As the two probes scan the recording medium written with tracking bit trains in a direction (arrow direction) parallel to the bit trains while a bias voltage is applied, current flows through the probes and recording medium while the probes pass over the tracking bits 2103. Outputs of the two probes are supplied to a comparing circuit 2204 shown in FIG. 14 to compare the reproduction outputs of the tracking bits 2103.

Figure 15:
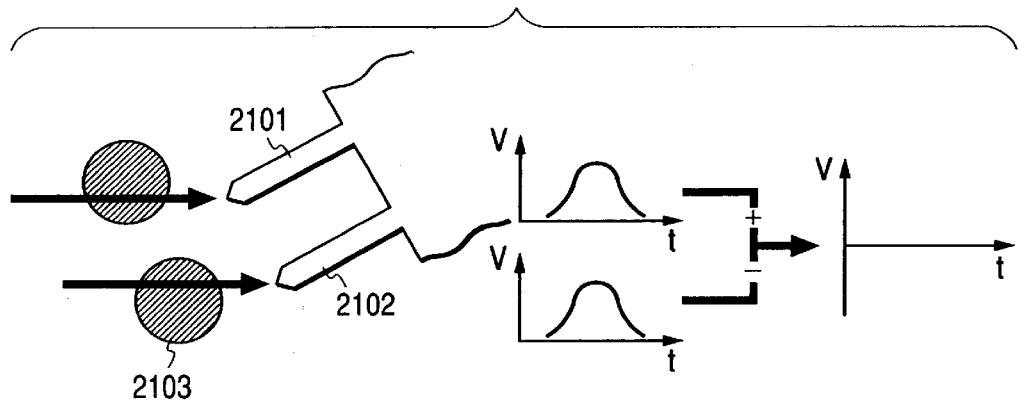
FIG. 15 is a diagram illustrating the principle of a tracking mechanism of the invention.
Figure 16:
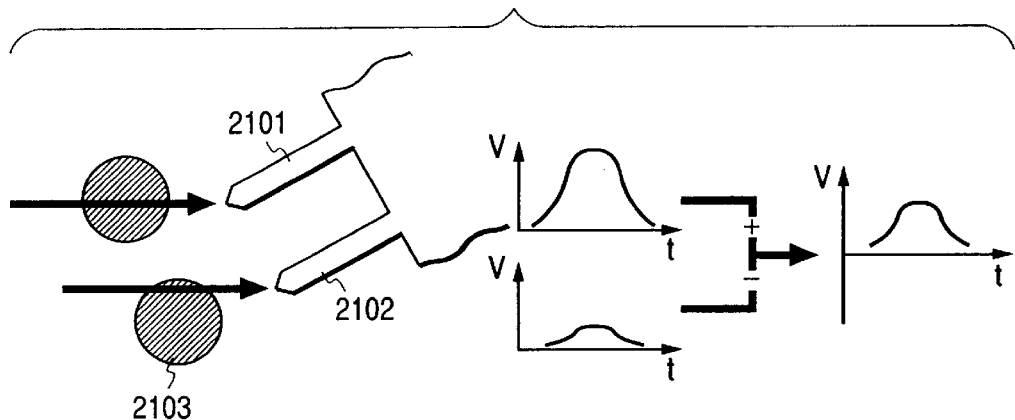
FIG. 16 is a diagram illustrating the principle of a tracking mechanism of the invention.
Figure 17:
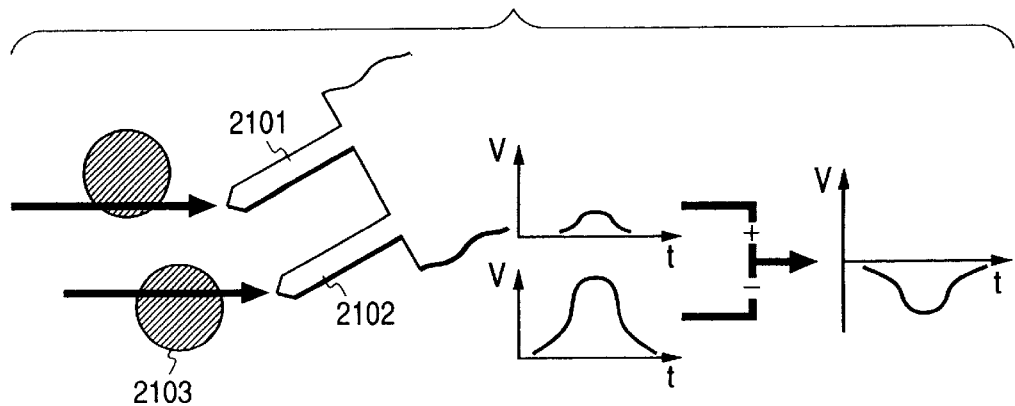
FIG. 17 is a diagram illustrating the principle of a tracking mechanism of the invention.

As shown in FIG. 15, if the probes are at target positions, an error signal will not be output from the comparing circuit 2204. However, as shown in FIGS. 16 and 17, if the probes are at incorrect positions in the vertical direction relative to the tracking bit trains, an error signal is output from the comparing circuit 2204, having a polarity corresponding to a shifting direction and an absolute value corresponding to a shift amount. By using this error signal, an XYZ driving stage 2608 is controlled.

Address data or other data may be written on tracking bit trains.

If the positions of the two tracking probes along the recording/reproducing scan direction displace greatly or if the two tracking probes record different data as tracking bit trains, respectively because of the angle change for regulating the apparent distance between probes, then only one probe may sometimes reproduce tracking bits 2103. In such a case, a reproduction signal of a preceding tracking bit 2103 is held until the next tracking bit appears. By using this held reproduction signal, the above problems can be dealt with and the tracking becomes possible.

Figure 18:
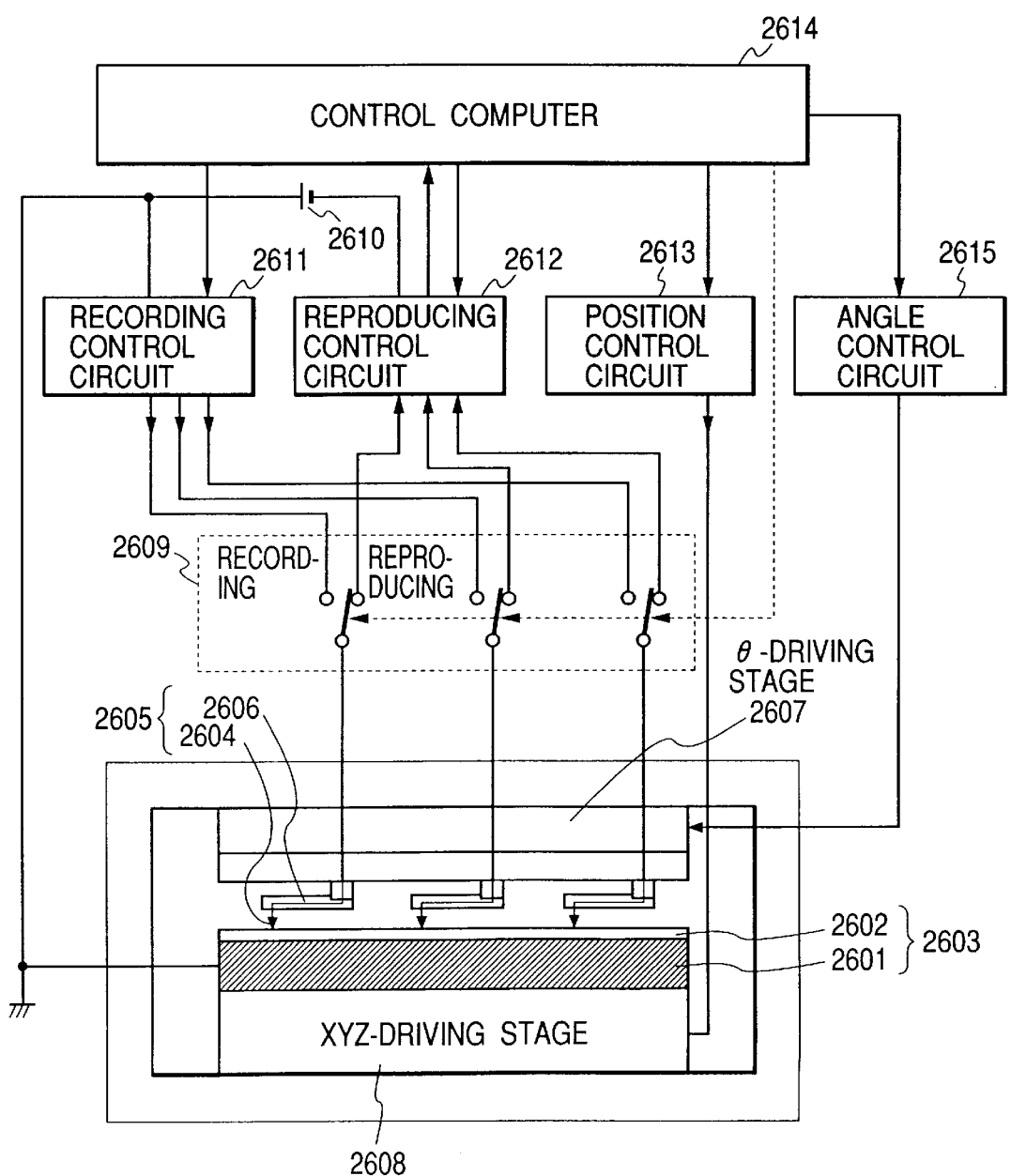
FIG. 18 is a schematic diagram showing the overall structure of a recording/reproducing apparatus embodying the invention.

The invention is applicable not only to the above-described recording/reproducing apparatus, but other types of recording/reproducing apparatuses may also be used such as magnetic recording/reproducing apparatuses, photomagnetic recording/reproducing apparatuses, and near field optical recording/reproducing apparatuses. The outline of a recording/reproducing apparatus embodying the invention will be described with reference to FIG. 18.

A plurality of probes 2605 are disposed with their needles 2604 being brought in contact with a recording medium 2603 made of a conductive substrate 2601 and a recording layer 2602 formed on the substrate. The needle 2604 of each probe 2605 is supported by an elastic body 2606 capable of elastic deformation.

Assuming that the elastic body 2606 has an elastic coefficient of about 0.1 N/m and an elastic deformation amount of about 1 $\mu$m, a contact force of the needle with the recording medium is about $10^{-7}$ N.

Upon reception of a position control signal from a position control circuit 2613 under the control of a control computer 2614, an XYZ driving stage 2608 on which the recording medium 2603 is mounted, is driven. A three-dimensional relative motion between the probe 2605 and the recording medium 2603 is therefore possible. The positions of the probe 2604 in the XY-directions and in the Z-direction are adjusted relative to the recording medium 2603 so that the tip of the needle 2604 becomes in contact with the recording medium 2603 at a desired position and with a desired contact force. While the recording medium 2603 of the recording/reproducing apparatus is scanned with the probe 2605, the tip of the needle 2604 of the probe 2605 is always kept in contact with the recording medium 2603.

With such a contact scan type, even if the surface of the recording medium 2603 is irregular, this irregularity is absorbed by the elastic deformation of the elastic body 2606 while the recording medium 2603 is scanned with the tip of the needle 2604 in contact with the medium. Therefore, the contact force of the tip of the needle 2604 in contact with the surface of the recording medium 2603 is maintained generally constant, and the tip of the needle 2604 and the surface of the recording medium 2603 are prevented from being broken or destroyed. This contact scan type does not require a piezoelectric element and the like for the z-direction position alignment of each probe, so that the structure of the apparatus can be simplified. The contact scan type is particularly suitable for an apparatus having a plurality of probes.

The feedback control of each probe 2605 in the z-direction relative to the recording medium 2603 is not necessary. The recording medium 2603 can therefore be scanned with the probe at high speed.

Upon reception of an angle signal generated from an angle control circuit 2615 under the control of the control computer 2614, a θ driving stage 2607 on which the probe 2605 is mounted is driven, so that the angle between the probe 2605 and recording medium 2603 changes in the plane parallel to the surface of the recording medium 2603.

A record signal generated from a recording control circuit 2611 under the control of the control computer 2614 is applied via a switch 2609 connected to the record system and via each needle 2604 to the recording medium 2603. In this manner, information is recorded in a local area of the recording layer 2602 in contact with the tip of the needle 2604.

The recording layer 602 of the recording/reproducing apparatus is made of a material same as those described with the first embodiments.

Bits recorded in the above-described manner are reproduced as in the following. A signal line of each probe 2605 is switched to the reproduction system by the switch 2609. A bias voltage generated by a bias voltage source 2610 is applied across the needle 2604 and substrate 2601, and current flowing therethrough is detected with a reproduction control circuit 2612. Since current flows through a record bit on the recording medium more (or less) than through an area without a record bit, the reproduction control circuit 2612 can detect a difference between currents to detect a reproduction signal which is supplied to the control computer 2614.

Second embodiments of the invention will be described more specifically.

[Embodiment 21]

Embodiment 21 will be described in detail with reference to the accompanying drawings in which the tracking mechanism of this invention is applied to the recording/reproducing apparatus having the structure described above.

Figure 19:
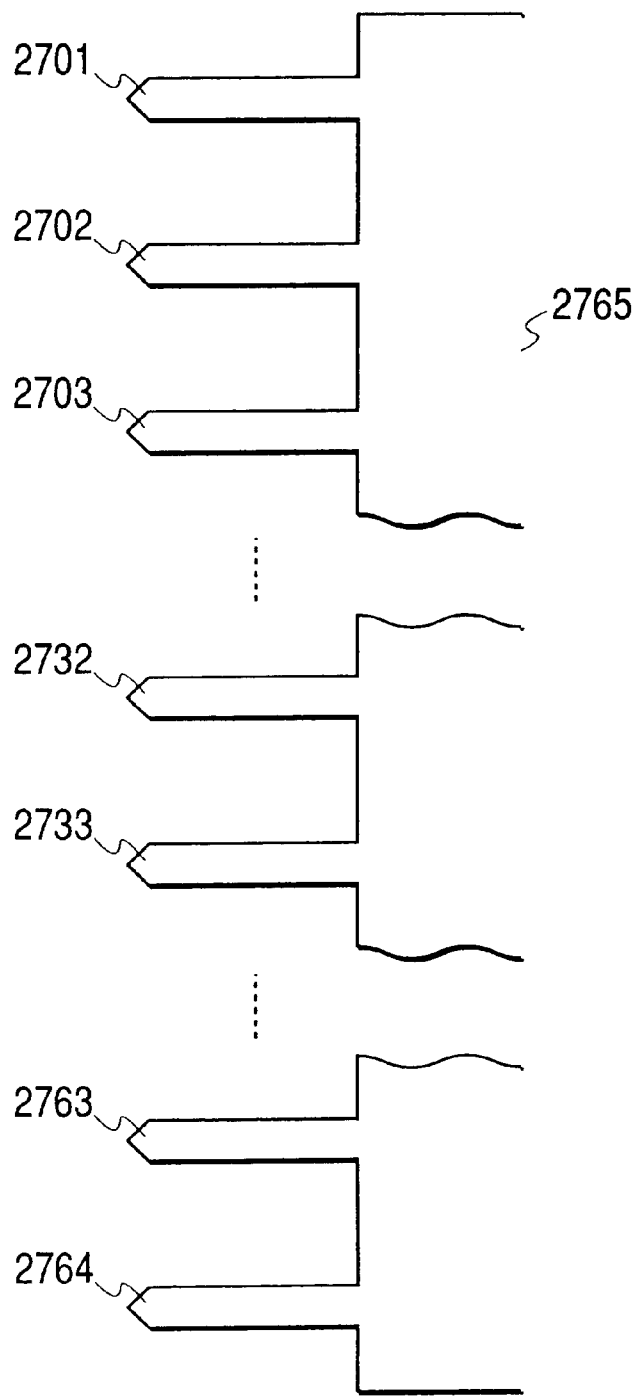
FIG. 19 is a diagram showing the structure of a probe array used with Embodiment 21 of the invention.

A probe array 2765 shown in FIG. 19 and made of 64 probes integrally formed at a distance of 100 $\mu$m was mounted on the apparatus. Of these 64 probes, the probes 2732 and 2733 were used as tracking probes 2101 and 2102, and the remaining 62 probes were used as recording/reproducing probes. A direction of the tip of the needle of the tracking probe 2102 viewing the tip of the needle of the tracking probe 2101 is defined as a positive Y-direction. A counter-clockwise direction about a direction of the probe array 2765 vertically viewing the surface of the recording medium 2603 is defined as a positive θ rotation direction. A direction of the positive Y-direction rotated by $\pi/2$ rad along the negative θ rotation direction is defined as a positive X-direction.

Next, the recording medium was linearly scanned with the probe array 2765 by a length of 110 $\mu$m at a linear speed of 0.1 mm/s in the positive X-direction in FIG. 13. During the scanning, a voltage pulse was applied 2048 times to the tracking probes 2102 and 2101 relative to the substrate 2601 at an interval of 50 nm along the scan direction, the first voltage pulse application position of the tracking probe 2102 being displaced by 900 nm along the scan direction from the first voltage pulse application position of the tracking probe 2101. The voltage was 5.5 V and the application time was 0.3 $\mu$sec. The diameter of a generated tracking bit 103 was about 10 nm.

Next, the probe array 2765 was moved by 110 $\mu$m along the negative X-direction in FIG. 13 and by 100 nm along the positive Y-direction in FIG. 13. Thereafter, the tracking bits were formed in a similar manner as above. This operation was repeated to form 10 tracking bit trains for each tracking probe at an interval of 100 nm in the Y-direction in FIG. 13.

Next, the probe array 2765 was moved to the original position and rotated by 0.009 rad in the positive θ rotation direction about the tip of the needle of the tracking probe 2101 in the plane parallel to the surface of the recording medium 2603. Therefore, the distance between the two tracking probes in the Y-direction in FIG. 13 was narrowed by 4 nm, and the tip of the needle of the tracking probe 2102 was displaced by 900 nm in the positive X-direction from the tip of the needle of the tracking probe 2101 so that the two probes pass over the tracking bits 2103 at the same time during scanning.

Next, while the tracking was performed by using the tracking probes 2101 and 2102, the remaining 62 recording/reproducing probes were used for recording data bit trains.

Figure 14:
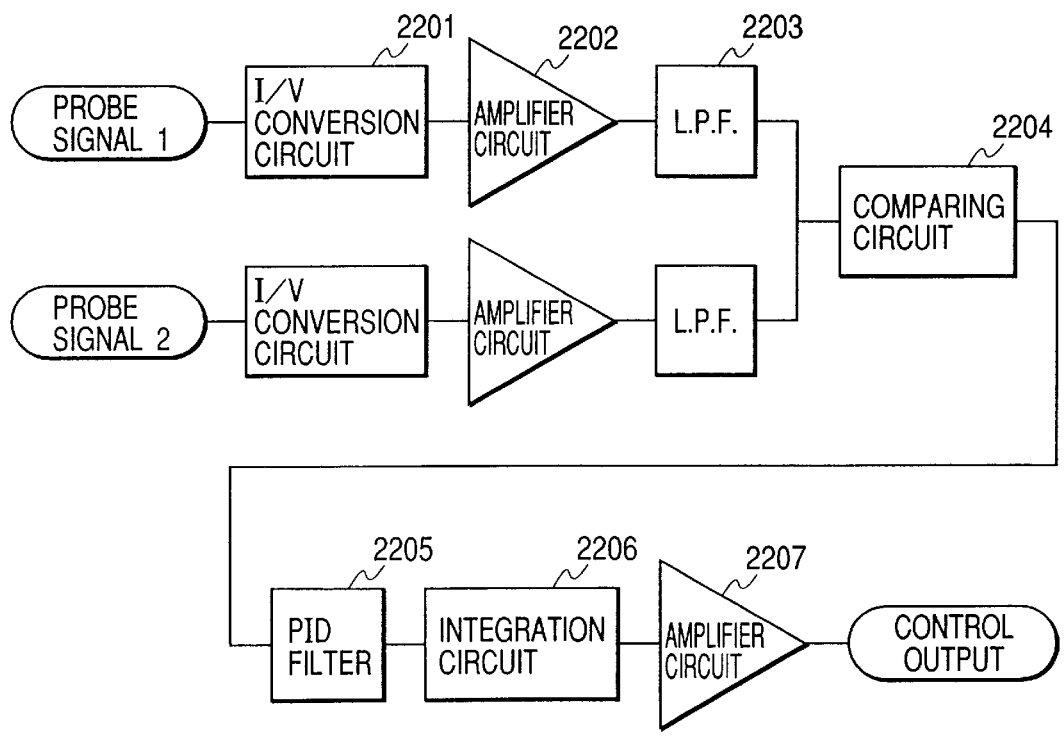
FIG. 14 is a diagram illustrating a tracking mechanism of Embodiment 21.

The tracking mechanism used by Embodiment 21 will be described with reference to FIG. 14. Current signals of tracking bit reproduction from the two tracking probes are converted by I/V conversion circuits 2201 into voltage signals which are amplified by amplifier circuits 2202, passed through low-pass filters 2203, and input to the comparing circuit 2204. The comparing circuit 204 compares the input signals and outputs a voltage signal having a polarity and absolute value corresponding to the difference between the input signals. This voltage signal is passed through a PID filter 2205, added with the past history by an integration circuit 2206, amplified by an amplifier circuit 2207, and added with a position control signal to thereby control the XYZ driving stage 2608 shown in FIG. 18.

The recording medium was scanned by a length of 100 $\mu$m in the positive X-direction in FIG. 13 with the tracking probes 2101 and 2102 at a linear speed of 2 mm/s while a bias voltage of 1.5 V was applied to the two probes relative to the substrate 2601, by using the tracking mechanism. During this scanning, the recording medium was scanned by the remaining recording/reproducing probes while a voltage pulse was applied to each probe relative to the substrate 2601 at a maximum of 2048 times in accordance with data trains prepared in advance. The voltage was 5.5 V and the application time was 0.3 $\mu$sec. The diameter of a generated data bit 702 was about 10 nm and the bit interval was about 50 nm. Next, the probe array 2765 was moved by 100 $\mu$m along the negative X-direction in FIG. 13 and by 100 nm in the positive Y-direction in FIG. 13. Thereafter, scanning was performed and data bit trains were formed in a manner similar to the above. This operation was repeated to generate 10 data bit trains for each recording/reproducing probe. During the scanning, the tracking bit reproduction signals by the tracking probes 2101 and 2102 were monitored and no reproduction error was found.

Next, a reproduction operation for a data bit train was performed during tracking. After the probe array 2765 was moved to the original position, the recording medium was scanned at a linear speed of 2 mm/s while a bias voltage of 1.5 V was applied to all the probes of the probe array, during tracking by the tracking probes 2101 and 2102 by using the tracking mechanism. During the reproduction, reproduction signals of all recording/reproducing probes were monitored. The reproduction of 50 reciprocal operations was carried out for all data bits and no reproduction error was found. Reproduction signals of the tracking bits by the tracking probes 2101 and 2102 were monitored during tracking and no reproduction error was found.

[Embodiment 22]

Embodiment 22 will be described in detail with reference to the accompanying drawings in which the tracking mechanism of this invention is applied to the recording/reproducing apparatus having the structure described above.

A probe array 2765 shown in FIG. 19 and made of 64 probes integrally formed at a distance of 100 $\mu$m was mounted on the apparatus. Of these 64 probes, the 32-nd and 33-rd probes 2732 and 2733 were used as tracking probes 2101 and 2102, and the remaining 62 probes were used as recording/reproducing probes. A counter-clockwise direction about a direction of the probe array 2765 vertically viewing the surface of the recording medium 2603 is defined as a positive θ rotation direction. A direction of the tip of the needle of the tracking probe 2102 viewing the tip of the needle of the tracking probe 2101, rotated by πn/6 rad along the negative θ rotation direction, is defined as a positive Y-direction. A direction of the positive Y-direction rotated by πn/2 rad along the negative θ rotation direction is defined as a positive X-direction.

Next, the probe array 2765 was rotated relative to the recording medium 2603 by 0.001 rad along the positive θ rotation direction about the tip of the needle of the tracking probe 2101 in the plane parallel to the surface of the recording medium 2603. Thereafter, the recording medium was linearly scanned with the probe array 2765 by a length of 100 $\mu$m at a linear speed of 0.1 mm/s in the positive X-direction in FIG. 20. During the scanning, a voltage pulse was applied at a maximum of 2048 times to the tracking probes 2102 and 2101 relative to the substrate 2601 at an interval of 50 nm along the scan direction, in accordance with two types of data trains prepared in advance. The voltage was 5.5 V and the application time was 0.3 $\mu$sec. The diameter of a generated tracking bit was about 10 nm.

Figure 20:
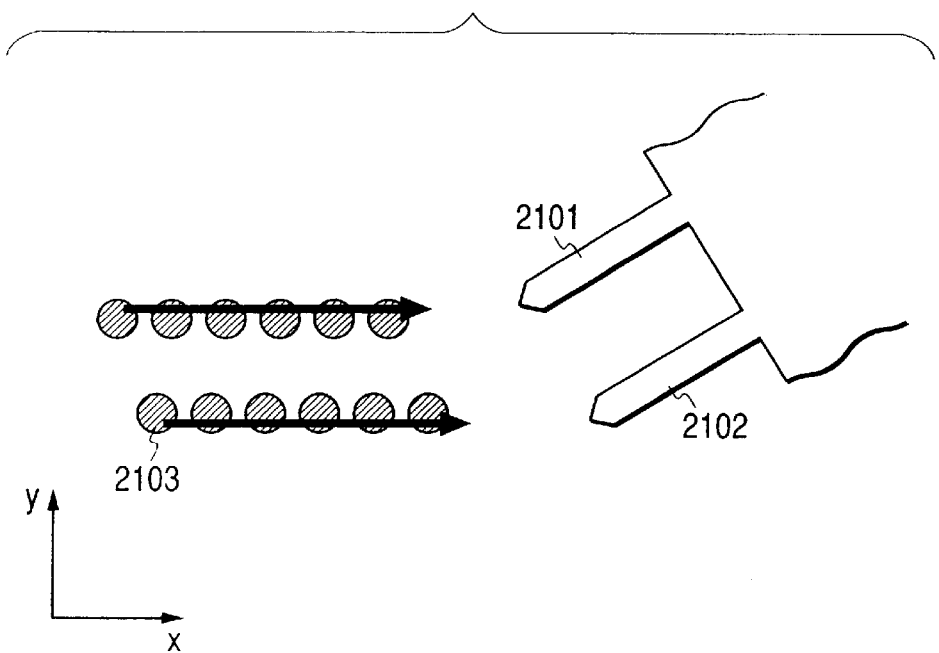
FIG. 20 is a diagram illustrating Embodiment 22 of the invention.

Next, the probe array 2765 was moved by 100 $\mu$m along the negative X-direction in FIG. 20 and by 100 nm along the positive Y-direction in FIG. 20. Thereafter, the tracking bits were formed in a similar manner as above. This operation was repeated to form 10 tracking bit trains for each tracking probe at an interval of 100 nm.

Next, the probe array 2765 was set to the original position and angle. The distance between two tracking probes in the Y-direction in FIG. 20 was broadened by 5 nm, and the distance in the X-direction was narrowed by 8.6 nm.

Next, while the tracking was performed by using the tracking probes 2101 and 2102, the remaining 62 recording/reproducing probes were used for recording data bit trains.

Figure 21:
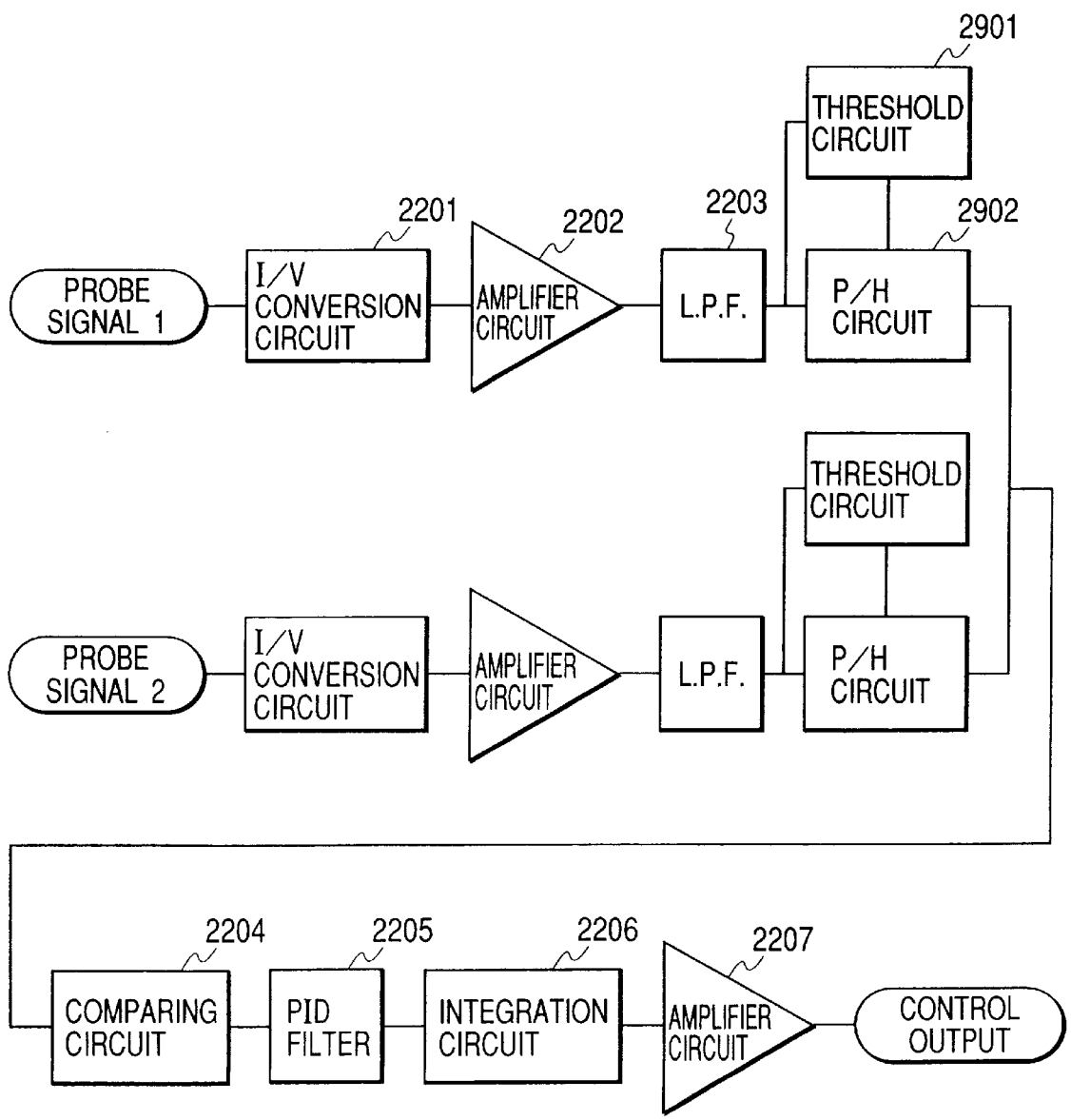
FIG. 21 is a diagram illustrating a tracking mechanism of Embodiment 22 of the invention.

The tracking mechanism used by Embodiment 22 will be described with reference to FIG. 21. Current signals of tracking bit reproduction by the two tracking probes are converted by I/V conversion circuits 2201 into voltage signals which are amplified by amplifier circuits 2202, passed through low-pass filters 2203, and input to a threshold value circuit 2901 and to a peak hold (P/H) circuit 2901. The threshold value circuit 2901 outputs a reset signal to the peak hold circuit (P/H circuit) 2902 when a signal voltage exceeds a predetermined voltage value. The peak hold circuit (P/H circuit) 2902 outputs an input maximum voltage value to the comparing circuit 2204. In Embodiment 22, even if signal input timings from the two tracking probes are shifted, or even if there are some missing tracking bits, a maximum value of an immediately preceding reproduction signal is held so that this signal can be used for tracking. The comparing circuit 2204 compares the input signals and outputs a voltage signal having a polarity and absolute value corresponding to the difference between the input signals. In this manner, a voltage signal can be generated which is representative of a difference between signals lastly held by the two peak hold circuits. This voltage signal is passed through a PID filter 2205, added with the past history by an integration circuit 2206, amplified by an amplifier circuit 2207, and added with a position control signal to thereby control the XYZ driving stage 2608 shown in FIG. 18.

The recording medium was scanned by a length of 100 $\mu$m in the positive X-direction in FIG. 20 with the tracking probes 2101 and 2102 at a linear speed of 2 mm/s while a bias voltage of 1.5 V was applied to the two probes relative to the substrate 2601, by using the tracking mechanism. During this scanning, the recording medium was scanned by the remaining recording/reproducing probes while a voltage pulse was applied to each probe relative to the substrate 2601 at a maximum of 2048 times in accordance with data trains prepared in advance. The voltage was 5.5 V and the application time was 0.3 $\mu$sec. The diameter of a generated data bit 702 was about 10 nm and the bit interval was about 50 nm. Next, the probe array 2765 was moved by 100 $\mu$m along the negative X-direction in FIG. 20 and by 100 nm in the positive Y-direction in FIG. 20. Thereafter, scanning was performed and data bit trains were formed in a manner similar to the above. This operation was repeated to generate 10 data bit trains for each recording/reproducing probe. During the scanning, the tracking bit reproduction signals by the tracking probes 2101 and 2102 were monitored and no reproduction error was found.

Next, a reproduction operation for a data bit train was performed during tracking. After the probe array 2765 was moved to the original position, the recording medium was scanned at a linear speed of 2 mm/s while a bias voltage of 1.5 V was applied to all the probes of the probe array 2765, during tracking by the tracking probes 2101 and 2102 by using the tracking mechanism. During the scanning, reproduction signals of all recording/reproducing probes were monitored. The reproduction of 50 reciprocal operations was carried out for all data bits and no reproduction error was found. Reproduction signals of the tracking bits by the tracking probes 2101 and 2102 were monitored during tracking and no reproduction error was found.

As the data to be used when the tracking bit trains are formed, address data was used and the same results as above were obtained. In this case, during the recording/reproducing operation, reproduction signals of the tracking probes 2101 and 2102 were monitored and address data at each timing was able to obtain.

[Embodiment 23]

Embodiment 23 will be described in detail with reference to the accompanying drawings in which the tracking mechanism of this invention is applied to the recording/reproducing apparatus having the structure described above.

A probe array 2765 shown in FIG. 19 and made of 64 probes integrally formed at a distance of 100 μm was mounted on the apparatus. Of these 64 probes, the 32nd and 33-rd probes 2732 and 2733 were used as tracking probes 2101 and 2102, and the remaining 62 probes were used as recording/reproducing probes. A direction of the tip of the needle of the tracking probe 2102 viewing the tip of the needle of the tracking probe 2101 is defined as a positive Y-direction. A counter-clockwise direction about a direction of the probe array 2765 vertically viewing the surface of the recording medium 2603 is defined as a positive θ rotation direction. A direction of the positive Y-direction rotated by π/2 rad along the negative θ rotation direction is defined as a positive X-direction.

Figure 22:
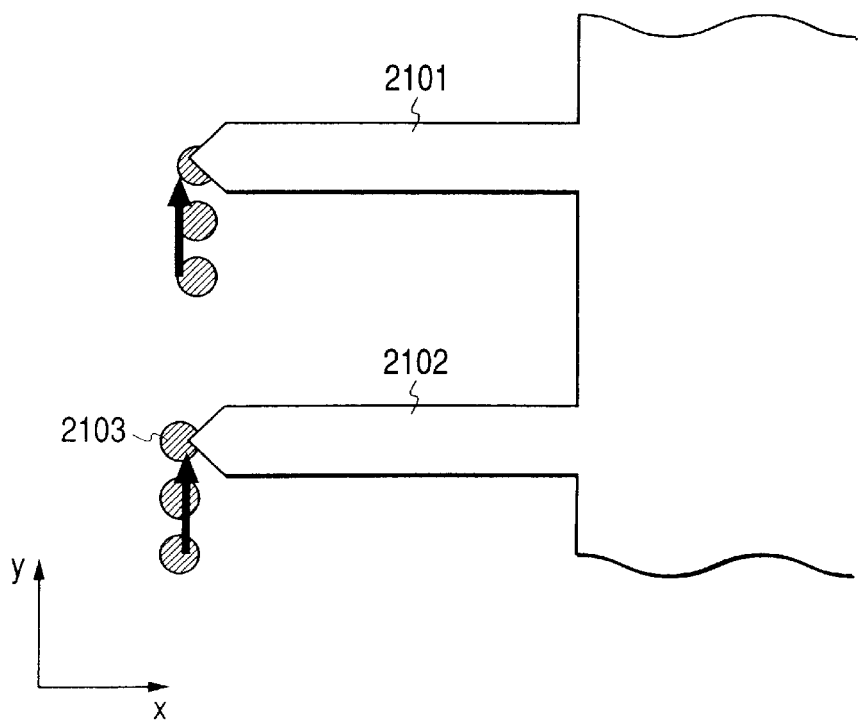
FIG. 22 is a diagram illustrating Embodiment 23 of the invention.

Next, the recording medium was linearly scanned with the probe array 2765 by a length of 80 μm at a linear speed of 0.1 mm/s in the positive Y-direction in FIG. 22. During the scanning, a voltage pulse was applied at the same time at a maximum of 2048 times to the tracking probes 2102 and 2101 relative to the substrate 2601 at an interval of 40 nm along the scan direction, in accordance with data representative of address information prepared in advance. The voltage was 5.5 V and the application time was 0.3 μsec. The diameter of a generated tracking bit was about 10 nm.

Next, the probe array 2765 was moved by 80 μm along the negative Y-direction in FIG. 22 and by 100 nm along the positive X-direction in FIG. 22. Thereafter, the tracking bits were formed in a similar manner as above. This operation was repeated to form 10 tracking bit trains for each tracking probe at an interval of 100 nm.

Next, the probe array 2765 was set to the original position. Thereafter, the probe array 2765 was rotated relative to the recording medium 2603 by 0.00005 rad along the positive θ rotation direction about the tip of the needle of the tracking probe 2101 in the plane parallel to the surface of the recording medium 2603. Therefore, the distance between two tracking probes in the X-direction in FIG. 22 was broadened by 5 nm, and the distance in the Y-direction was narrowed by 0.000125 nm. A change in the distance along the Y-direction is sufficiently shorter than the diameter of 10 nm of the tracking bit 103 and can be neglected.

Next, while the tracking was performed by using the tracking probes 2101 and 2102, the remaining 62 recording/reproducing probes were used for recording data bit trains.

Figure 23:
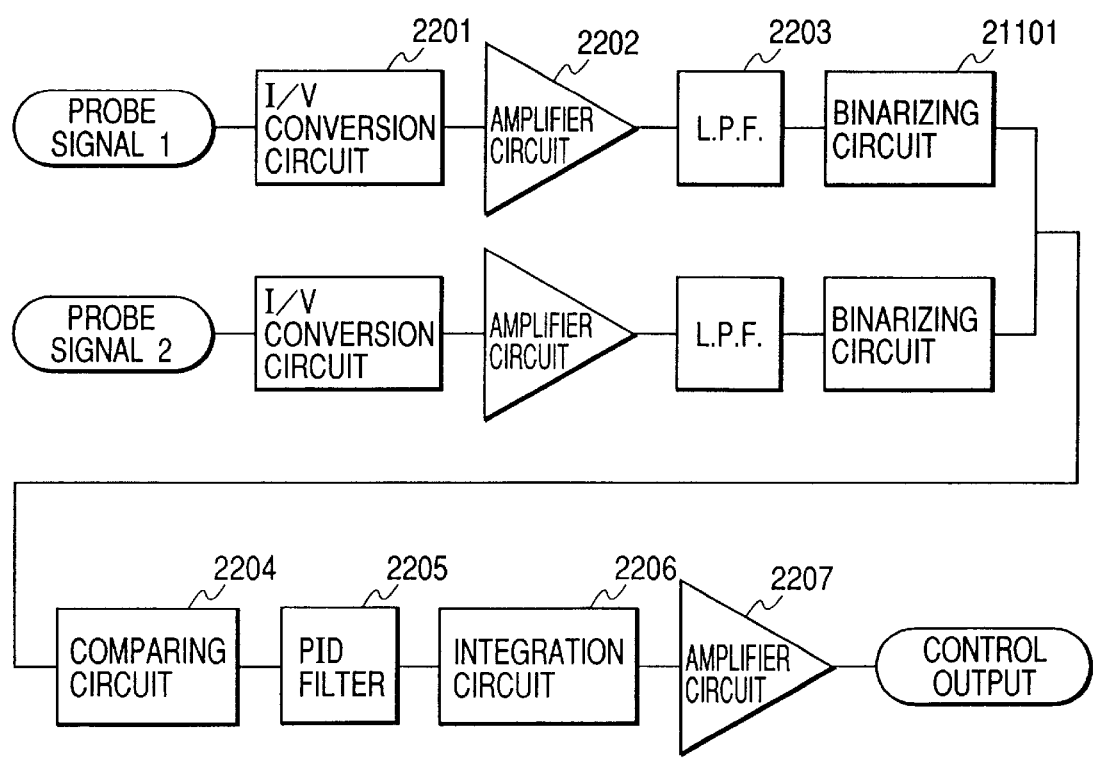
FIG. 23 is a diagram illustrating a tracking mechanism of Embodiment 23 of the invention.

The tracking mechanism used by Embodiment 23 will be described with reference to FIG. 23. Current signals of tracking bit reproduction by the two tracking probes are converted by I/V conversion circuits 2201 into voltage signals which are amplified by amplifier circuits 2202, passed through low-pass filters 2203, binarized by binarizing circuits 21101, and input to the comparing circuit 2204. The comparing circuit 2204 compares the input signals and outputs a constant voltage signal having a polarity corresponding to the difference between the input signals. In this manner, a constant voltage pulse having a width corresponding to a difference in length between the two input signals. This voltage signal is passed through a PID filter 2205, added with the past history by an integration circuit 2206, amplified by an amplifier circuit 2207, and added with a position control signal to thereby control the XYZ driving stage 2608 shown in FIG. 18.

The recording medium was scanned by a length of 80 μm in the positive X-direction in FIG. 22 with the tracking probes 2101 and 2102 at a linear speed of 2 mm/s while a bias voltage of 1.5 V was applied to the two probes relative to the substrate 2601, by using the tracking mechanism. During this scanning, the recording medium was scanned by the remaining recording/reproducing probes while a voltage pulse was applied to each probe relative to the substrate 2601 at a maximum of 2048 times in accordance with data trains prepared in advance. The voltage was 5.5 V and the application time was 0.3 μsec. The diameter of a generated data bit was about 10 nm and the bit interval was about 40 nm. Next, the probe array 2765 was moved by 80 μm along the negative Y-direction in FIG. 22 and by 100 nm in the positive X-direction in FIG. 22. Thereafter, scanning was performed and data bit trains were formed in a manner similar to the above. This operation was repeated to generate 10 data bit trains for each recording/reproducing probe. During the scanning, the tracking bit reproduction signals by the tracking probes 2101 and 2102 were monitored and no reproduction error was found.

Next, a reproduction operation for a data bit train was performed during tracking. After the probe array 2765 was moved to the original position, the recording medium was scanned at a linear speed of 2 mm/s while a bias voltage of 1.5 V was applied to all the probes of the probe array 2765, during tracking by the tracking probes 2101 and 2102 by using the tracking mechanism. During the scanning, reproduction signals of all recording/reproducing probes were monitored and address information was obtained. The reproduction of 50 reciprocal operations was carried out for all data bits and no reproduction error was found.

Third Embodiments

In this invention, position alignment markers are formed on a recording medium by changing the distances between probes and between markers, and it is detected which probes are on the markers. In this manner, high precision position alignment becomes possible.

In this invention, position alignment is performed basing upon only a presence/absence of a position aligning marker detection signal. It is therefore possible to configure a position alignment control system highly resistant against noises.

In this invention, position alignment in a broad area becomes possible by increasing the number of probes to be used for position alignment.

In this embodiment, a recording medium is scanned with position alignment probes to perform a position alignment operation as well as a tracking operation. Therefore, both the position alignment and tracking operations can be realized with a simple structure.

Further, since the position alignment and tracking operations are performed relative to a recording medium in accordance with recording/reproducing principles, without any physical works of the recording medium, the recording/reproducing mechanism and the position alignment and tracking mechanisms can be easily configured integrally. Accordingly, markers can be formed with the position alignment mechanism itself, and the material of a recording medium is restricted less.

Figure 28:
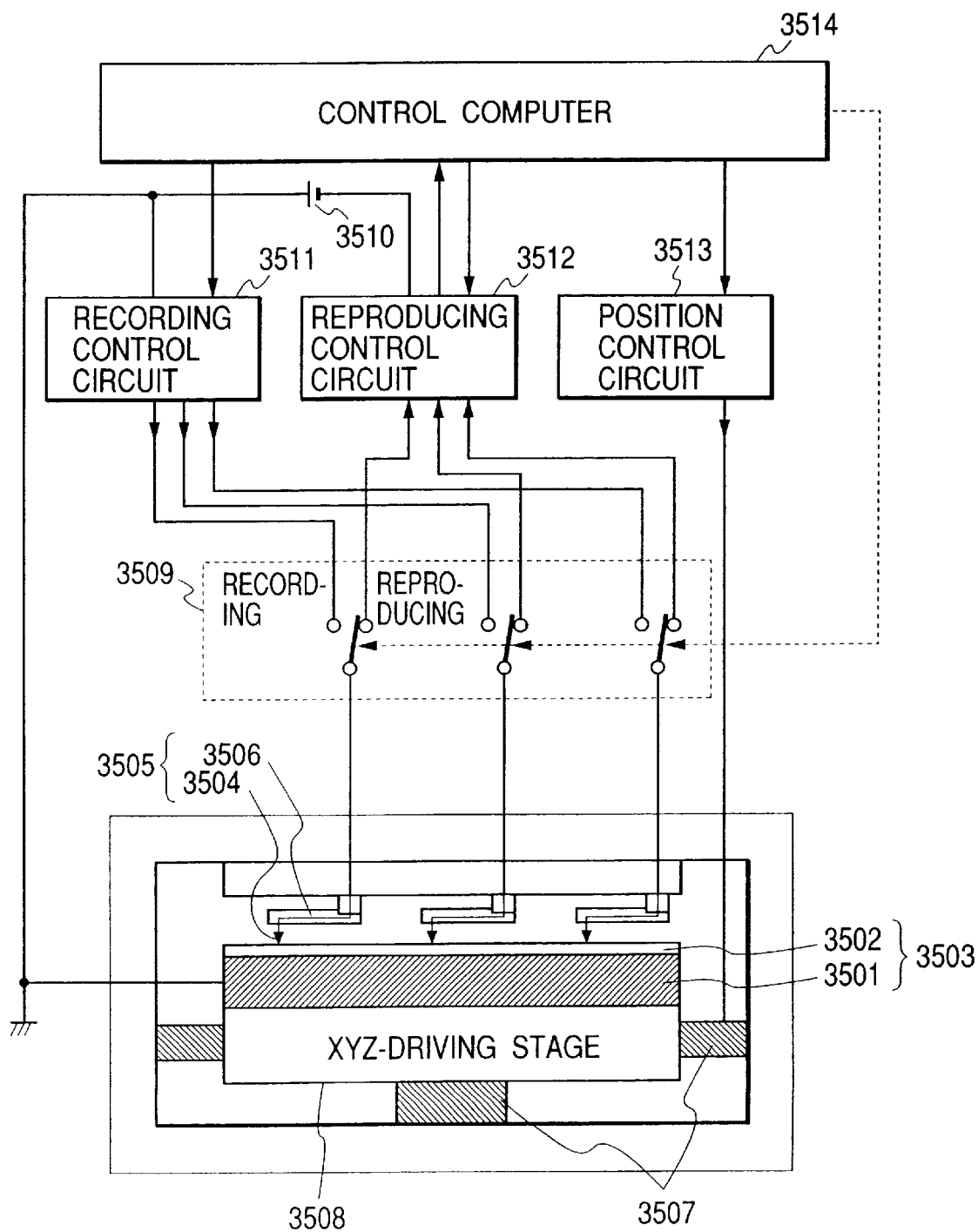
FIG. 28 is a schematic diagram showing the overall structure of a recording/reproducing apparatus embodying the invention.

The third embodiments of the invention will be described with reference to FIG. 28.

A plurality of probes 3505 are disposed with their needles 3504 being brought in contact with a recording medium 3503 made of a conductive substrate 3501 and a recording layer 3502 formed on the substrate. The needle 3504 of each probe 3505 is supported by an elastic body 3506 capable of elastic deformation.

Assuming that the elastic body 3506 has an elastic coefficient of about 0.1 N/m and an elastic deformation amount of about 1 $\mu$m, a contact force of the needle with the recording medium is about $10^{-7}$ N.

Upon reception of a position control signal from a position control circuit 3513 under the control of a control computer 3514, an XYZ driving mechanism 3507 drives an XYZ driving stage 3508 on which the recording medium 3503 is mounted. A three-dimensional relative motion between the probe 3505 and the recording medium 3503 is therefore possible. The positions of the probe 3504 in the XY-directions and in the Z-direction are adjusted relative to the recording medium 3503 so that the tip of the needle 3504 becomes in contact with the recording medium 3503 at a desired position and with a desired contact force.

While the recording medium 3503 of the recording/reproducing apparatus is scanned with the probe 3505, the tip of the needle 3504 of the probe 3505 is always kept in contact with the recording medium 3503.

With such a contact scan type, even if the surface of the recording medium 3503 is irregular, this irregularity is absorbed by the elastic deformation of the elastic body 3506 while the recording medium 3503 is scanned with the tip of the needle 3504 in contact with the medium. Therefore, the contact force of the tip of the needle 3504 in contact with the surface of the recording medium 3503 is maintained generally constant, and the tip of the needle 3504 and the surface of the recording medium 3503 are prevented from being broken or destroyed. This contact scan type does not require a piezoelectric element and the like for the z-direction position alignment of each probe, so that the structure of the apparatus can be simplified. The contact scan type is particularly suitable for an apparatus having a plurality of probes.

The feedback control of each probe 3505 in the z-direction relative to the recording medium 3503 is not necessary. The recording medium 3503 can therefore be scanned with the probe at high speed.

A record signal generated from a recording control circuit 3511 under the control of the control computer 3514 is applied via a switch 3509 connected to the record system and via each needle 3504 to the recording medium 3503. In this manner, information is recorded in a local area of the recording layer 3502 in contact with the tip of the needle 3504.

The recording layer 3502 of the recording/reproducing apparatus is made of a material same as those described with the first embodiments.

Bits recorded in the above-described manner are reproduced as in the following. A signal line of each probe 3505 is switched to the reproduction system by the switch 3509. A bias voltage generated by a bias voltage source 3510 is applied across the needle 3504 and substrate 3501, and current flowing therethrough is detected with a reproduction control circuit 3512. Since current flows through a record bit on the recording medium more (or less) than through an area without a record bit, the reproduction control circuit 3512 can detect a difference between currents to detect a reproduction signal which is supplied to the control computer 3514.

The structure and operation of the invention will be described with reference to the accompanying drawings.

In third embodiment, merely for the purpose of making simplify the description and easy understanding, the above described "flowing current greatly" is referred to simply as "flowing current", while "flowing smaller current" is referred to as "flowing no current".

Figure 24:
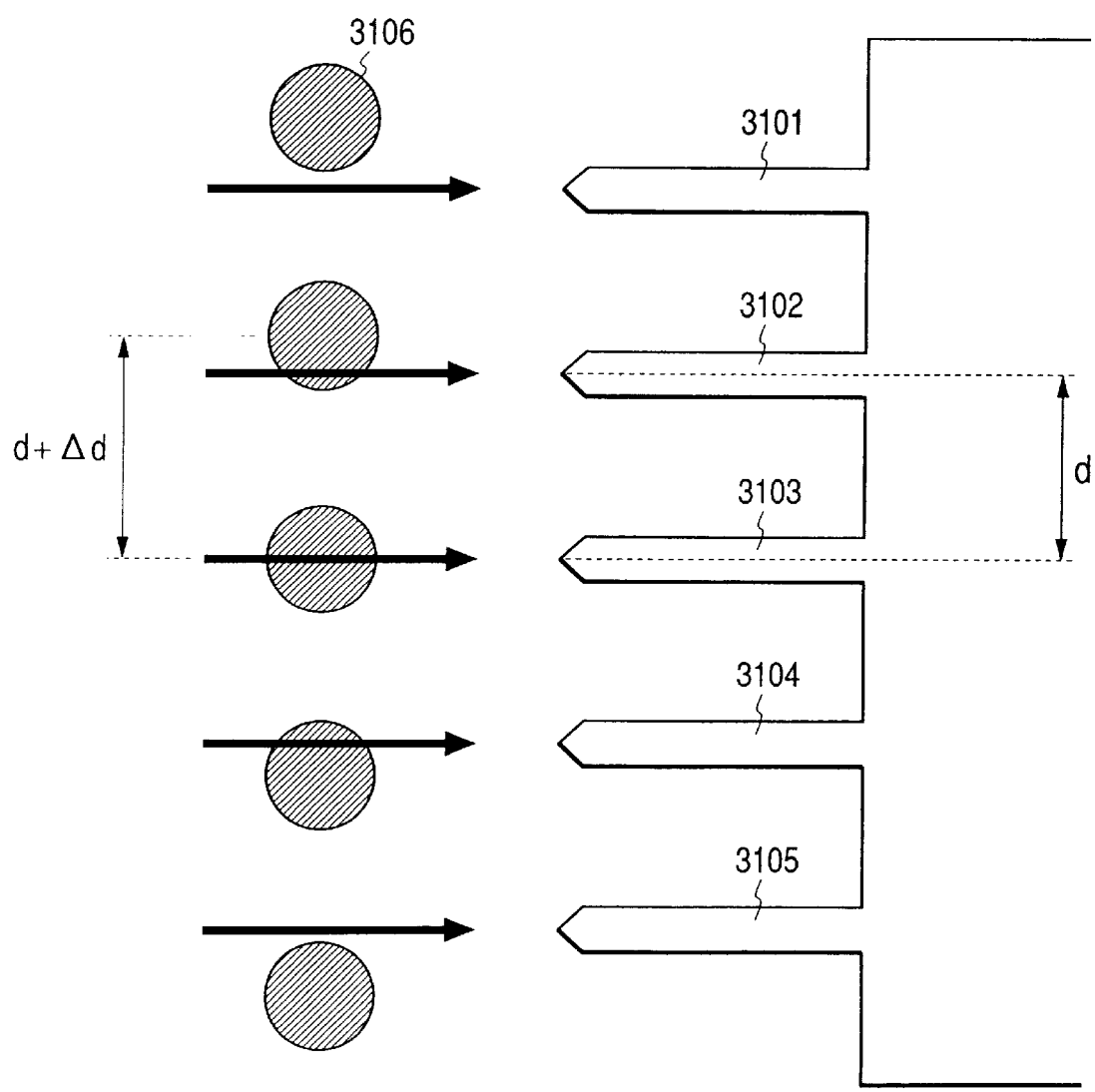
FIG. 24 is a diagram illustrating Embodiment 31 of the invention.

In FIG. 24, d represents a distance between two probes 2101 and 2102. Position alignment bits 3106 are disposed spaced by the probe distance d+$\Delta$d. Although the distance between bit trains is set broader to d+$\Delta$d in the example shown in FIG. 24, it may be set narrower to d−$\Delta$d.

As a bias voltage is applied to a plurality of probes on a recording medium written with bits, current flows through the probes on the bit 1306 and recording medium. By monitoring this current, it is possible to judge which probe is on the bit 3106.

Figure 26:
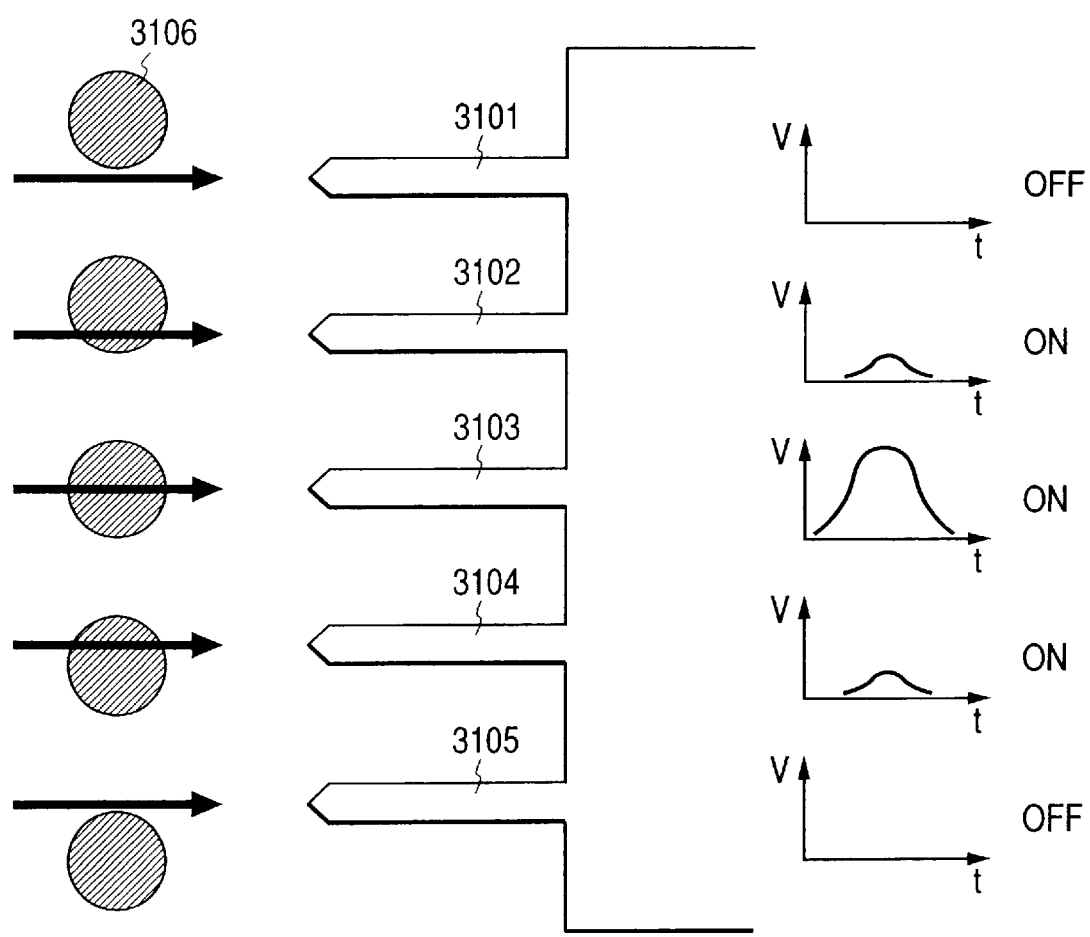
FIG. 26 is a diagram illustrating the principle of a position aligning and tracking mechanism of the invention.
Figure 27:
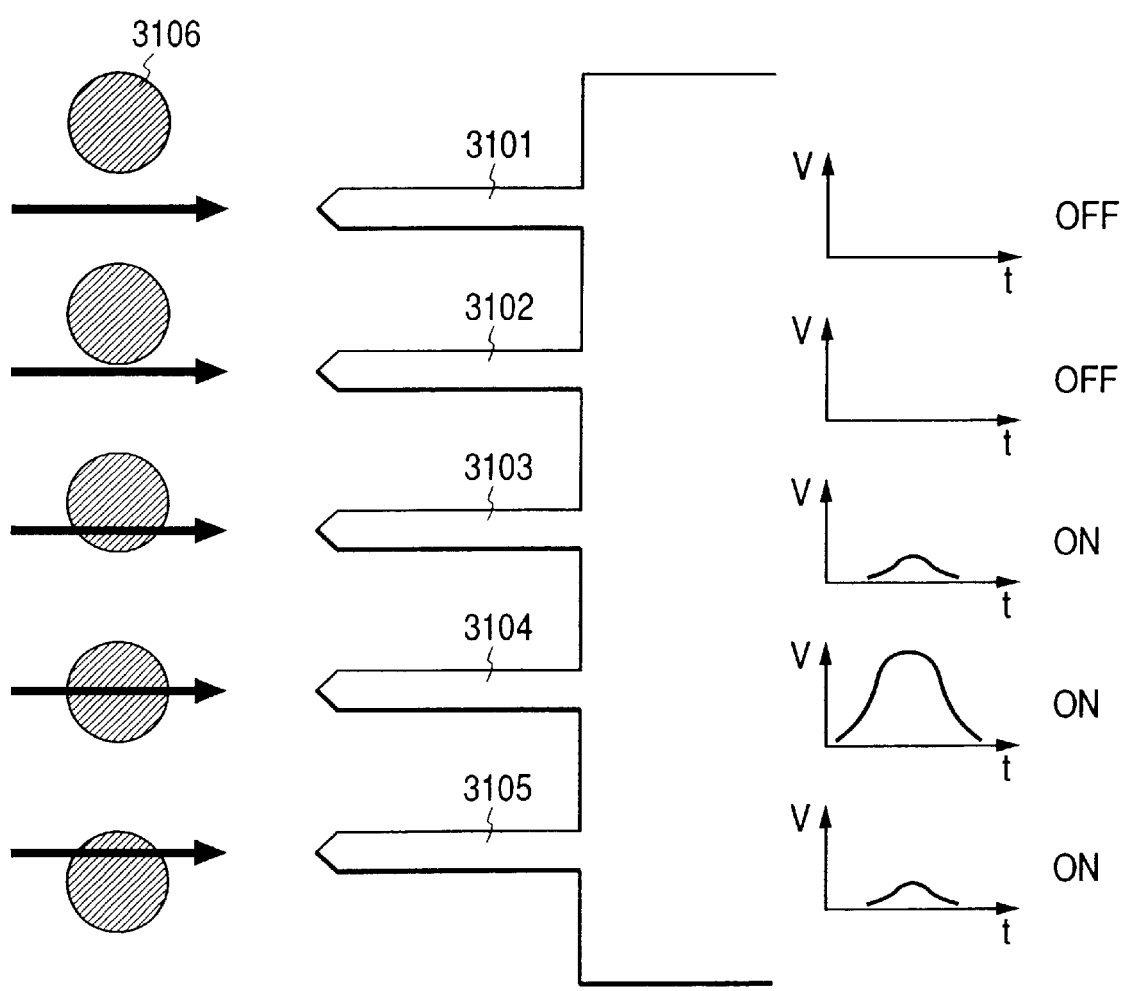
FIG. 27 is a diagram illustrating the principle of a position aligning and tracking mechanism of the invention.

Examples of position alignment in which some probe is positioned just on the center of a bit will be described with reference to FIGS. 26 and 27. In the example shown in FIG. 26, when the probe 3103 is positioned just on the center of the bit 3105, current flows through the probes 3102, 3103, and 3104. The probes through which current flows are symmetrical with the target probe 3103. However, if there is any position misalignment, the probes through which current flows are not symmetrical with the target probe 3103. Specifically, in the example shown in FIG. 27, current flows through the probes 3103, 3104, and 3105. An adding circuit outputs a signal having an amplitude corresponding to the number of probes through which current flows and having a polarity corresponding to an error direction. By using this signal, position alignment is performed.

Although five probes are used, the number of probes is not limited thereto. A position alignment precision depends upon a difference between the probe distance and bit distance, i.e., upon $\Delta$d. An area capable of position alignment becomes broader in proportion with the number of probes, assuming that $\Delta$d is constant. Specifically, the more the number of probes, the broader the position alignment area or it becomes possible to deal with the larger position misalignment.

Position alignment may be performed by detecting the probes through which current does not flow, instead of detecting the probes through which current flows. In this case, it is necessary that the position alignment probes are disposed symmetrically with the position alignment target probe.

Third embodiments may be used as tracking means during recording/reproducing. For example, in FIG. 24, while the position alignment is performed by scanning the recording medium with the probes 3101, 3102, 3104, and 3105 in the direction indicated by arrows, the probe 3103 is used as the recording/reproducing probe to configure a tracking mechanism.

The invention is applicable not only to the above-described recording/reproducing apparatus, but other types of recording/reproducing apparatuses may also be used such as magnetic recording/reproducing apparatuses, photomagnetic recording/reproducing apparatuses, and near field optical recording/reproducing apparatuses.

Third embodiments of the invention will be described more specifically.

[Embodiment 31]

Figure 25:
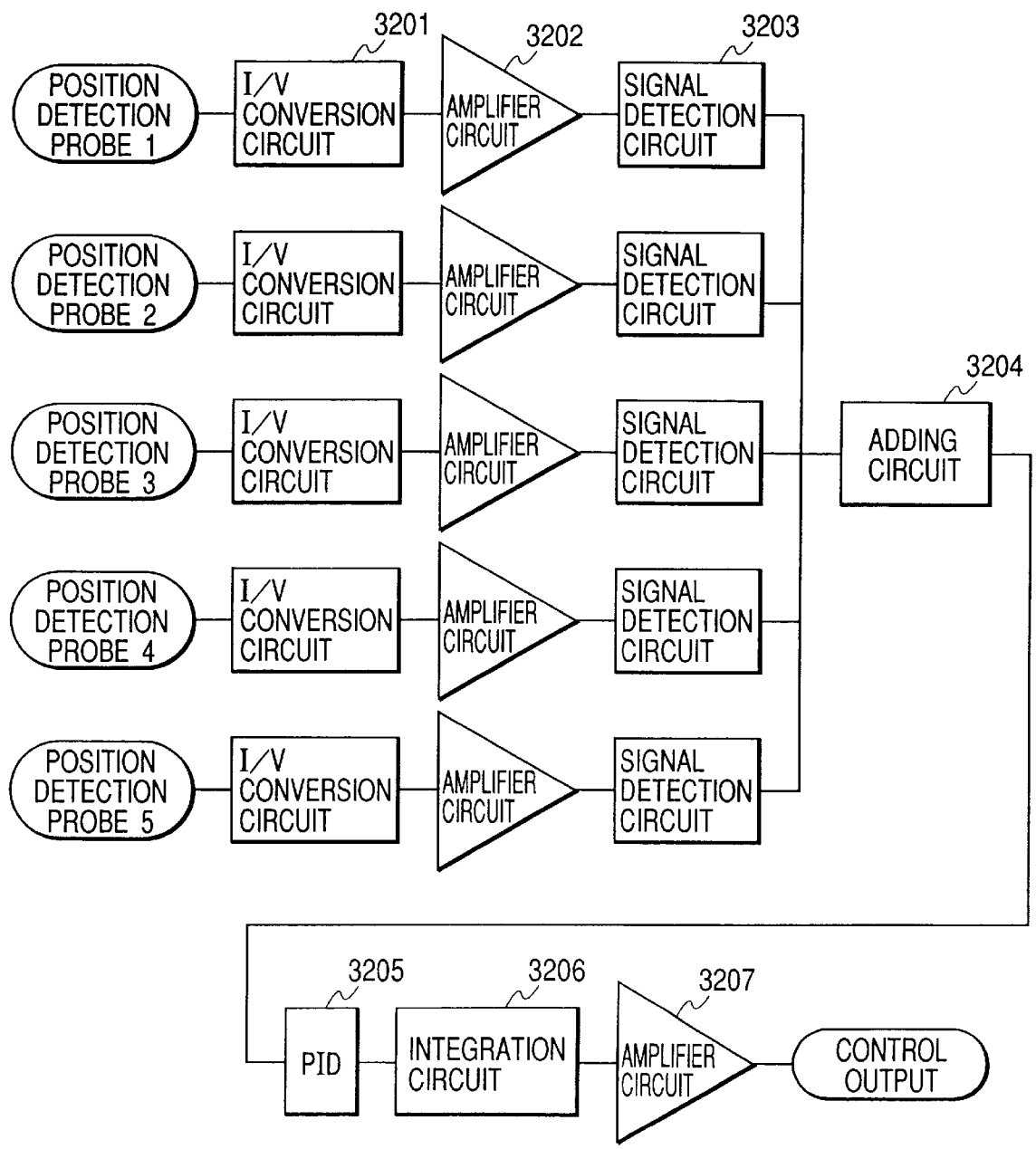
FIG. 25 is a diagram illustrating a position aligning and tracking mechanism of Embodiment 31 of the invention.

Embodiment 31 will be described in detail with reference to FIGS. 24 and 25 in which the tracking mechanism of this invention is applied to the recording/reproducing apparatus having the structure described above.

Five probes 3101, 3102, 3103, 3104, and 3105 integrally formed at a distance of 200 $\mu$m were mounted on the apparatus. After the tips of the needles of all the probes were made in contact with the recording medium, a voltage pulse was applied to the probe 3101. The voltage was 5.5 V and the application time was 0.3 $\mu$sec. The diameter of a generated position alignment bit was about 10 nm. Thereafter, each time the probe group was moved by 4 nm along a direction of the tip of the needle of the probe 3101 viewing the tip of the needle of the probe 3105, a voltage pulse was applied to form a position alignment bit for each of the probes 3102 to 3105.

Next, a position alignment was performed so that the probe 3103 was positioned just on its position alignment bit.

The position alignment mechanism used by Embodiment 31 will be described with reference to FIG. 25. Current signals of position alignment bits output from the five probes are converted by I/V conversion circuits 3201 into voltage signals which are amplified by amplifier circuits 3202. Each of signal detection circuits 3203 detects whether or not current flows through the corresponding probe. This signal detection circuit 3203 outputs a binary signal to an adding circuit 3204, the binary signal taking a value "1" if current flows through the corresponding probe and a value "0" if current does not flow through the corresponding probe. Of the input signals, the signs of the signals of the probes on the probe 3101 side relative to the position alignment target probe 3103, i.e., the signs of the signals of the probes 3101 and 3102, are inverted by the adding circuit 3204 which adds the inverted signals to the signals of the probes 3104 and 3105, without adding the signal of the probe 3103. An output signal of the adding circuit is passed through a PID filter 3205, added with the past history by an integration circuit 3206, and amplified by an amplifier circuit 3207 to thereby control an XYZ driving mechanism 3607 shown in FIG. 28.

After the probe group was moved to the original position, a vias voltage of 1.5 V was applied to the five probes and current passing through the probes was monitored. It was found that current flowed through the probes 3101 and 3102. Next, after the circuit shown in FIG. 25 was connected, current passing through the probes was monitored. It was found that current flowed through the probes 3102, 3103, and 3104.

Next, after turning back the group of probes to a position before the alignment, then the recording medium was linearly scanned with the probe group by a length of 100 $\mu$m at a linear speed of 0.1 mm/s. During the scanning, a voltage pulse was applied 2048 times to the probe 3101. The voltage was 5.5 V and the application time was 0.3 $\mu$sec. The diameter of a generated tracking bit was about 10 nm and the bit interval was about 40 nm. After this scanning, the probe group was moved to the original position.

Thereafter, the probe group was moved by 4 nm along a direction of the tip of the probe 3101 viewing the tip of the probe 3105 using the probe 3102, in similar manner, the tracking bit train is produced. These operations were performed for each of the probes 3102 to 3105.

Next, an operation of reproducing bit trains with the probe 3103 was performed during the tracking with the probes 3101, 3102, 3104, and 3105. The position alignment mechanism used by Embodiment 31 will be described with reference to FIG. 25. Current signals of position alignment bits output from the five probes are converted by the I/V conversion circuits 3201 into voltage signals which are amplified by the amplifier circuits 3202. Each of the signal detection circuits 3203 detects whether or not current flows through the corresponding probe. This signal detection circuit 3203 outputs a binary signal to the adding circuit 3204, the binary signal taking a value "1" if current flows through the corresponding probe and a value "0" if current does not flow through the corresponding probe. Of the input signals, the signs of the signals of the probes on the probe 3101 side relative to the position alignment target probe 3103, i.e., the signs of the signals of the probes 3101 and 3102, are inverted by the adding circuit 3204 which adds the inverted signals to the signals of the probes 3104 and 3105, without adding the signal of the probe 3103. An output signal of the adding circuit is passed through the PID filter 3205, added with the past history by the integration circuit 3206, amplified by the amplifier circuit 3207, and added with a position control signal to thereby control the XYZ driving mechanism 3507 shown in FIG. 28.

When the bit trains are generated, the probe group is positioned so that the tip of the needle of the probe 3105 is just on the first bit. In this state, the above position alignment was carried out with the probes 3101, 3102, 3104, and 3105 so that the probe 3103 was positioned just on the first bit. Next, by using the position alignment operation as the tracking operation, the recording medium was scanned with the probe group at a linear speed of 0.1 mm/s to perform reproduction of 50 reciprocal operations. Reproduction signals from the probe 3103 were monitored, and no reproduction error was found.

[Embodiment 32]

Embodiment 32 will be described in detail with reference to FIGS. 29 and 30 in which the position alignment mechanism of this invention is applied to the recording/reproducing apparatus having the structure described above.

Two probe groups each constituted of five probes integrally formed at a distance of 200 $\mu$m were prepared. As shown in FIG. 29, the first probe group with probes 3101, 3102, 3103, 3104, and 3105 was mounted on the apparatus. Then, the second probe group with probes 3601, 3602, 3603, 3604, and 3605 was mounted perpendicular to the first probe group. A recording/reproducing probe 3606 was also mounted. The probes totaling 11 probes were structured to operate together. Tips of all the probes were made in contact with a recording medium.

Position alignment bits were formed with the first position alignment probe group. First, a voltage pulse was applied to the probe 3101. The voltage was 5.5 V and the application time was 0.3 $\mu$sec. The diameter of a generated position alignment bit was about 10 nm. Thereafter, the probe group was moved by 7 nm along the X-direction shown in FIG. 29 and a voltage pulse was applied under the same conditions as above. This operation was repeated to generate position alignment bits totalling 9 bits constituting a stripe bit group shown in FIG. 29. After this bit group was formed, the probe group was moved by 56 nm in a negative X-direction. Each time the probe group was moved to a negative Y-direction, the position alignment bit group was formed for each of the probes 3102, 3103, 3104, and 3105, similar to the probe 3101. In this manner, a total of 5 position alignment groups was formed. The distance between adjacent position alignment bit groups was set broader by 4 nm than the distance between adjacent probes.

When all the position alignment bits are formed by the first position alignment probe group, all the probes are positioned so that the probe 3105 is just on the first position alignment bit. The first position alignment probe group was thereafter moved by 20 nm in the positive X-direction shown in FIG. 29 and by 20 nm in the negative Y-direction.

Next, position alignment bits were formed with the second position alignment probe group. First, a voltage pulse was applied to the probe 3601. The voltage was 5.5 V and the application time was 0.3 psec. The diameter of a generated position alignment bit was about 10 nm. Thereafter, the probe group was moved by 7 nm along the positive Y-direction shown in FIG. 29 and a voltage pulse was applied under the same conditions as above. This operation was repeated to generate position alignment bits totalling 9 bits constituting a stripe bit group shown in FIG. 29. After this bit group was formed, the probe group was moved by 56 nm in the negative Y-direction shown in FIG. 29. Each time the probe group was moved to the positive X-direction, the position alignment bit group was formed for each of the probes 3602, 3603, 3604, and 3605, similar to the probe 3601. In this manner, a total of 5 position alignment groups was formed. The distance between adjacent position alignment bit groups was set broader by 4 nm than the distance between adjacent probes.

When all the position alignment bits are formed by the second position alignment probe group, all the probes are positioned so that the probe 3605 is just on the first position alignment bit. The second position alignment probe group was thereafter moved by 20 nm in the positive Y-direction shown in FIG. 29. In this state, the first and second position alignment probe groups are positioned so that the probes 3105 and 3605 are just on the corresponding first position alignment bits.

Next, a position alignment was performed so that the tip of the needle of the probes 3103 and 3603 were positioned just on their first position alignment bits.

The position alignment mechanism used by Embodiment 32 will be described with reference to FIG. 30. Current signals of position alignment bits output from the five probes of the first or second position alignment probe group are converted by I/V conversion circuits 3201 into voltage signals which are amplified by amplifier circuits 3202. Each of signal detection circuits 3203 detects whether or not current flows through the corresponding probe. This signal detection circuit 3203 outputs a binary signal to an adding circuit 3204, the binary signal taking a value "1" if current flows through the corresponding probe and a value "0" if current does not flow through the corresponding probe. For example, when the position alignment is performed so that the tip of the needle of the probe 3103 is just on the position alignment bit, of the input signals, the signs of the signals of the probes on the probe 3101 side relative to the position alignment target probe 3103, i.e., the signs of the signals of the probes 3101 and 3102, are inverted by the adding circuit 3204 which adds the inverted signals to the signals of the probes 3104 and 3105, without adding the signal of the probe 3103. An output signal of the adding circuit 3204 is passed through a PID filter 3205, added with the past history by an integration circuit 3206, and amplified by an amplifier circuit 3207 to thereby control the XYZ driving mechanism 3507 shown in FIG. 28.

Figure 30:
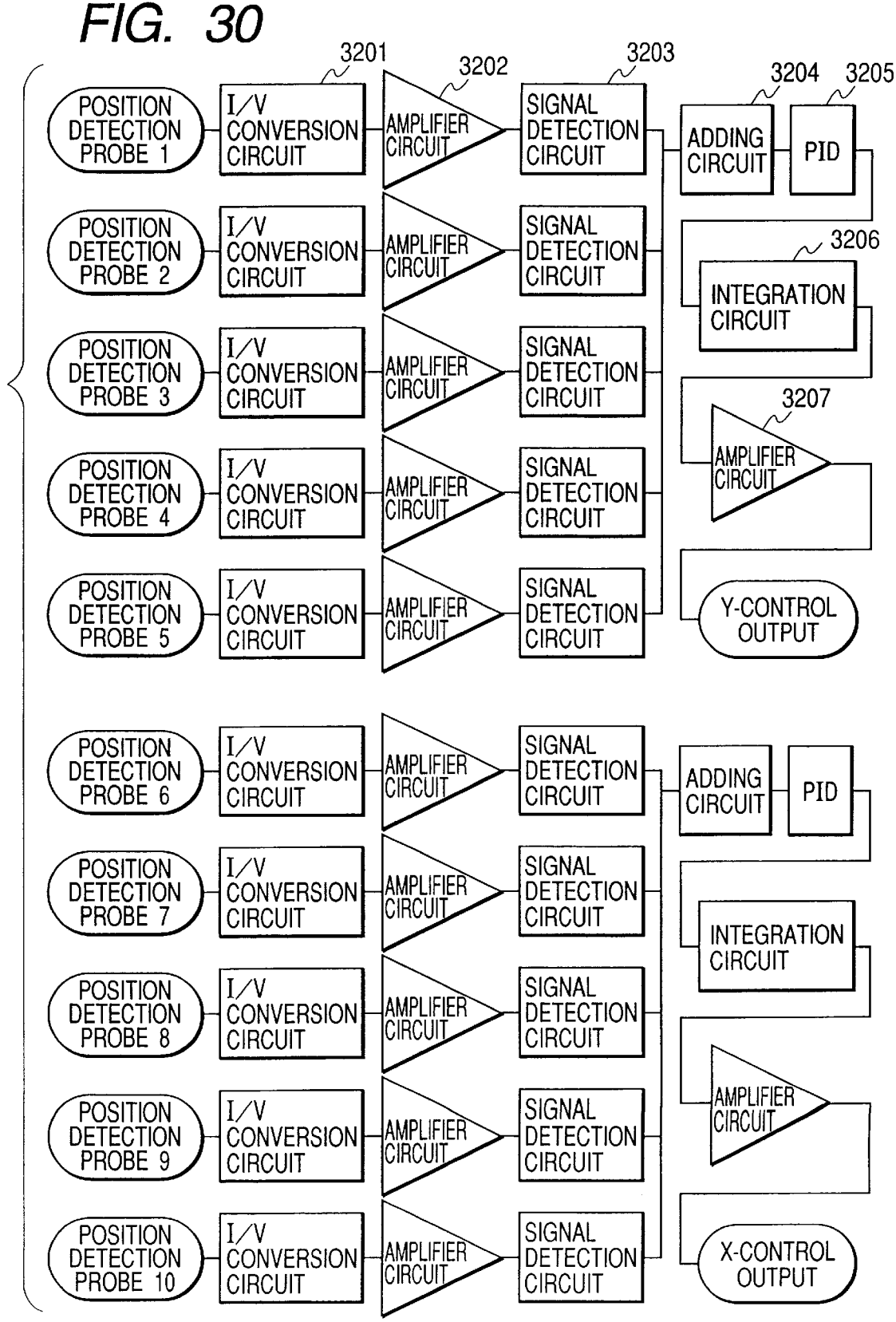
FIG. 30 is a diagram illustrating a position aligning mechanism of Embodiment 32 of the invention.

After the circuit shown in FIG. 30 was connected, a vias voltage of 1.5 V was applied to the ten probes of the first and second position alignment probe groups and current passing through the probes was monitored. It was found that current flowed through the probes 3102, 3103, 3104, 3602, 3603, and 3604. It was therefore confirmed that the probes were at the target positions.

Next, a voltage pulse was applied to the recording/reproducing probe 3606 to form a record bit 3607. The voltage was 5.5 V and the application time was 0.3 $\mu$sec. The diameter of a generated record bit 3607 was about 10 nm. In this state, a bias voltage of 1.5 V was applied to the recording/reproducing probe 3606 and current flowing the probe 3606 was detected with the signal detection circuit 3203.

Figure 29:
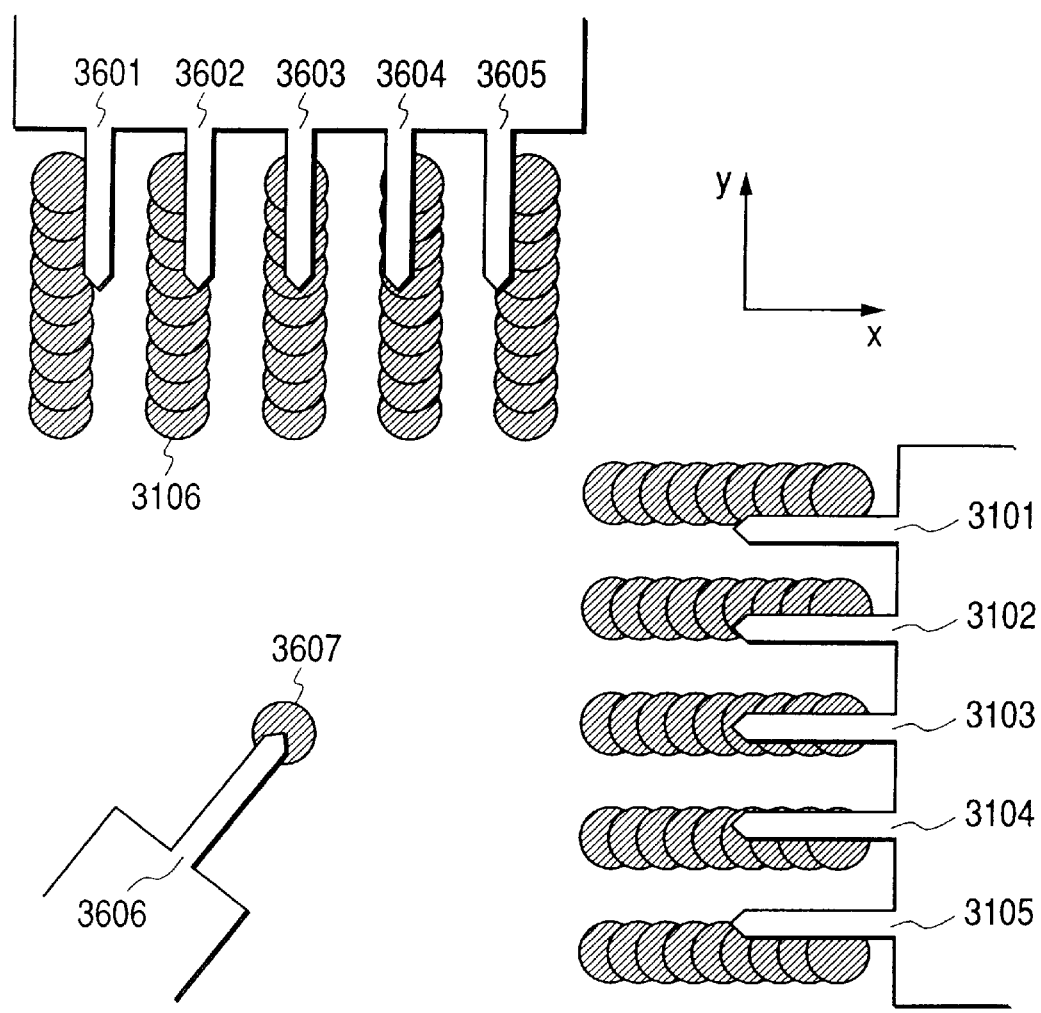
FIG. 29 is a diagram illustrating Embodiment 32 of the invention.

Next, the bias voltage was turned off for all the probes, and thereafter with the circuit shown in FIG. 30 being connected, the probes were moved by 10 nm in the positive X-direction shown in FIG. 29 and by 10 nm in the positive Y-direction. Then, a bias voltage of 1.5 V was applied to the recording/reproducing probe 3606. Current did not flow. After the bias voltage was turned off, a bias voltage of 1.5 V was applied to the ten position alignment probes of the first and second position alignment probe groups to perform a position alignment so that the probes 3103 and 3603 are just on the position alignment bits. Next, a bias voltage of 1.5 V was applied to the recording/reproducing probe 3606 and current flowing through the recording/reproducing probe 3606 was detected. It was therefore confirmed that the probe 3606 was again positioned just on the record bit 3607.

[Embodiment 33]

Embodiment 33 will be described in detail with reference to FIGS. 31 to 33 in which the position alignment and tracking mechanisms of this invention are applied to the recording/reproducing apparatus having the structure described above.

Figure 31:
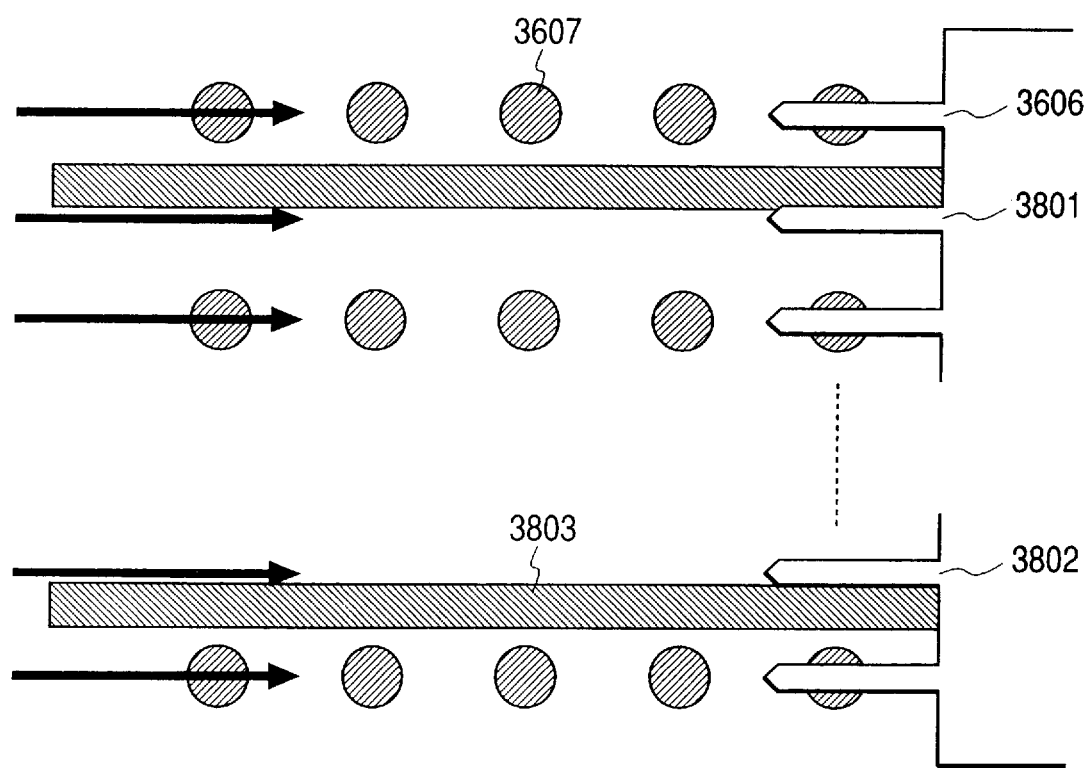
FIG. 31 is a diagram illustrating Embodiment 33 of the invention.

As shown in FIG. 31, a probe group constituted of 21 probes integrally formed at a distance of 200 $\mu$m was mounted on the apparatus as tracking and recording/reproducing probe groups. Of the 21 probes, odd number 11 probes were used as recording/reproducing probes 3606, and even number 10 probes were used as tracking probes 3801 and 3802. Stripe tracking marker trains 3803 were recorded on a recording medium with an electron beam marking device. The tracking markers 3803 have a width of 12 nm and a length of 110 $\mu$m and are disposed in parallel at a distance broader by 6 nm than the distance between tracking probes.

A position alignment was performed so that the tip of the needle of the sixth recording/reproducing probe was positioned just on the center of the tracking marker group.

The position alignment mechanism used by Embodiment 33 will be described with reference to FIG. 32. Current signals of tracking markers output from the ten tracking probes are converted by I/V conversion circuits 3201 into voltage signals which are amplified by amplifier circuits 3202. Each of signal detection circuits 3203 detects whether or not current flows through the corresponding probe. This signal detection circuit 3203 outputs a binary signal to an adding circuit 3204, the binary signal taking a value "1" if current flows through the corresponding probe and a value "0" if current does not flow through the corresponding probe. For example, when the position alignment is performed so that the tip of the needle of the sixth recording/reproducing probe 3103 is just on the center of the tracking marker group, outputs of the signal detection circuits multiplied by corresponding coefficients shown in FIG. 33 are added together by a weighting adding circuit 3901. An output signal of the weighting adding circuit 3901 is passed through a PID filter 3205, added with the past history by an integration circuit 3206, and amplified by an amplifier circuit 3207 to thereby control the XYZ driving mechanism 3507 shown in FIG. 28.

Figure 32:
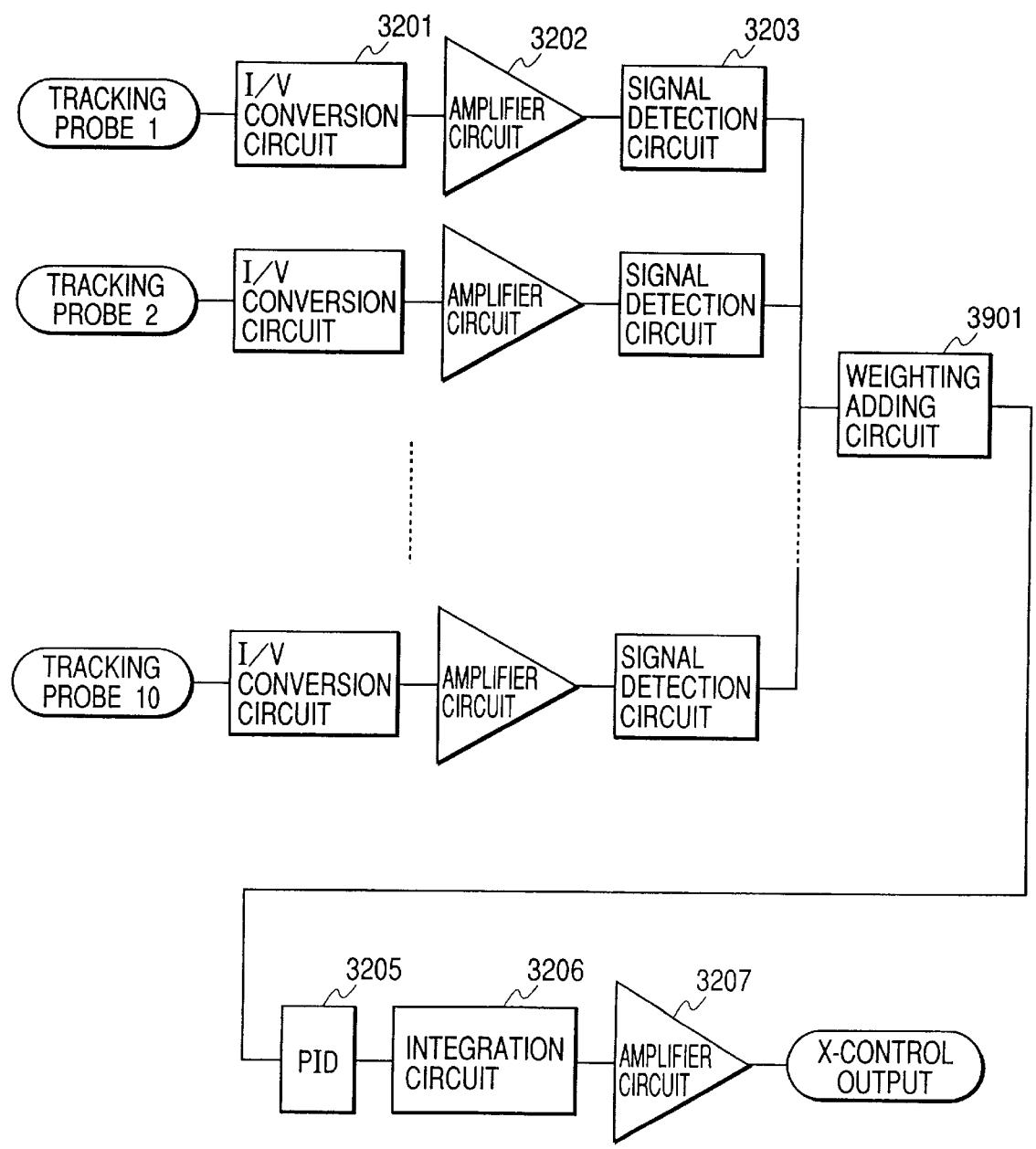
FIG. 32 is a diagram illustrating a position aligning and tracking mechanism of Embodiment 33 of the invention.

After the circuit shown in FIG. 32 was connected, a vias voltage of 1.5 V was applied to all the tracking probes to perform a position alignment.

Next, while a tracking operation was performed by the position alignment operation, a recording operation was performed by using the recording/reproducing probe group. The recording medium was linearly scanned with the probe group by a length of 100 µm at a linear speed of 0.1 mm/s. During the scanning, a voltage pulse was applied to the 11 recording/reproducing probes at a maximum of 2048 times in accordance with data prepared in advance. The voltage was 5.5 V and the application time was 0.3 µm. The diameter of a generated data bit was about 10 nm and the bit distance was about 50 nm.

After the probes were moved to the original position, while a tracking operation was performed by the position alignment operation, a reproduction operation for data bit trains was performed by using the recording/reproducing probe group. A bias voltage of 1.5 V was applied to all the probes and the recording medium was scanned by a length of 100 µm at a linear speed of 2 mm/s to perform reproduction of 50 reciprocal operations. During the scanning, reproduction signals from all the recording/reproducing probes were monitored, and no reproduction error was found.

Fourth Embodiments

Figure 38:
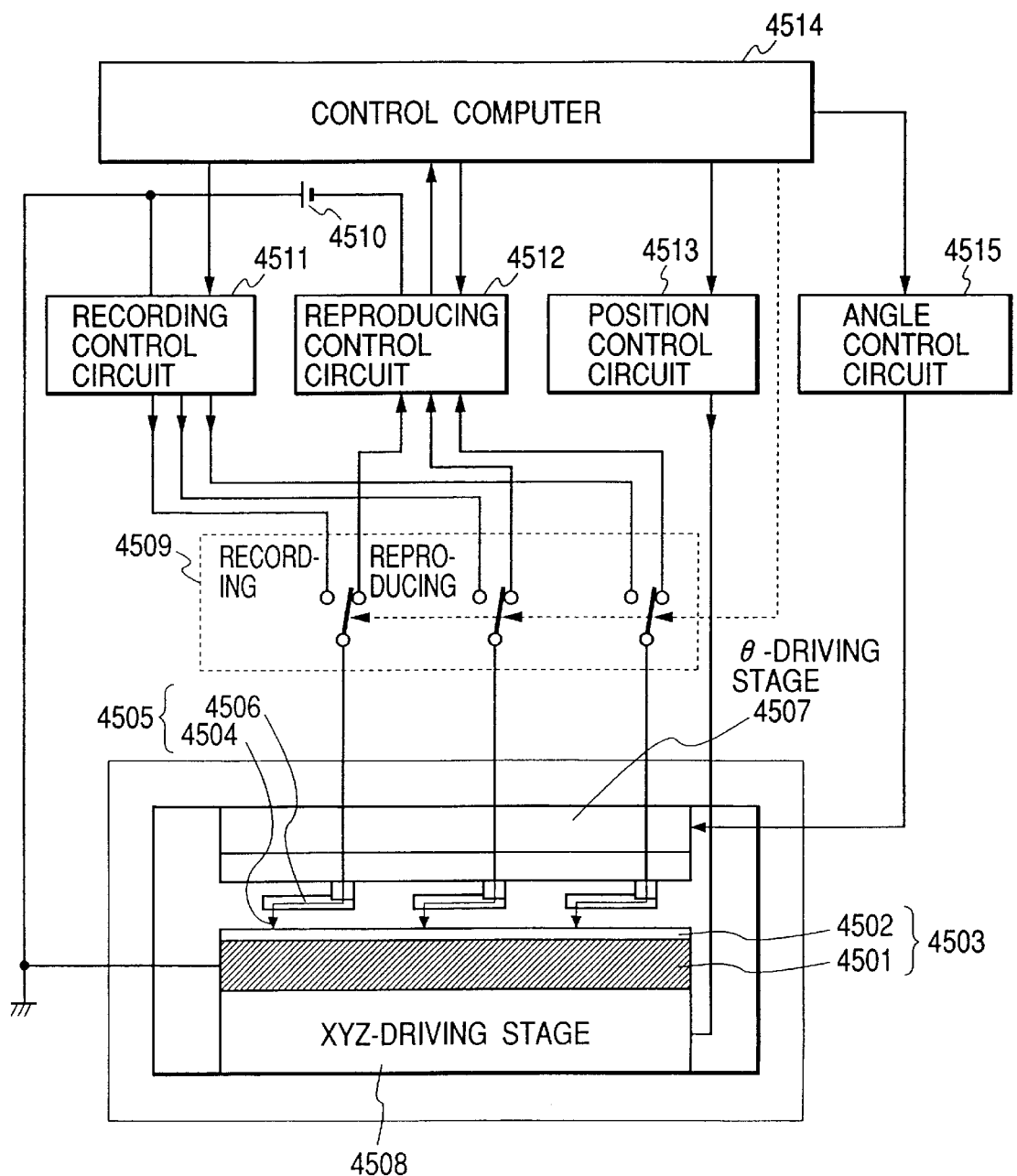
FIG. 38 is a schematic diagram showing the overall structure of a recording/reproducing apparatus embodying the invention.

The outline of a recording/reproducing apparatus embodying the invention will be described with reference to FIG. 38.

A plurality of probes 4505 are disposed with their needles 4504 being brought in contact with a recording medium 4503 made of a conductive substrate 4501 and a recording layer 4502 formed on the substrate. The needle 4504 of each probe 4505 is supported by an elastic body 4506 capable of elastic deformation.

Assuming that the elastic body 4506 has an elastic coefficient of about 0.1 N/m and an elastic deformation amount of about 1 µm, a contact force of the needle with the recording medium is about $10^{-7}$ N.

Upon reception of a position control signal from a position control circuit 4513 under the control of a control computer 4514, an XY driving stage 4508 on which the recording medium 4503 is mounted, is driven. A two-dimensional relative motion between the probe 4505 and the recording medium 4503 is therefore possible in a plane parallel to the recording medium 4503. The XYZ positions of the probe 4505 are adjusted relative to the recording medium 4503 so that the probe 4505 is positioned to make the tip of the needle 4504 at a desired position on the recording medium 603.

While the recording medium 4503 of the recording/reproducing apparatus is scanned with the probe 4505, the tip of the needle 4504 of the probe 4505 is always kept in contact with the recording medium 4503.

With such a contact scan type, even if the surface of the recording medium 4503 is irregular, this irregularity is absorbed by the elastic deformation of the elastic body 4506 while the recording medium 4503 is scanned with the tip of the needle 4504 in contact with the medium. Therefore, the contact force of the tip of the needle 4504 in contact with the surface of the recording medium 4503 is maintained generally constant, and the tip of the needle 4504 and the surface of the recording medium 4503 are prevented from being broken or destroyed. This contact scan type does not require a piezoelectric element and the like for the z-direction position alignment of each probe, so that the structure of the apparatus can be simplified. The contact scan type is particularly suitable for an apparatus having a plurality of probes.

The feedback control of each probe 4505 in the z-direction relative to the recording medium 4503 is not necessary. The recording medium 4503 can therefore be scanned with the probe 4505 at high speed.

Upon reception of an angle control signal generated from an angle control circuit 4515 under the control of the control computer 4514, a θ driving stage 4507 on which the probe 4505 is mounted is driven, so that the angle between the probe 4505 and recording medium 4503 changes in the plane parallel to the surface of the recording medium 2603.

A record signal generated from a recording control circuit 4511 under the control of the control computer 4514 is applied via a switch 4509 connected to the record system and via each needle 4504 to the recording medium 4503. In this manner, information is recorded in a local area of the recording layer 4502 in contact with the tip of the needle 4504.

The recording layer 4501 of the recording/reproducing apparatus is made of a material same as those described with the first embodiments.

Bits recorded in the above-described manner are reproduced as in the following. A signal line of each probe 4505 is switched to the reproduction system by the switch 4509. A bias voltage generated by a bias voltage source 4510 is applied across the needle 4504 and substrate 4501, and current flowing therethrough is detected with a reproduction control circuit 4512. Since current flows through a record bit on the recording medium more (or less) than through an area without a record bit, the reproduction control circuit 4512 can detect a difference between currents to detect a reproduction signal which is supplied to the control computer 4514.

In fourth embodiment, for making simple the description, "flowing greater current" is referred to as "flowing current", while "flowing smaller current" is referred as "flowing no current".

The structure and operation of the invention will be described with reference to the accompanying drawings.

Figure 34:
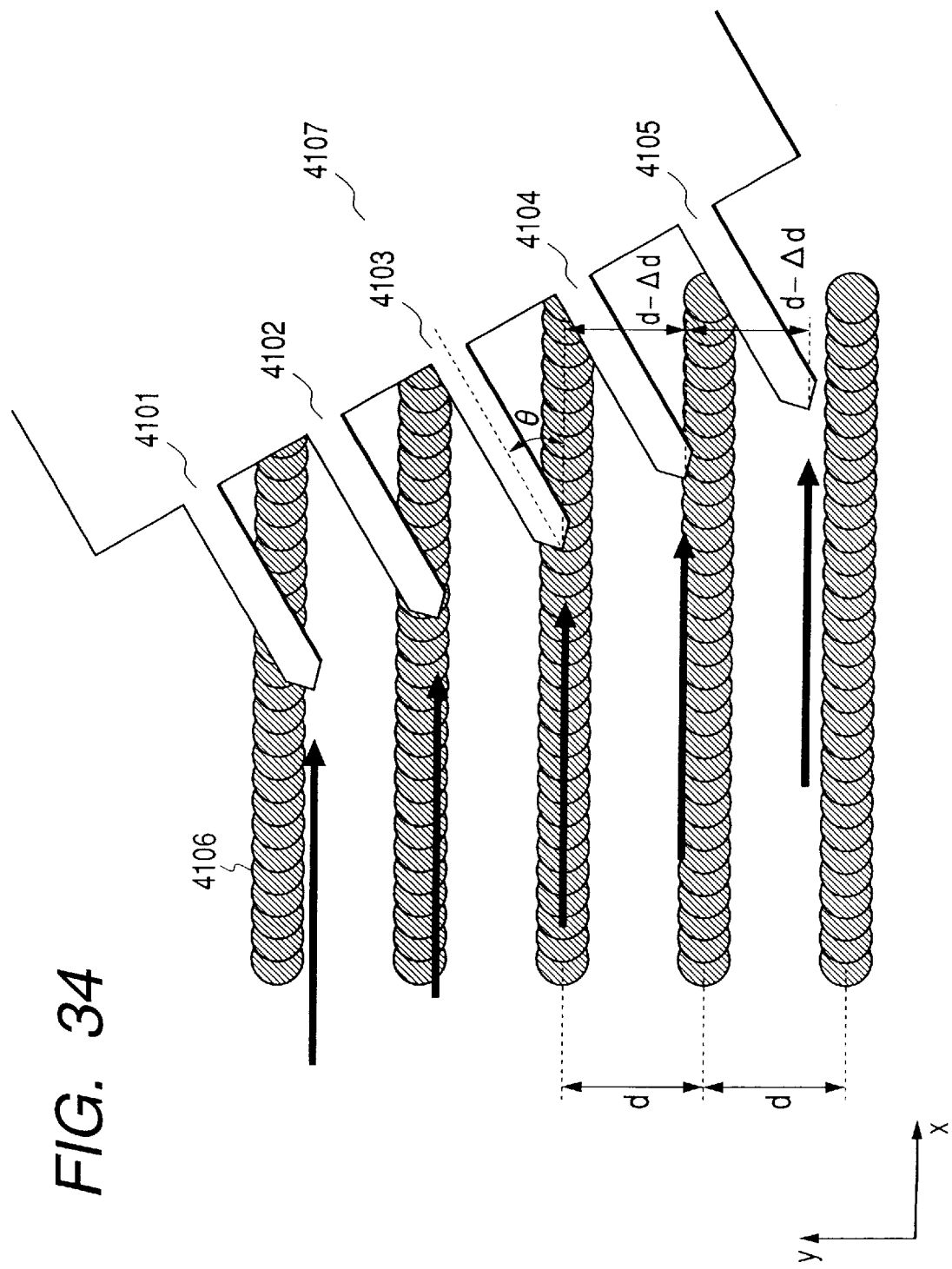
FIG. 34 is a diagram illustrating Embodiment 41 of the invention.

By using a probe array 4107 having five probes 4101, 4102, 4103, 4104, and 4105 disposed at a distance of d, five position alignment marker trains 4106 disposed at a distance of d are formed. Thereafter, as shown in FIG. 34, a relative angle between the probe array 4107 and position alignment marker train 4106 is changed by an angle θ. An apparent distance between probes relative to the distance between position alignment marker trains is therefore changed. Although the apparent distance between probes is narrowed by Δd in the example shown in FIG. 34, it is obvious that it may be broadened by Δd.

As a bias voltage is applied across the probe and recording medium and if the tip of the needle of the probe is on the position alignment marker 4106, then current flows through the probe and recording medium. By monitoring this current, it is possible to judge which probe is on the position alignment marker.

Figure 36:
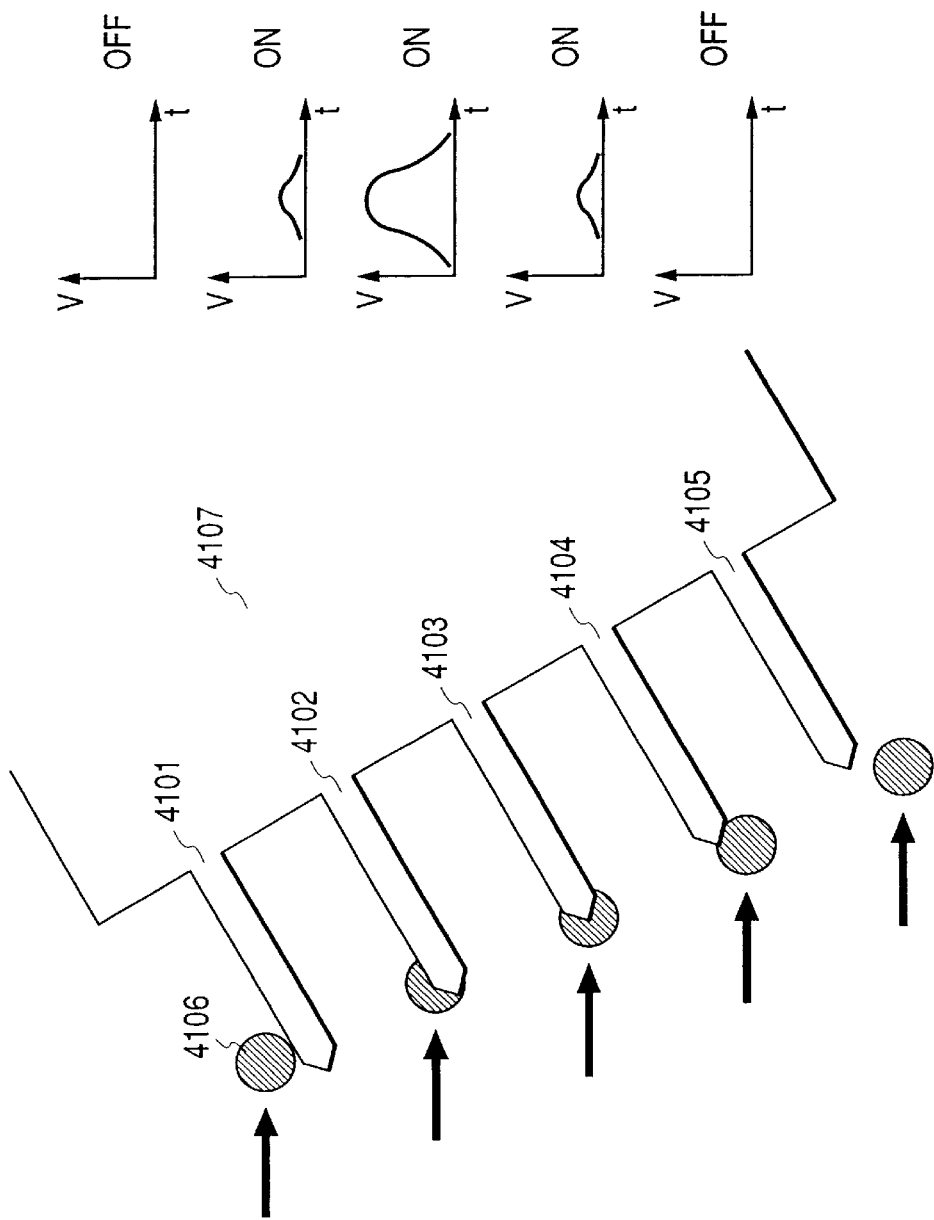
FIG. 36 is a diagram illustrating the principle of a position aligning and tracking mechanism of the invention.
Figure 37:
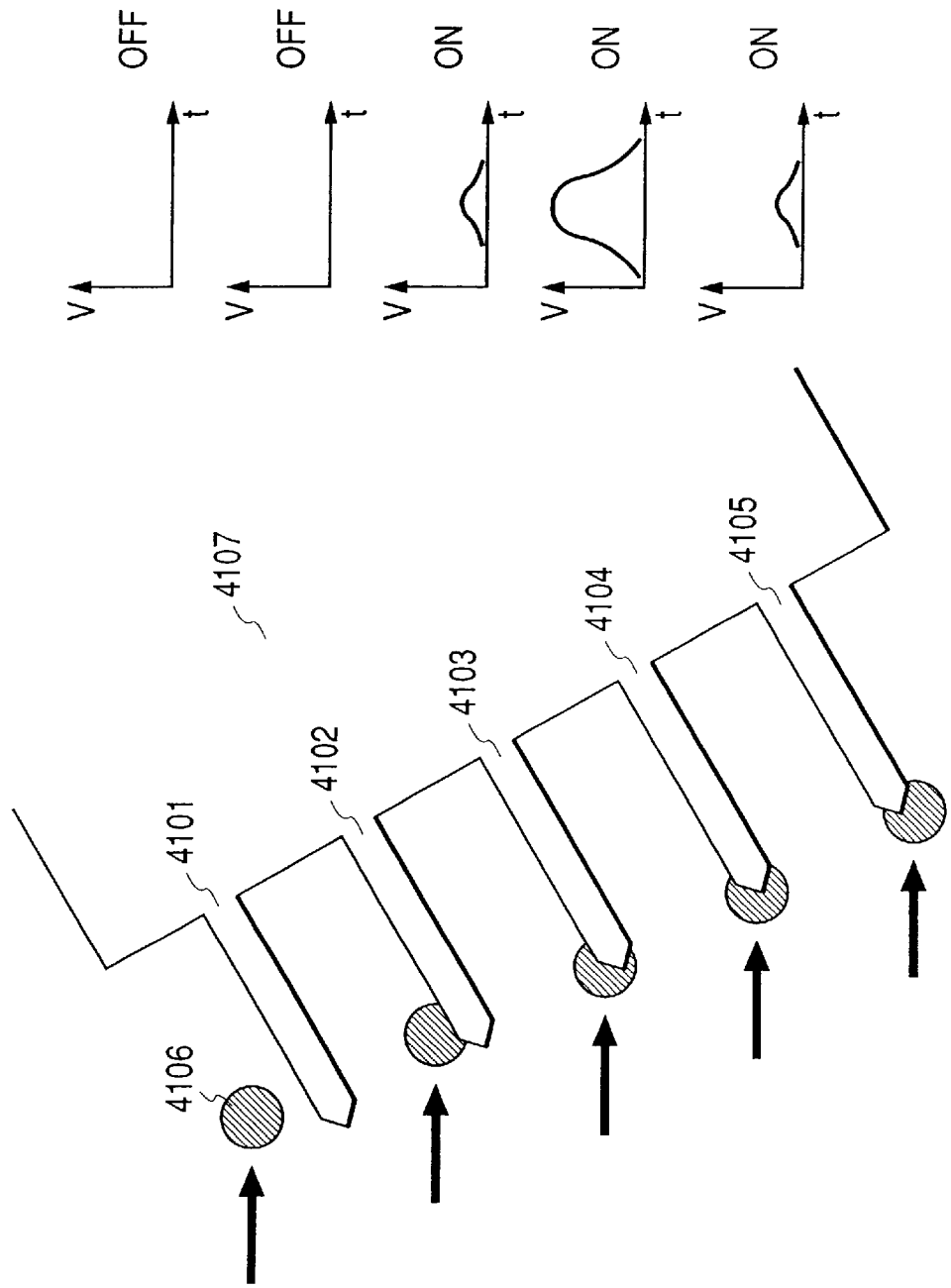
FIG. 37 is a diagram illustrating the principle of a position aligning and tracking mechanism of the invention.

Examples of position alignment in which some tip of the needle probe 4103 is positioned just on the center of the position alignment marker will be described with reference to FIGS. 36 and 37. In the example shown-in FIG. 36, when the probe 4103 is positioned just on the center of the target position alignment marker, current flows through the probes 4102, 4103, and 4104. The probes through which current flows are symmetrical with the target probe 4103. However, if there is any position misalignment relative to the target position alignment marker, the probes through which current flows are not symmetrical with the target probe 4103. Specifically, in the example shown in FIG. 37, current flows through the probes 4103, 4104, and 4105. An adding circuit outputs a signal having an amplitude corresponding to the number of probes through which current flows and having a polarity corresponding to an error direction. By using this signal, position alignment is performed.

Although five probes are used, the number of probes is not limited thereto. The number of probes through which current flows may not be three, depending upon the relative rotation angle θ between the probe array and recording medium, a distance between probes, a width of the position alignment marker, and the like. High precision position alignment is possible by making Δd smaller relative to the width of the position alignment marker and increasing the number of probes through which current flows. A position alignment precision depends upon a difference between the probe distance and bit distance, i.e., upon Δd. An area capable of position alignment is generally Δd×n where n is the number of probes, assuming that Δd is constant. Specifically, the more the number of position alignment probes, the broader the position alignment area or it becomes possible to deal with the larger position misalignment.

Position alignment may be performed by detecting the probes through which current does not flow, instead of detecting the probes through which current flows.

Fourth embodiments may be used as tracking means during recording/reproducing. For example, in FIG. 34, while the position alignment is performed by scanning the recording medium with the probes 4101, 4102, 4104, and 4105 in the direction indicated by arrows, the probe 4103 is used as the recording/reproducing probe to configure a tracking mechanism.

The invention is applicable not only to the above-described recording/reproducing apparatus, but other types of recording/reproducing apparatuses may also be used such as magnetic recording/reproducing apparatuses, photomagnetic recording/reproducing apparatuses, and near field optical recording/reproducing apparatuses.

Fourth embodiments of the invention will be described more specifically.

[Embodiment 41]

Figure 35:
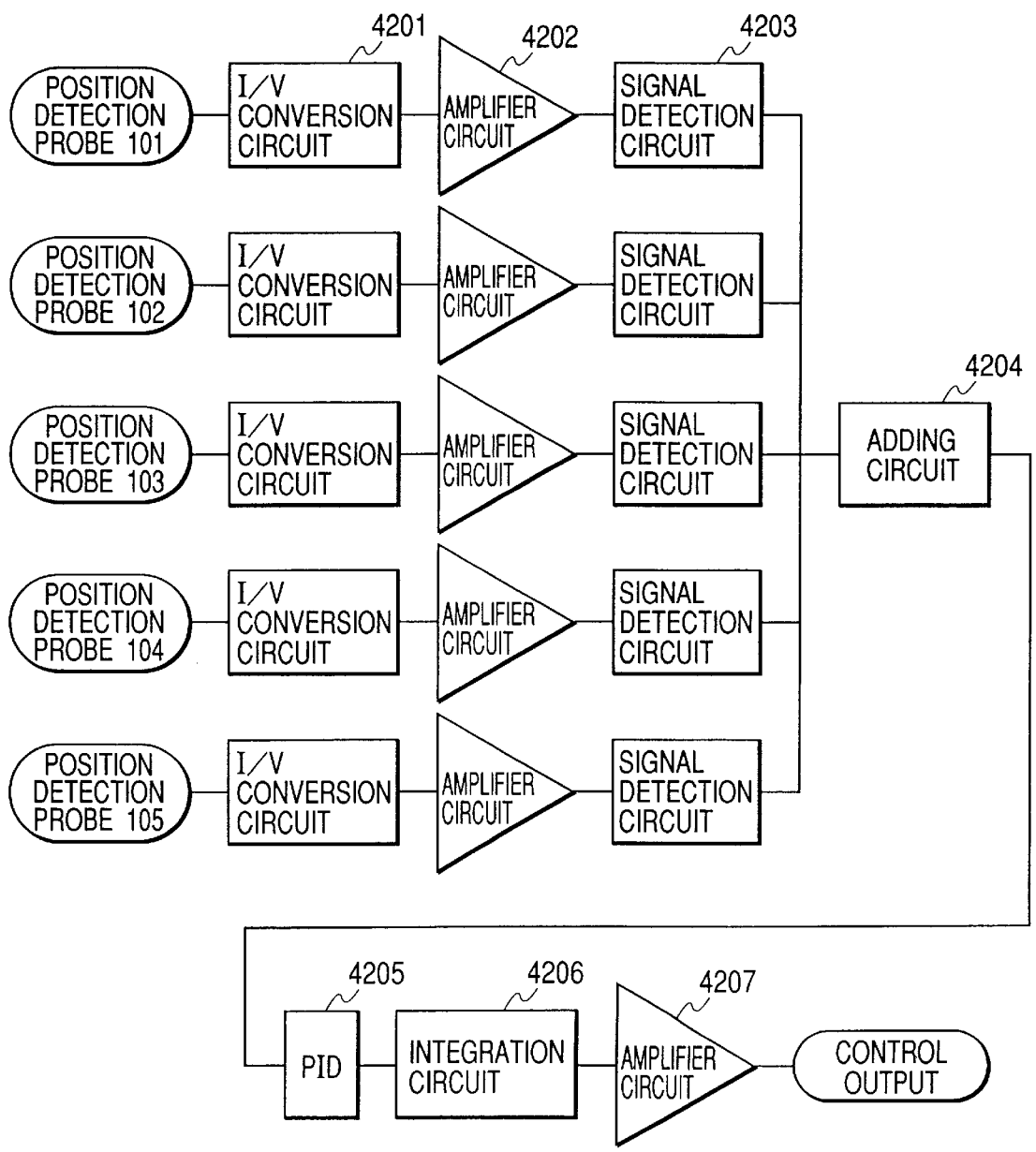
FIG. 35 is a diagram illustrating a position aligning and tracking mechanism of Embodiment 41 of the invention.

Embodiment 41 will be described in detail with reference to FIGS. 34 and 35 in which the position alignment mechanism of this invention is applied to the recording/reproducing apparatus having the structure described above.

A probe array 4107 made of 5 probes integrally formed at a distance of 100 μm was mounted on the apparatus. A direction of the tip of the needle of the probe 4102 viewing the tip of the needle of the tracking probe 4101 is defined as a positive Y-direction. A counter-clockwise direction about a direction of the probe array 4107 vertically viewing the surface of the recording medium 4503 is defined as a positive θ rotation direction. A direction of the positive Y-direction rotated by π/2 rad along the negative θ rotation direction is defined as a positive X-direction.

Next, the recording medium was linearly scanned with the probe array 4107 by a length of 110 μm in the positive Y-direction in FIG. 34. During the scanning, a voltage pulse was applied to each probe at an interval of 7 nm. The voltage was 5.5 V and the application time was 0.3 μsec. The diameter of a generated record bit was about 10 nm. In the above manner, five position alignment marker trains 4106 extending by a length of 110 μm in the X-direction shown in FIG. 34 were formed.

Next, the probe array 4107 was moved to the original position. Thereafter, the probe array 4107 was rotated relative to the recording medium 4503 by 0.009 rad along the positive θ rotation direction about the tip of the needle of the probe 4101 in the plane parallel to the surface of the recording medium 4503. Therefore, the apparent distance between two tracking probes in the Y-direction in FIG. 34 was narrowed by 4 nm. Position alignment was performed in this state by using the five probes. The position alignment mechanism of Embodiment 41 provided a position alignment range of about 25 nm in the Y-direction shown in FIG. 34.

Next, a position alignment operation and a tracking operation were performed with the probe 4103 being positioned just upon the position alignment marker.

The position alignment mechanism used by Embodiment 41 will be described with reference to FIG. 35. Current signals of position alignment markers output from the five probes are converted by I/V conversion circuits 4201 into voltage signals which are amplified by amplifier circuits 4202. Each of signal detection circuits 4203 detects whether or not current flows through the corresponding probe. This signal detection circuit 4203 outputs a binary signal to an adding circuit 4204, the binary signal taking a value "1 if current flows through the corresponding probe and a value "0" if current does not flow through the corresponding probe. Of the input signals, the signs of the signals of the probes on the probe 4101 side relative to the position alignment target probe 4103, i.e., the signs of the signals of the probes 4101 and 4102, are inverted by the adding circuit 4204 which adds the inverted signals to the signals of the probes 4104 and 4105, without adding the signal of the probe 4103. An output signal of the adding circuit 4104 is passed through a PID filter 3205, added with the past history by an integration circuit 4206, and amplified by an amplifier circuit 4207 to thereby control the XY driving stage 4508 shown in FIG. 38.

A vias voltage of 1.5 V was applied to the five probes and current passing through the probes was monitored. It was found that current flowed through the probes 4101 and 4102. Next, after the circuit shown in FIG. 35 was connected, current passing through the probes was monitored. It was found that current flowed through the probes 4102, 4103, and 4104.

Next, the recording medium was linearly scanned with the probe array by a length of 100 μm in the positive X-direction shown in FIG. 34. During the scanning, current flowing through the probes was monitored. Although current flowed intermittently through the probes 4101, 4102, 4104, and 4105, current flowed always through the probe 4103. The tracking operation was thus confirmed.

[Embodiment 42]

Embodiment 42 will be described in detail with reference to FIGS. 39 and 40 in which the position alignment mechanism of this invention is applied to the recording/reproducing apparatus having the structure described above.

Two probe groups each constituted of five probes integrally formed at a distance of 200 μm were prepared. As shown in FIG. 39, the first probe array 4107 was mounted on the apparatus. Then, the second probe array 4608 was mounted perpendicular to the first probe array. In FIG. 39, a direction of the tip of the needle of the probe 4102 viewing the tip of the needle of the tracking probe 4101 is defined as a positive Y-direction. A counter-clockwise direction about a direction of the probe array 4765 vertically viewing the surface of the recording medium 4503 is defined as a positive θ rotation direction. A direction of the positive Y-direction rotated by π/2 rad along the negative θ rotation direction is defined as a positive X-direction. A recording/reproducing probe 4606 was also mounted. Although the probes totaling 11 probes were structured to move together, the probe arrays 4107 and 1608 can be rotated independently about the tips of needles of the probes 4101 and 4601 in the plane parallel to the recording medium. The probe arrays were rotated by 0.009 rad in the positive θ rotation direction about the tips of needles of the probes 4101 and 4601 in the plane parallel to the recording medium. Tips of all the probes were made in contact with the recording medium.

Position alignment markers 4106 were formed with the first probe array 4107. The recording medium was linearly scanned with the first probe array by a length of 10 μm in the positive X-direction shown in FIG. 39. During the scanning, a voltage pulse was applied to the five probes of the probe array 4107 at an interval of 7 nm. The voltage was 5.5 V and the application time was 0.3 μsec. The diameter of a generated record bit was about 10 nm. In the above manner, five position marker trains extending by a length of 10 μm in the X-direction shown in FIG. 39 were formed. Thereafter, the probe array was moved by 5 μm in the negative X-direction and by 5 μm in the negative Y-direction.

Position alignment markers 4106 were formed with the second probe array 4608. The recording medium was linearly scanned with the first probe array by a length of 10 μm in the positive Y-direction shown in FIG. 39. During the scanning, a voltage pulse was applied to the five probes of the probe array 4608 at an interval of 7 nm. The voltage was 5.5 V and the application time was 0.3 μsec. The diameter of a generated record bit was about 10 nm. In the above manner, five position marker trains extending by a length of 10 μm in the Y-direction shown in FIG. 39 were formed.

Figure 39:
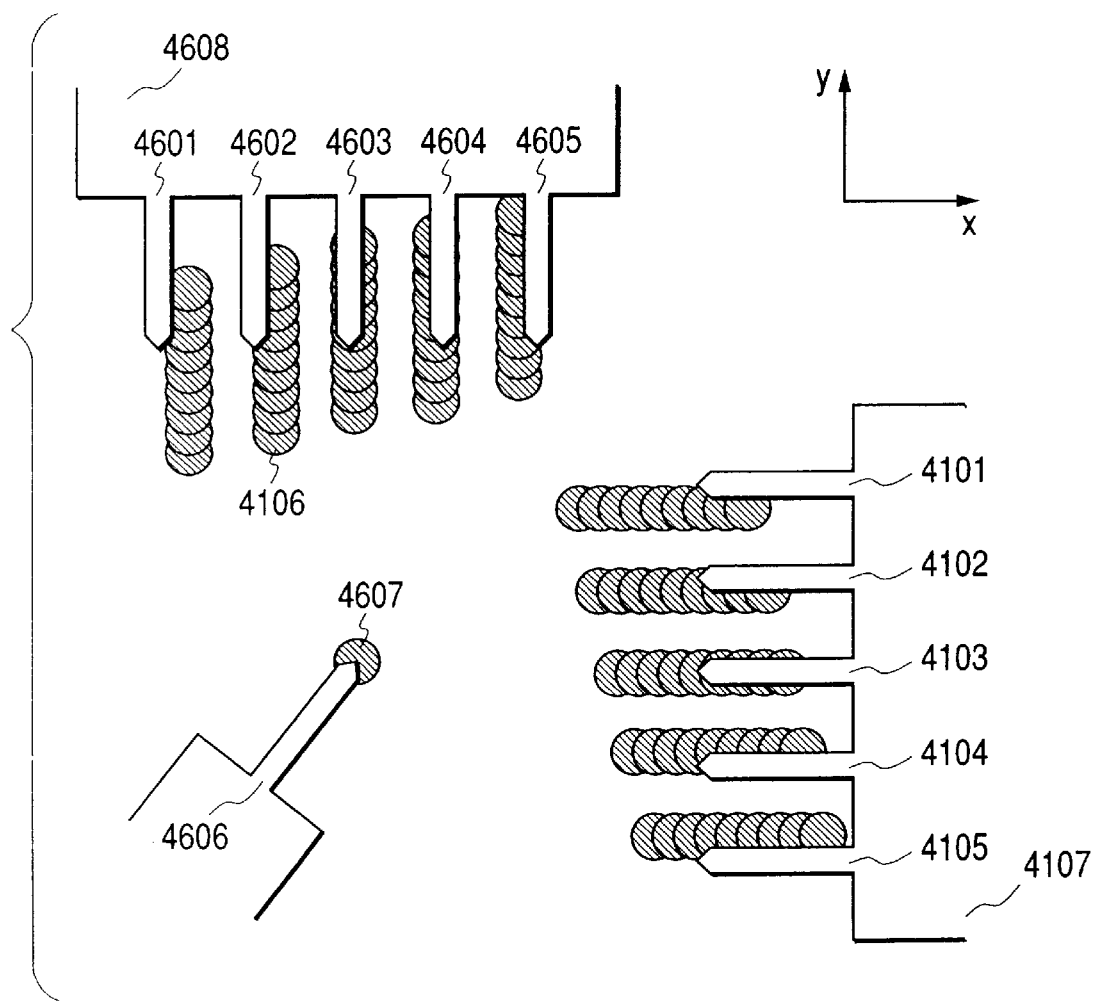
FIG. 39 is a diagram illustrating Embodiment 42 of the invention.

Next, all the probes were moved by 5 μm in the negative Y-direction in FIG. 39 to set the two probe arrays to the original angles. In this state, an apparent distance between probes relative to the distance between position alignment marker trains is therefore broadened by 4 nm. Position alignment was performed in this state by using the two probe arrays each having five probes. The position alignment mechanism of Embodiment 42 provided a position alignment range of about 25 nm square in the XY-directions shown in FIG. 39.

Next, a position alignment was performed so that the tips of the needles the probes 4103 and 4603 were positioned just on their position alignment markers.

The position alignment mechanism used by Embodiment 42 will be described with reference to FIG. 40. Current signals of position alignment markers output from the five probes of the two probe arrays 4107 and 4608 are converted by I/V conversion circuits 4201 into voltage signals which are amplified by amplifier circuits 4202. Each of signal detection circuits 4203 detects whether or not current flows through the corresponding probe. This signal detection circuit 4203 outputs a binary signal to an adding circuit 4204, the binary signal taking a value "1" if current flows through the corresponding probe and a value "0" if current does not flow through the corresponding probe. For example, when the position alignment is performed so that the probe 4103 is just on the position alignment marker, of the input signals, the signs of the signals of the probes on the probe 4101 side relative to the position alignment target probe 4103, i.e., the signs of the signals of the probes 4101 and 4102, are inverted by the adding circuit 4204 which adds the inverted signals to the signals of the probes 4104 and 4105, without adding the signal of 4103. It is similar to the prove array 4608. An output signal of the adding circuit 4204 is passed through a PID filter 4205, added with the past history by an integration circuit 4206, and amplified by an amplifier circuit 4207 to thereby control the XY driving stage 4508 shown in FIG. 38.

Figure 40:
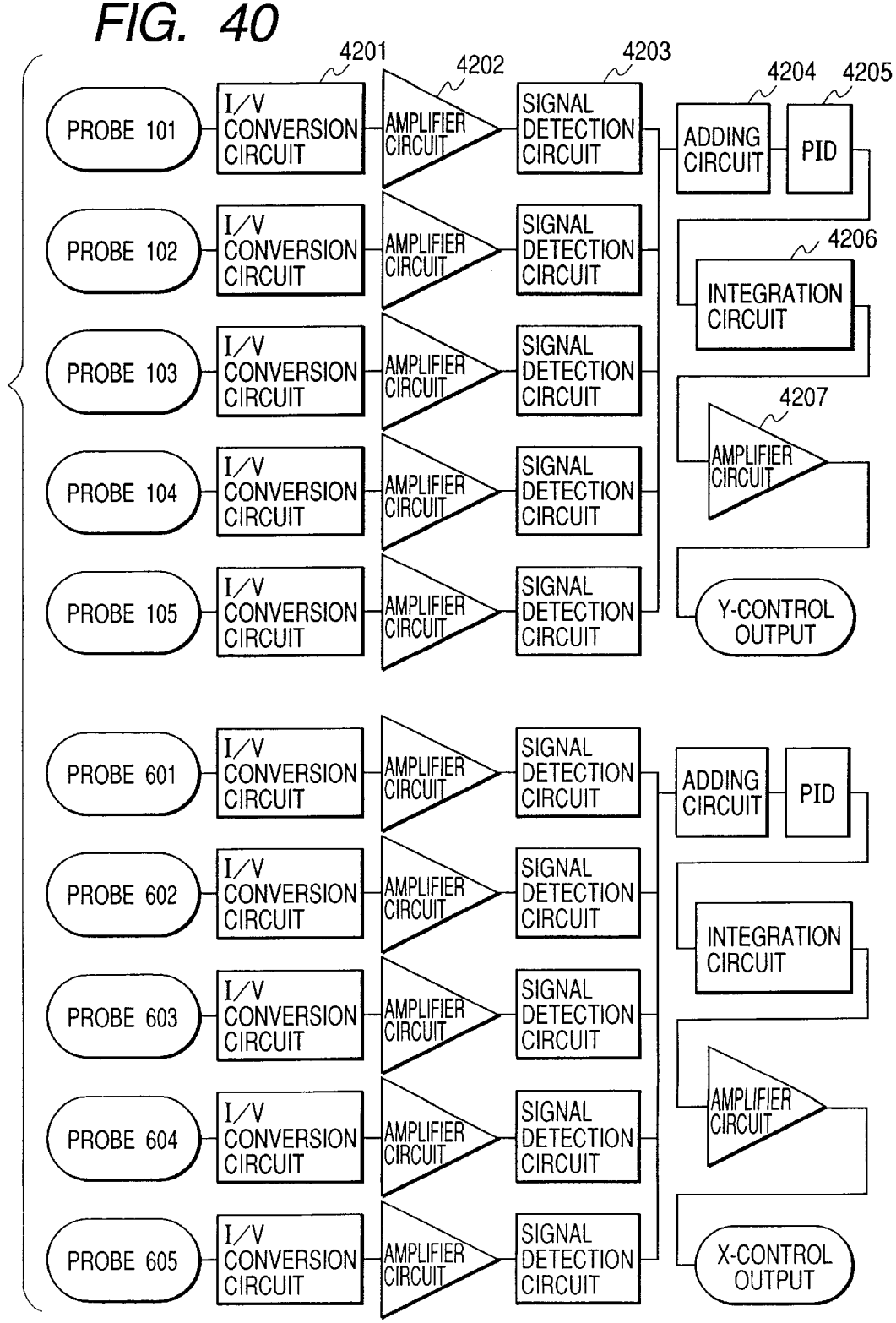
FIG. 40 is a diagram illustrating a position aligning mechanism of Embodiment 42 of the invention.

After the circuit shown in FIG. 40 was connected, a vias voltage of 1.5 V was applied to the ten probes of the two probe arrays 4107 and 4608 and current passing through the probes was monitored. It was found that current flowed through the probes 4102, 4103, 4104, 4602, 4603, and 4604. It was therefore confirmed that the probes were at the target positions.

Next, a voltage pulse was applied to the recording/reproducing probe 4606 to form a record bit 4607. The voltage was 5.5 V and the application time was 0.3 μsec. The diameter of a generated record bit 4607 was about 10 nm. In this state, a bias voltage of 1.5 V was applied to the recording/reproducing probe 4606 and current flowing the probe 4606 was detected.

Next, the bias voltage was turned off for all the probes, and thereafter with the circuit shown in FIG. 40 being connected, the probes were moved by 10 nm in the positive X-direction shown in FIG. 39 and by 10 nm in the positive Y-direction. Then, a bias voltage of 1.5 V was applied to the recording/reproducing probe 4606. Current did not flow. It was therefore confirmed that the tip of the needle of the probe 4606 was displaced from the generated record bit 4607.

After the bias voltage was turned off, a bias voltage of 1.5 V was applied to all the probes of the two position alignment probe arrays 4107 and 4608 to perform a position alignment so that the probes 4103 and 4603 were just on the position alignment bits. Next, a bias voltage of 1.5 V was applied to the recording/reproducing probe 4606 and current flowing through the recording/reproducing probe 4606 was detected. It was therefore confirmed that the tip of the needle of the probe 4606 was again positioned just on the record bit 4607.

[Embodiment 43]

Embodiment 43 will be described in detail with reference to the accompanying drawings in which the position alignment and tracking mechanisms of this invention are applied to the recording/reproducing apparatus having the structure described above.

Figure 41:
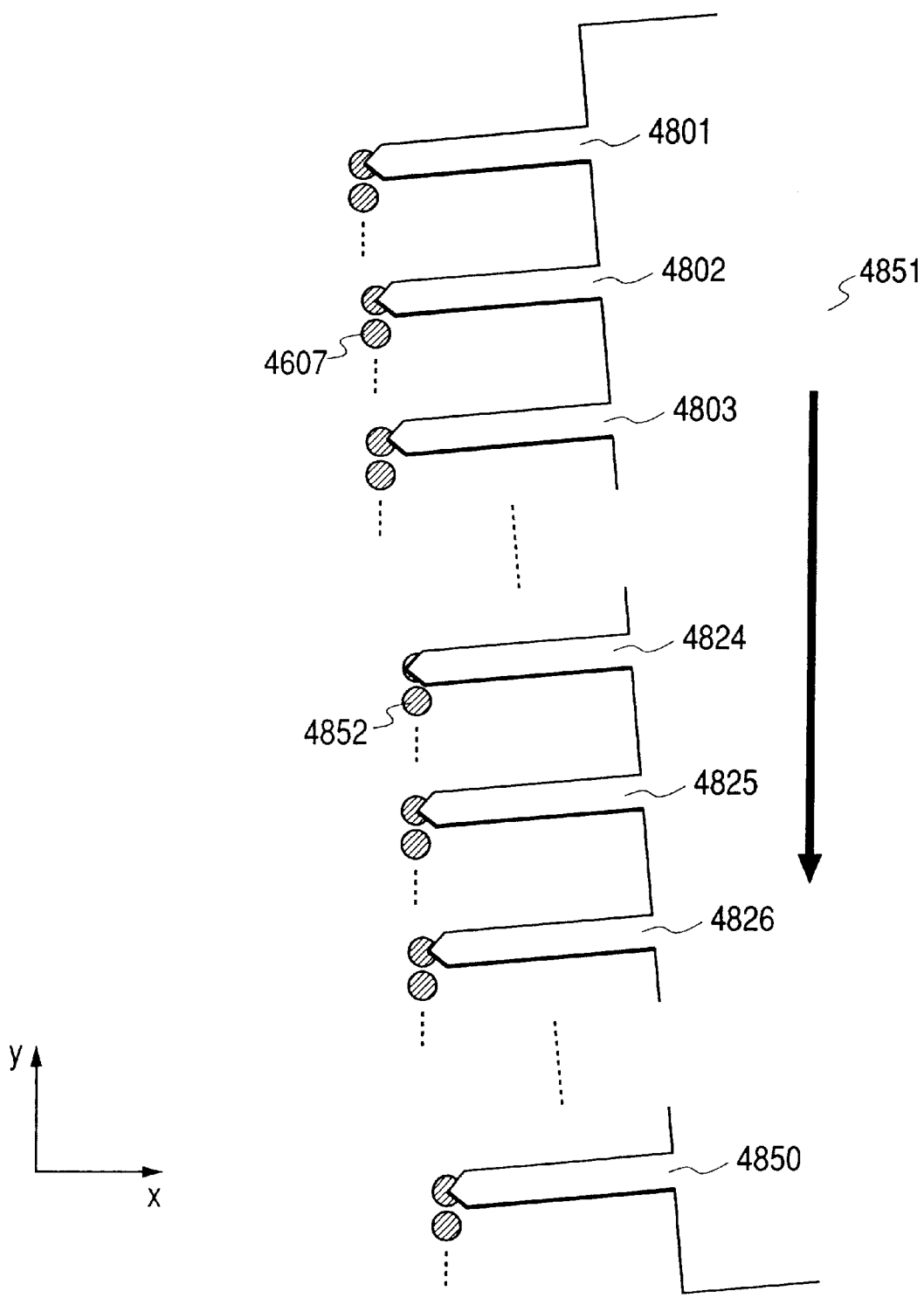
FIG. 41 is a diagram illustrating Embodiment 43 of the invention.

As shown in FIG. 41, a probe array constituted of 50 probes integrally formed at a distance of 100 μm was mounted on the apparatus. Of the 50 probes, six probes from 23-rd to 27-th were used for position alignment and tracking, and the remaining 44 probes were used for position alignment and recording/reproducing. A direction of the tip of the needle of the probe 4102 viewing the tip of the needle of the tracking probe 4101 is defined as a positive Y-direction. A counter-clockwise direction about a direction of the probe array 4851 vertically viewing the surface of the recording medium 4503 is defined as a positive θ rotation direction. A direction of the positive Y-direction rotated by π/2 rad along the negative θ rotation direction is defined as a positive X-direction.

Next, the recording medium was linearly scanned with the probe array 4851 by a length of 5 μm in the positive Y-direction in FIG. 41. During the scanning, a voltage pulse was applied to all the probes at an interval of 7 nm. The voltage was 5.5 V and the application time was 0.3 μsec. The diameter of a generated bit was about 10 nm. In this manner, 50 position alignment marker trains extending by a length of 5 μm in the Y-direction shown in FIG. 41 were formed, each marker train having a width of 10 nm and a distance between marker trains being 100 μm.

Thereafter, the recording medium was again linearly scanned with the probe array 4851 by a length of 50 μm in the positive Y-direction in FIG. 41. During the scanning, a voltage pulse was applied 2048 times to the six probes from 23-rd to 27-th. The voltage was 5.5 V and the application time was 0.3 μsec. The diameter of a generated bit was about 10 nm. In this manner, 6 tracking marker trains extending by a length of 50 μm in the Y-direction shown in FIG. 41 were formed, each tracking marker train having 2048 bits and a distance between marker trains being 100 μm.

Next, the probe array 4851 was moved to the original position, and moved by 1 μm in the positive X-direction shown in FIG. 41. Thereafter, position alignment markers and tracking markers were formed by the method similar to the above. This operation was repeated nine times to form ten tracks including the position alignment markers and tracking markers.

Figure 43:
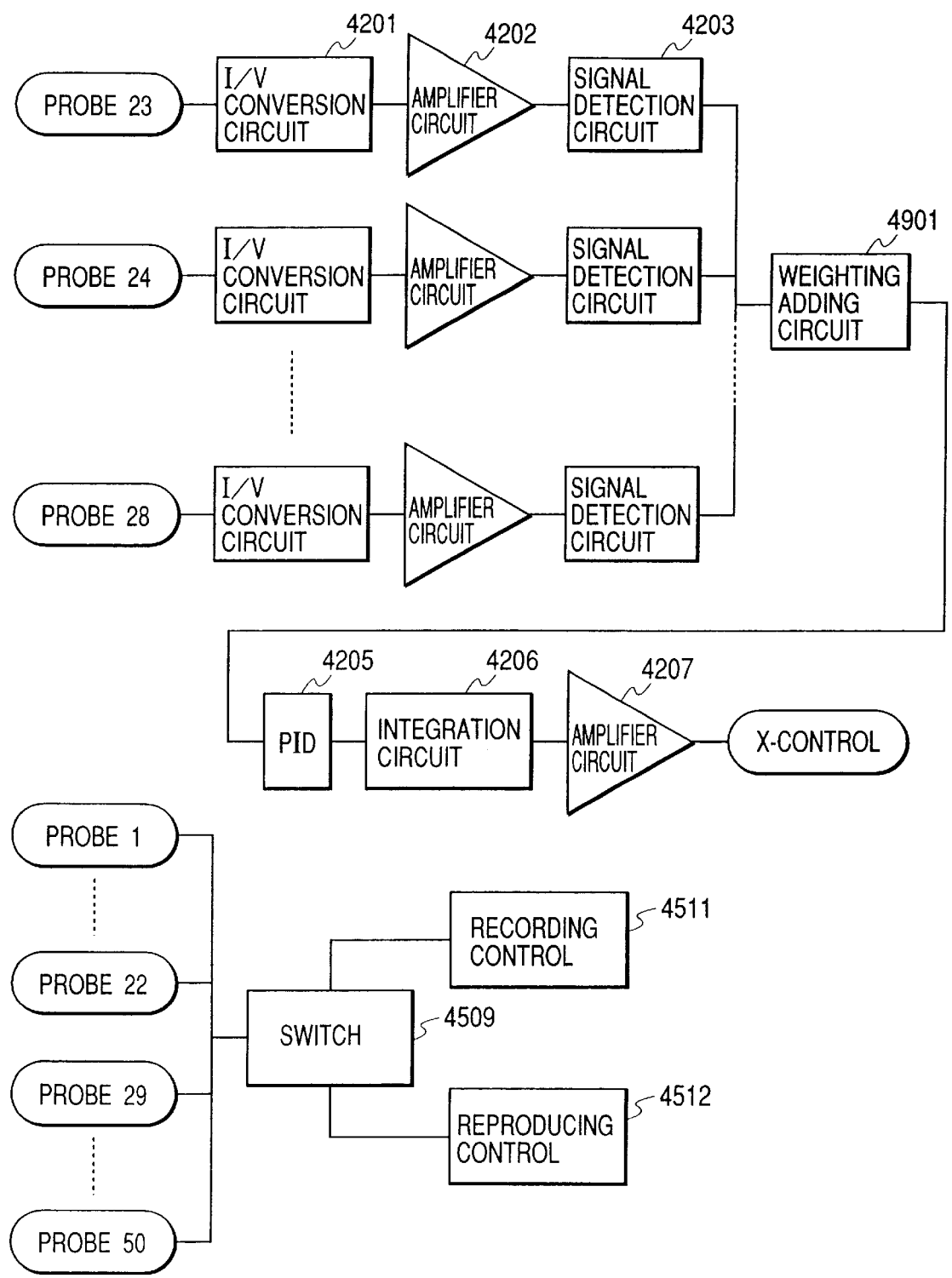
FIG. 43 is a diagram illustrating a tracking mechanism of Embodiment 43 of the invention.

Next, the probe array 4851 was moved by 9 μm in the negative X-direction in FIG. 41 and by 53 μm in the negative Y-direction, and rotated relative to the recording medium 4503 by 0.00004 rad in the positive θ rotation direction about the tip of the needle of the probe 4801 in the plane parallel to the surface of the recording medium. In this state, an apparent distance between probes along the X-direction shown in FIG. 43 is therefore broadened by 4 nm. Position alignment was performed in this state by using the 50 probes. The position alignment mechanism of Embodiment 43 provided a position alignment range of about 200 nm in the X-direction shown in FIG. 41. The apparent distance between probes in the Y-direction shown in FIG. 43 is narrowed by 0.00008 nm which is sufficiently smaller than the bit diameter of 10 nm and can be neglected.

In this state, of the 50 probes of the probe array 4851, the tip of the needle of the probe 4801 is just on the position alignment marker. Next, position alignment was performed to position the center of a line segment interconnecting the tips of the needles of the probes 4825 and 4826 just on the center between the position alignment markers of the two probes, i.e., to position both the two probes just on their position alignment markers.

The position alignment mechanism used by Embodiment 43 will be described with reference to FIG. 42. Current signals of position alignment markers output from the 50 probes are converted by I/V conversion circuits 4201 into voltage signals which are amplified by amplifier circuits 4202. Each of signal detection circuits 4203 detects whether or not current flows through the corresponding probe. This signal detection circuit 4203 outputs a binary signal to a weighting adding circuit 4901, the binary signal taking a value "1" if current flows through the corresponding probe and a value "0" if current does not flow through the corresponding probe. Outputs of the signal detection circuits 4203 multiplied by corresponding coefficients shown in FIG. 44 are added together by the weighting adding circuit 4901. An output signal of the weighting adding circuit 4901 is passed through a PID filter 4205, added with the past history by an integration circuit 4206, and amplified by an amplifier circuit 4207 to thereby control the XYZ driving stage 4508 shown in FIG. 38.

Figure 42:
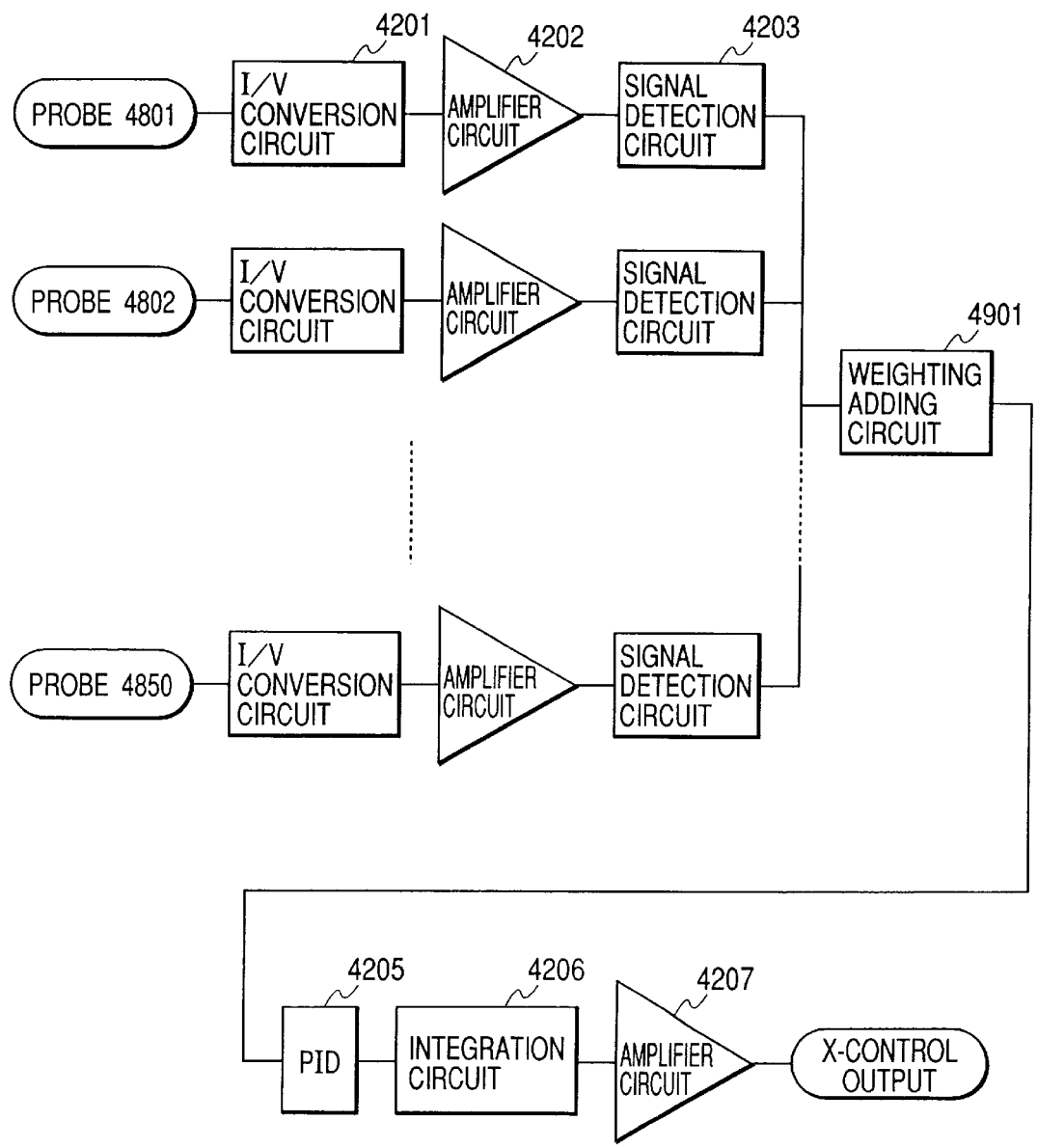
FIG. 42 is a diagram illustrating a position aligning mechanism of Embodiment 43 of the invention.

After the circuit shown in FIG. 42 was connected, a vias voltage of 1.5 V was applied to each probe. Current flowing through each probe was monitored. It was found that current flowed through the probes 4825 and 4826. It was therefore confirmed that the probes were positioned correctly.

Next, while the bias voltage was applied, the recording medium was scanned with the probe array 4851 in the Y-direction shown in FIG. 41. When current was not detected in the 44 probes including the probes 4801 to 4822 and the probes 4829 to 4850, the scanning was stopped and the bias voltage applied to these 44 probes was turned off. A circuit shown in FIG. 43 was then connected to record data bits during tracking.

The tracking mechanism used by Embodiment 43 will be described with reference to FIG. 43. Current signals of tracking markers output from the 6 probes including the probes 4823 to 4828 are converted by I/V conversion circuits 4201 into voltage signals which are amplified by amplifier circuits 4202. Each of signal detection circuits 4203 detects whether or not current flows through the corresponding probe. This signal detection circuit 4203 outputs a binary signal to a weighting adding circuit 4901, the binary signal taking a value "1" if current flows through the corresponding probe and a value "0" if current does not flow through the corresponding probe. Outputs of the signal detection circuits 4203 multiplied by corresponding coefficients shown in FIG. 45 are added together by the weighting adding circuit 4901. An output signal of the weighting adding circuit 4901 is passed through a PID filter 4205, added with the past history by an integration circuit 4206, and amplified by an amplifier circuit 4207 to thereby control the XY driving stage 4508 shown in FIG. 38.

The recording medium was linearly scanned by a length of 50 μm in the positive Y-direction shown in FIG. 41. During the scanning, a voltage pulse was applied a maximum of 2048 times to the 44 probes not used for tracking, in accordance with data prepared in advance. The voltage was 5.5 V and the application time was 0.3 msec. The diameter of a generated data bit was about 10 nm and the bit distance was about 50 nm. The above recording operation was performed for all the generated 10 tracks.

Next, the data bit reproduction operation was performed during tracking. After the probe array 4851 was moved to the original position, a bias voltage of 1.5 V was applied to all the probes of the probe array 4851 and the recording medium was scanned by using the tracking mechanism. During the scanning, reproduction signals from the 44 probes used for recording were monitored, and no reproduction error was found during the 50 reproduction operations for each track.

What is claimed is:

1. A tracking mechanism for an apparatus which records and/or reproduces data on and/or from a medium through a relative scan of the medium with probes, the medium being formed with a plurality of tracking bit trains disposed in parallel at a predetermined distance between trains, the tracking mechanism comprising:

a plurality of probes disposed at a predetermined distance between probes; and tracking control means for performing a tracking control of the plurality of probes in accordance with outputs from the plurality of probes, the outputs being obtained when the plurality of tracking bit trains are simultaneously scanned with the plurality of probes.

2. A tracking mechanism according to claim 1, wherein the predetermined distance between probes is different from the predetermined distance between tracking bit trains.

3. A tracking mechanism according to claim 1, wherein the predetermined distance between probes is the same as the predetermined distance between tracking bit trains, and when the tracking control is to be performed, an angle of the probes relative to a direction of the tracking bit train is changed in a plane parallel to a surface of the medium.

4. A tracking mechanism according to any one of claims 2 and 3, wherein said tracking control means includes detecting means for detecting a relative shift amount and direction between the probes and the tracking bit trains by subtracting one output of a pair of two probes from the other output thereof.

5. A tracking mechanism according to claim 4, wherein said tracking control means includes an integration circuit for integrating an output from said detecting means.

6. A tracking mechanism according to claim 4, wherein said tracking means further includes means for holding a peak of an output of the probe and means for outputting a reset signal to said peak holding means when an output of the probe exceeds a predetermined threshold value.

7. A tracking mechanism according to claim 1, wherein the tracking bit train is used also as a data bit train.

8. A tracking mechanism according to any one of claims 2 and 3, wherein said tracking control means determines a sign of an output of each of the plurality of probes in accordance with a corresponding probe, thereafter adds outputs of the plurality of probes to generate an addition signal, and in accordance with the addition signal, performs the tracking control.

9. A tracking mechanism according to any one of claims 2 and 3, wherein said tracking control means multiplies an output of each of the plurality of probes by a coefficient assigned to a corresponding probe, thereafter adds outputs of the plurality of probes to generate an addition signal, and in accordance with the addition signal, performs the tracking control.

10. A tracking mechanism according to claim 8, wherein said tracking control means includes an integration circuit for integrating an output from said detecting means.

11. A tracking method for an apparatus which records and/or reproduces data on and/or from a medium through a relative scan of the medium with probes, the medium being formed with a plurality of tracking bit trains disposed in parallel at a predetermined distance between trains, the tracking method comprising the steps of:

scanning simultaneously the plurality of tracking bit trains with a plurality of probes disposed at a predetermined distance between probes; and performing a tracking control of the plurality of probes in accordance with outputs from the plurality of probes, the outputs being obtained when the plurality of tracking bit trains are scanned with the plurality of probes.

12. A tracking method according to claim 11, wherein the predetermined distance between probes is different from the predetermined distance between tracking bit trains.

13. A tracking method according to claim 11, wherein the predetermined distance between probes is the same as the predetermined distance between tracking bit trains, and when the tracking control is to be performed, an angle of the probes relative to a direction of the tracking bit train is changed in a plane parallel to a surface of the medium.

14. A tracking mechanism according to any one of claims 12 and 13, wherein said tracking control step detects a relative shift amount and direction between the probes and the tracking bit trains by subtracting one output of a pair of two probes from the other output thereof.

15. A tracking method according to claim 11, wherein the tracking bit train is used also as a data bit train.

16. A tracking method according to any one of claims 12 and 13, wherein said tracking control step determines a sign of an output of each of the plurality of probes in accordance with a corresponding probe, thereafter adds outputs of the plurality of probes to generate an addition signal, and in accordance with the addition signal, performs the tracking control.

17. A tracking method according to any one of claims 12 and 13, wherein said tracking control step multiplies an output of each of the plurality of probes by a coefficient assigned to a corresponding probe, thereafter adds outputs of the plurality of probes to generate an addition signal, and in accordance with the addition signal, performs the tracking control.

18. A tracking mechanism according to claim 9, wherein said tracking control means includes an integration circuit for integrating an output from said detecting means.

* * * * *

UNITED STATES PATENT AND TRADEMARK OFFICE
CERTIFICATE OF CORRECTION

PATENT NO. : 6,195,313 B1
DATED : February 27, 2001
INVENTOR(S) : Junichi Seki et al.

It is certified that error appears in the above-identified patent and that said Letters Patent is hereby corrected as shown below:

<u>Title page,</u>
Item [30], Foreign Application Priority Data, the following should be inserted:
-- Jul. 16, 1998   (JP)   10-218592
Jul. 16, 1998   (JP)   10-218617
Aug. 16, 1998   (JP)   10-249102 --.

<u>Column 18,</u>
Line 23, "simplify" should read -- simple --.

<u>Column 19,</u>
Line 57, "vias" should read -- bias --.

<u>Column 22,</u>
Line 8, "vias" should read -- bias --.

<u>Column 23,</u>
Line 14, "vias" should read -- bias --.

<u>Column 25,</u>
Line 10, "shown-in" should read -- shown in --.

<u>Column 26,</u>
Line 54, "vias" should read -- bias --.

<u>Column 28,</u>
Line 20, "vias" should read -- bias --.

UNITED STATES PATENT AND TRADEMARK OFFICE
CERTIFICATE OF CORRECTION

PATENT NO. : 6,195,313 B1
DATED : February 27, 2001
INVENTOR(S) : Junichi Seki et al.

It is certified that error appears in the above-identified patent and that said Letters Patent is hereby corrected as shown below:

<u>Column 30,</u>
Line 6, "vias" should read -- bias --.

Signed and Sealed this

Nineteenth Day of March, 2002

Attest:

JAMES E. ROGAN
Director of the United States Patent and Trademark Office

*Attesting Officer*